(12) United States Patent
Sawanaka et al.

(10) Patent No.: US 10,788,708 B2
(45) Date of Patent: Sep. 29, 2020

(54) PLANAR LIGHT SOURCE DEVICE AND LIQUID CRYSTAL DISPLAY DEVICE

(71) Applicant: Mitsubishi Electric Corporation, Tokyo (JP)

(72) Inventors: Tomohiko Sawanaka, Tokyo (JP); Masaaki Takeshima, Tokyo (JP); Saki Maeda, Tokyo (JP); Masayoshi Aoshima, Tokyo (JP); Kengo Nishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/656,095

(22) Filed: Jul. 21, 2017

(65) Prior Publication Data

US 2018/0031923 A1 Feb. 1, 2018

(30) Foreign Application Priority Data

Jul. 27, 2016 (JP) .................. 2016-146874
Aug. 31, 2016 (JP) .................. 2016-168854
Dec. 7, 2016 (JP) .................. 2016-237522

(51) Int. Cl.
*G02F 1/13357* (2006.01)

(52) U.S. Cl.
CPC .. *G02F 1/133611* (2013.01); *G02F 1/133605* (2013.01); *G02F 1/133606* (2013.01);
(Continued)

(58) Field of Classification Search
CPC ......... G02F 1/133605; G02F 1/133606; G02F 1/133608; G02F 1/133603;
(Continued)

(56) References Cited

U.S. PATENT DOCUMENTS

2006/0044806 A1 3/2006 Abramov et al.
2008/0018827 A1 1/2008 Yamamoto et al.
(Continued)

FOREIGN PATENT DOCUMENTS

JP 2006-286608 A 10/2006
JP 2006286608 * 10/2006 ............... F21S 2/00
(Continued)

OTHER PUBLICATIONS

Office Action dated Jan. 28, 2020 in corresponding Japanese Application No. 2016-146874.
(Continued)

*Primary Examiner* — Angela K Davison
(74) *Attorney, Agent, or Firm* — Birch, Stewart, Kolasch & Birch, LLP

(57) ABSTRACT

It is an object to provide a technique capable of enhancing evenness of a planar light. A planar light source device includes a light source, a holding substrate, a light distribution control element having a light incident surface and a light outputting surface, a reflection part reflecting the light which has been reflected in an inner side of the light distribution control element toward the side of the display surface, and a case which houses the light source, the holding substrate, the light distribution control element, and the reflection part. A part opposite to the side of the display surface, in relation to at least the light distribution control element in a region between the light distribution control element and an inner wall of the case, is covered by the reflection part.

14 Claims, 34 Drawing Sheets

(52) U.S. Cl.
CPC .. *G02F 1/133608* (2013.01); *G02F 1/133603* (2013.01); *G02F 2001/133607* (2013.01)

(58) Field of Classification Search
CPC ........... G02F 2001/133314; G02B 3/06; F21V 7/0075; F21V 7/05
See application file for complete search history.

(56) References Cited

U.S. PATENT DOCUMENTS

| | | | |
|---|---|---|---|
| 2012/0154263 | A1 | 6/2012 | Imajo et al. |
| 2012/0275150 | A1 | 11/2012 | Yokotani et al. |
| 2013/0169905 | A1* | 7/2013 | Ouchi ............... G02F 1/133603 349/67 |
| 2014/0218625 | A1 | 8/2014 | Kuromizu |
| 2016/0147115 | A1* | 5/2016 | Lee ................... G02F 1/133608 362/97.2 |
| 2017/0352791 | A1* | 12/2017 | Kang ..................... H01L 33/58 |

FOREIGN PATENT DOCUMENTS

| | | | | |
|---|---|---|---|---|
| JP | 2007-184185 | A | 7/2007 | |
| JP | 2012-128296 | A | 7/2012 | |
| JP | 2012-204336 | A | 10/2012 | |
| JP | 2012204336 | * | 10/2012 | |
| JP | 2012-234906 | A | 11/2012 | |
| JP | 2013-143219 | A | 7/2013 | |
| JP | 2013-157173 | A | 8/2013 | |
| JP | 2014-38697 | A | 2/2014 | |
| JP | 2014038697 | * | 2/2014 | ............... F21S 2/00 |
| WO | WO 2010/146913 | A1 | 12/2010 | |

OTHER PUBLICATIONS

Office Action dated Mar. 26, 2020 in corresponding Chinese Application No. 201710617120.X.
Office Action dated Feb. 25, 2020 in corresponding Japanese Application No. 2016-168854.
Office Action dated Jun. 30, 2020 in corresponding Japanese Application No. 2016-237522.

* cited by examiner

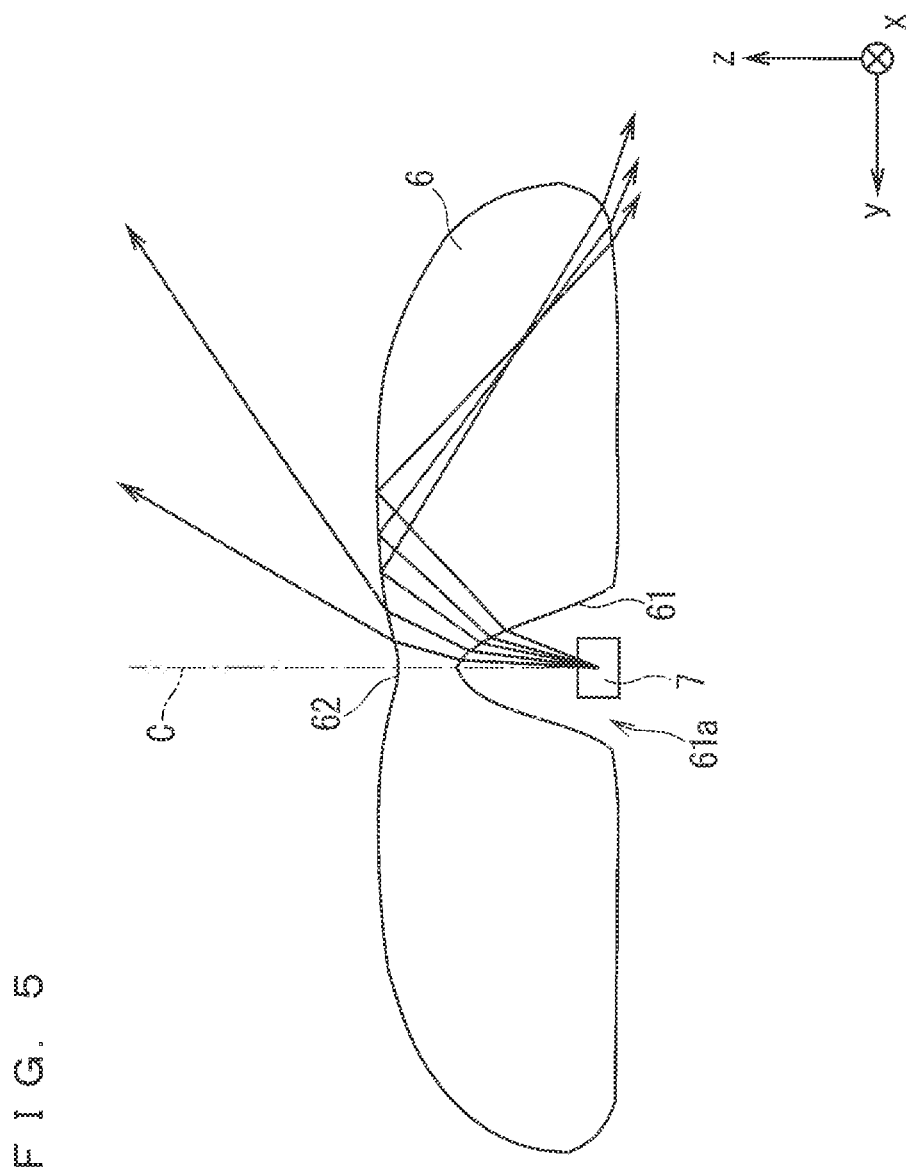
F I G. 5

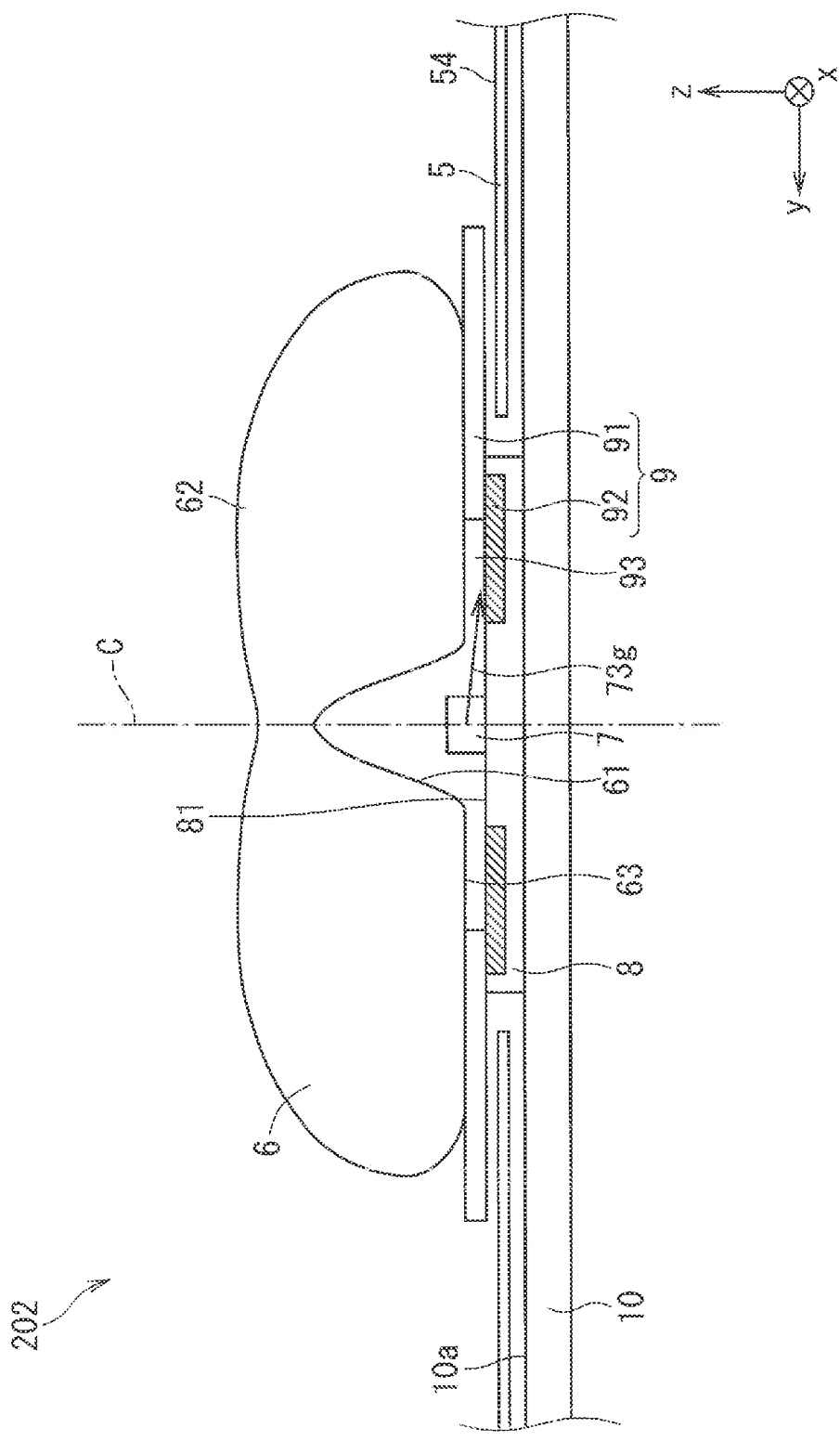

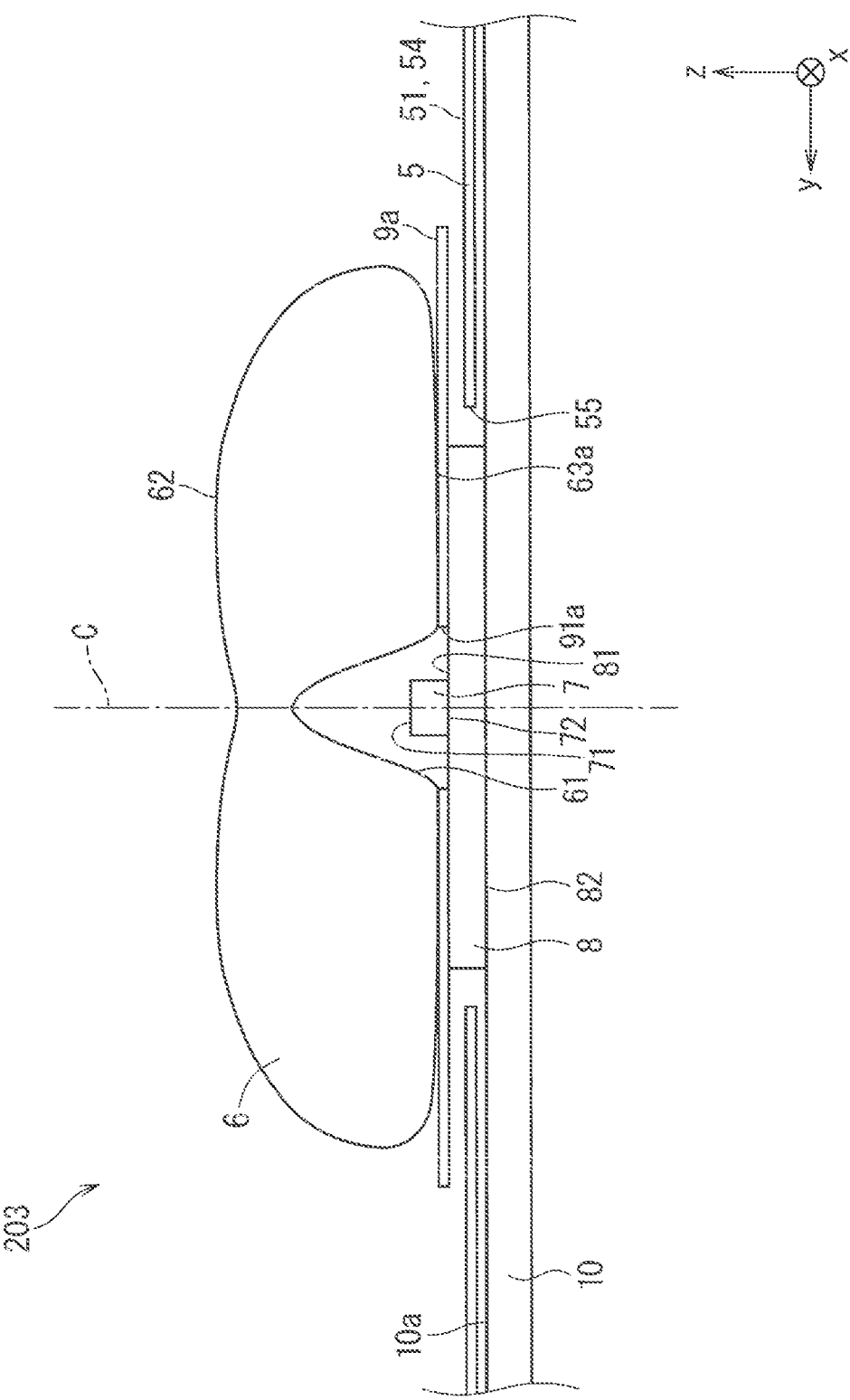

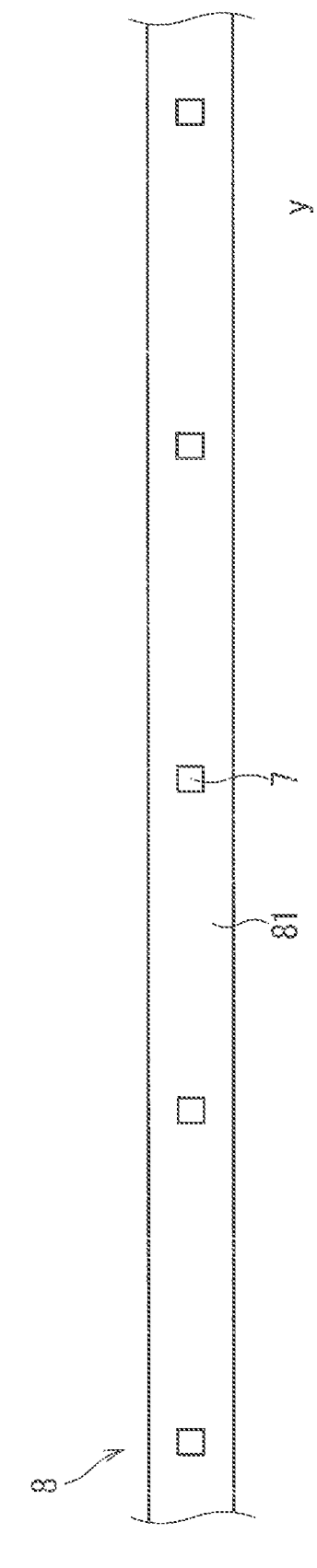
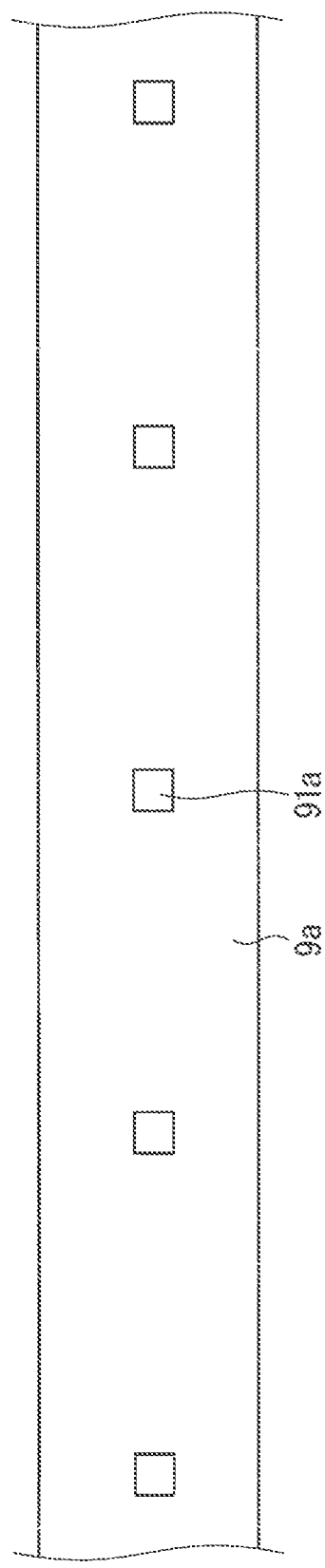

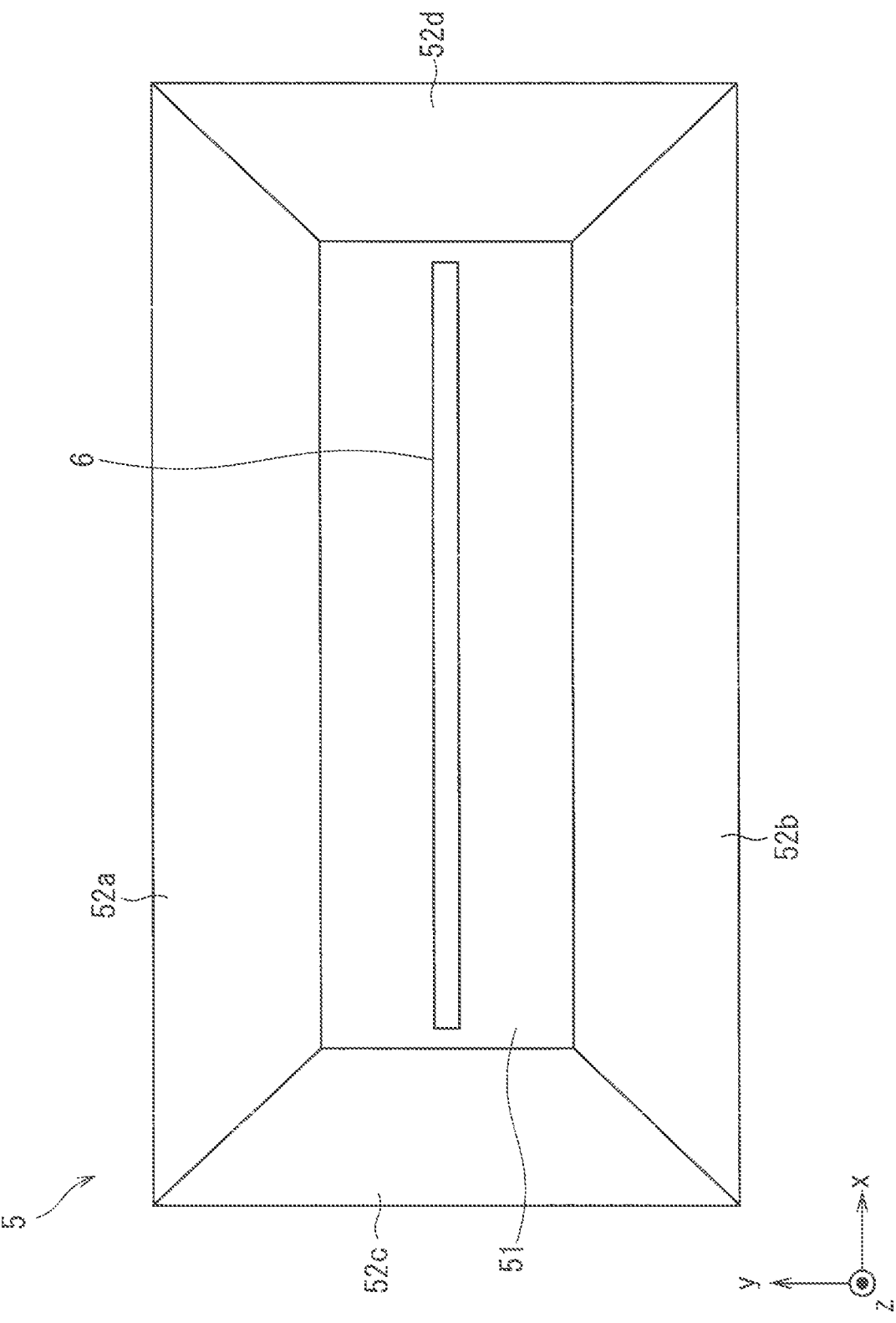

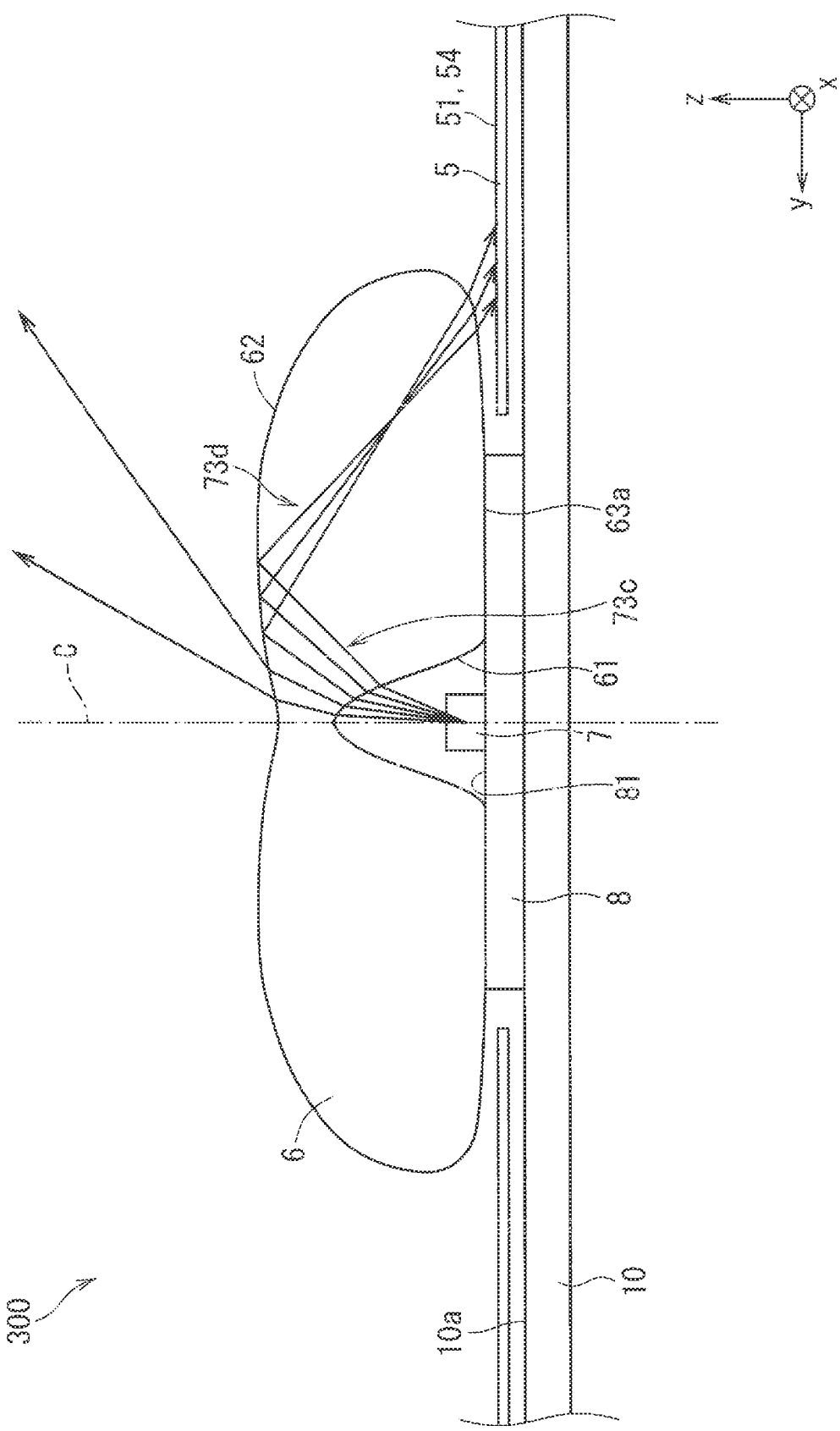

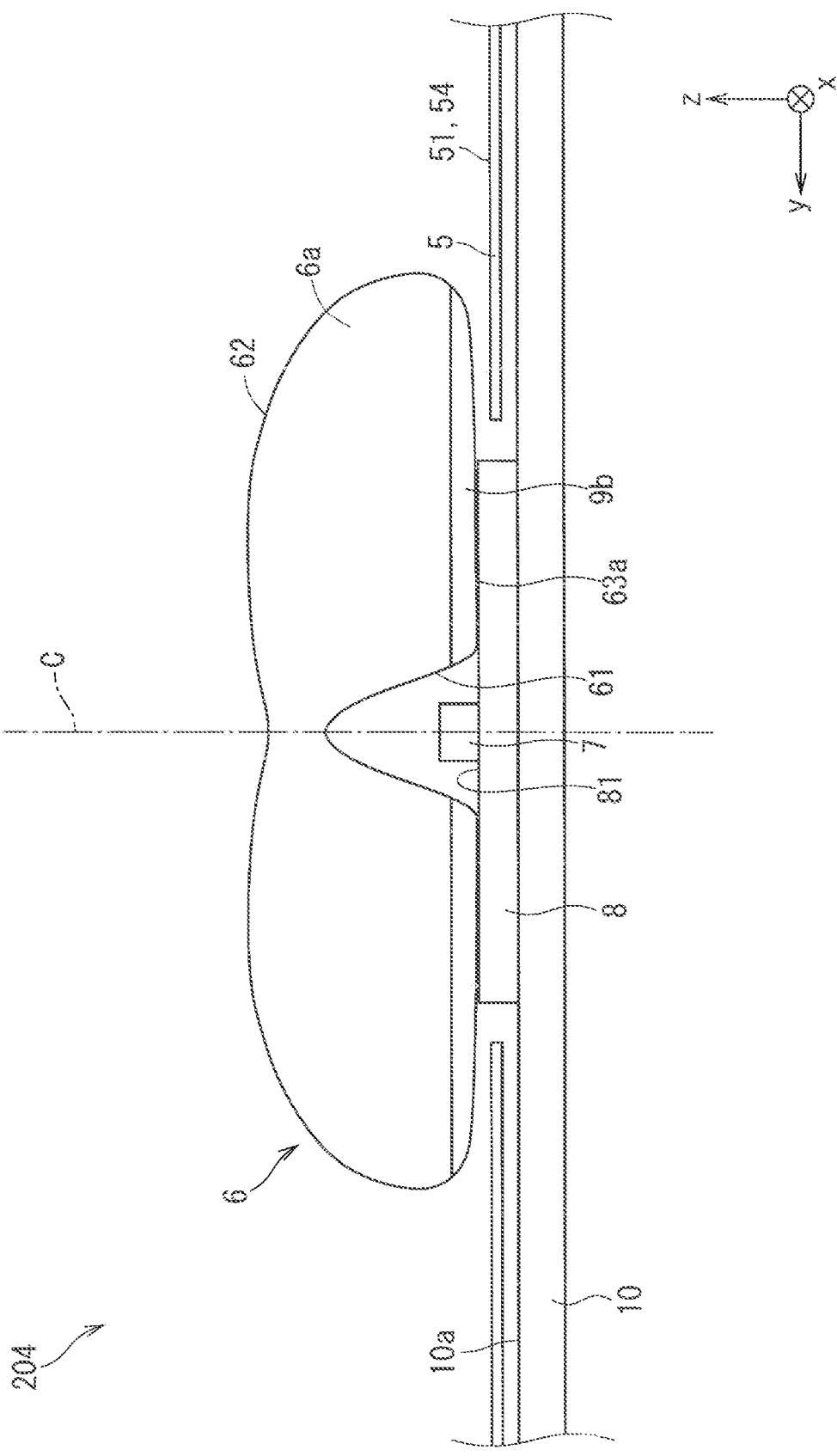

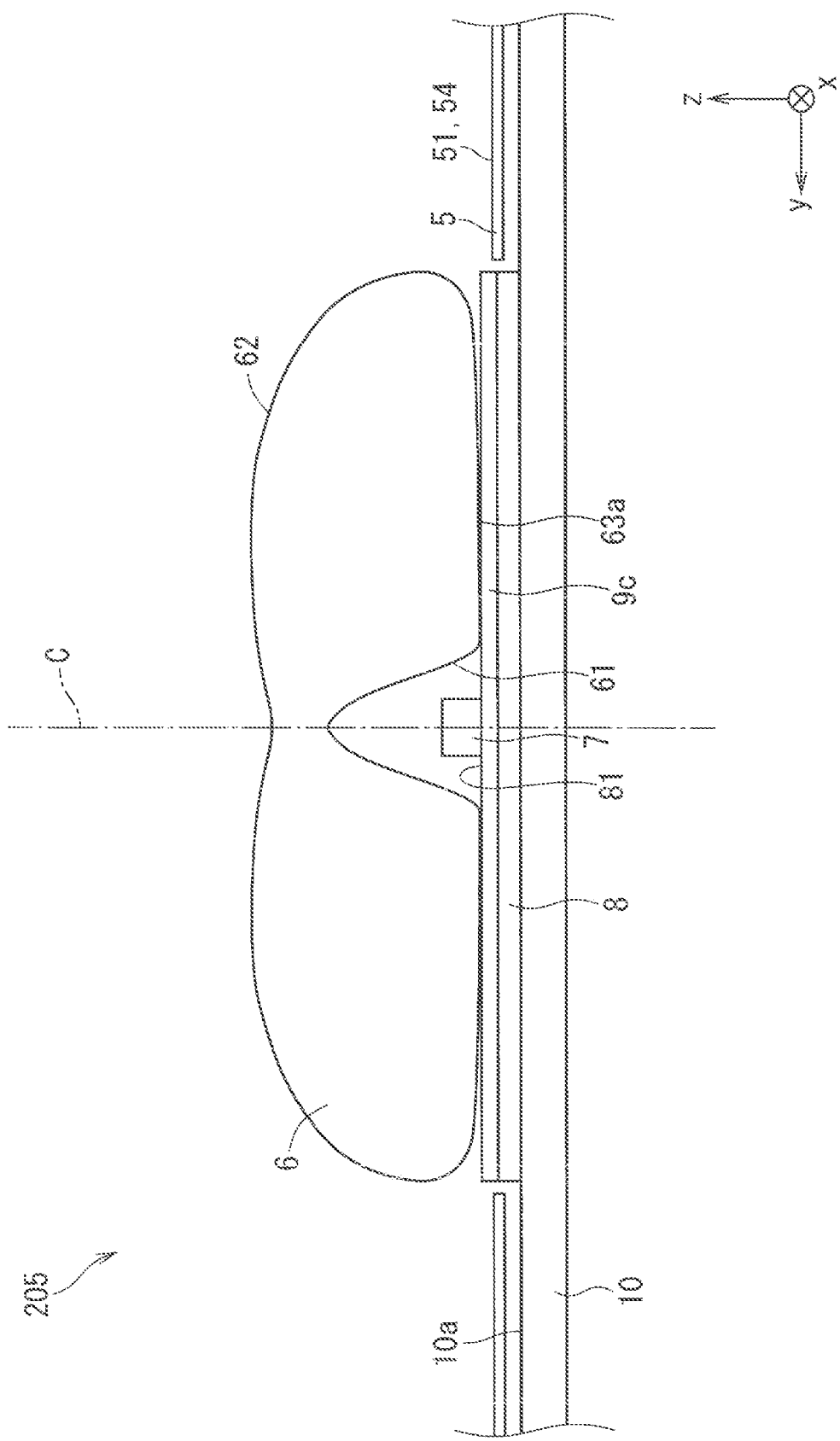

PLANAR LIGHT SOURCE DEVICE AND LIQUID CRYSTAL DISPLAY DEVICE

BACKGROUND OF THE INVENTION

Field of the Invention

The present invention relates a planar light source device which emits a planar light using a plurality of light sources and a liquid crystal display device which illuminates a liquid crystal panel from a rear surface using the planar light source device, thereby causing the liquid crystal panel to display an image.

Description of the Background Art

A liquid crystal panel included in a liquid crystal display device does not emit light by itself. The liquid crystal display device therefore includes, as a light source for illuminating the liquid crystal panel, a backlight device as a planar light source device on a rear surface side of the liquid crystal panel.

A direct backlight device in which a plurality of light emitting diodes (referred to as the LED element(s) hereinafter) are arranged is known as a configuration of such a backlight device.

Recently, a highly efficient, high-powered, and small-sized LED element are developed. Thus, even when a total number of LED elements or LEDBARs used in the backlight device is reduced, a brightness as high as before can be obtained according to calculations. The LEDBAR is formed by arranging the plurality of LED elements to constitute one electronic component.

For example, Japanese Patent Application Laid-Open Nos. 2006-286608 and 2014-38637 disclose a technique of expanding light emitted from an LED element using a cylindrical lens to constitute a backlight device which can obtain an even brightness at low cost.

SUMMARY

However, in the technique described in Japanese Patent Application Laid-Open Nos. 2006-286608 and 2014-38697, when the light is transmitted from a medium in the cylindrical lens into the air, a reflection light occurs at a boundary surface, that is to say, inside the cylindrical lens. Moreover, the reflection light increases as a divergence angle of the light emitted from the LED element becomes larger. Thus, it is difficult to enhance the evenness of light which is planarly emitted. In particular, it is difficult to suppress a reduction in an amount of light around an irradiated region.

It is an object of the present invention to provide a technique capable of enhancing evenness of a planar light.

A planar light source device according to the present invention is a planar light source device which emits a planar light. The planar light source device includes a light source, a holding substrate, a light distribution control element, a first reflection part, and a case. The light source emits light. The holding substrate is disposed in a position of the planar light source device being opposite to a display surface with respect to the light source and holds the light source. The light distribution control element is disposed to surround the light source from a side of the display surface and has a light incident surface entering the light emitted from the light source and a light outputting surface distributing the light entering from the light incident surface and then emitting the light. The first reflection part reflects the light which has been reflected in an inner side of the light distribution control element toward the side of the display surface. The case houses the light source, the holding substrate, the light distribution control element, and the first reflection part. A part opposite to the side of the display surface, in relation to at least the light distribution control element in a region between the light distribution control element and an inner wall of the case, is covered by the first reflection part.

Since the part opposite to the side of the display surface, in relation to at least the light distribution control element in a region between the light distribution control element and an inner wall of the case, is covered by the first reflection part, the light which has been reflected in the inner side of the light distribution control element and then traveled to the side opposite to the side of the display surface in relation to the light distribution control element can be reflected toward the side of the display surface by the first reflection part. Thus, both the direct light emitted from the light outputting surface of the light distribution control element and the reflection light reflected in the inner side of the light distribution control element can be used as the illumination light. Accordingly, the evenness of the planar light can be enhanced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a configuration diagram of a behavior of light, which has been emitted from the light source of the planar light source device and then goes through the light distribution control element, viewed from the y-z plane.

FIG. 22 is a cross-sectional view illustrating a configuration around a light source included in a planar light source device according to an embodiment 3.

FIG. 25 is a cross-sectional view illustrating an area surrounding a light source of a planar light source device according to the embodiment 4.

FIGS. 26A and 26B are plan views illustrating a holding substrate and a light absorption part included in the planar light source device according to the embodiment 4.

FIG. 27 is a plan view illustrating a reflection part included in the planar light source device according to the embodiment 4.

FIG. 28 is a diagram illustrating a light beam emitted from a light source of a planar light source device which does not include a reflection body.

FIG. 33 is a cross-sectional view illustrating an area surrounding a light source of a planar light source device according to an embodiment 5.

FIG. 34 is a cross-sectional view illustrating an area surrounding a light source of a planar light source device according to an embodiment 6.

DESCRIPTION OF THE PREFERRED EMBODIMENTS

Embodiment 1

Figure 1:
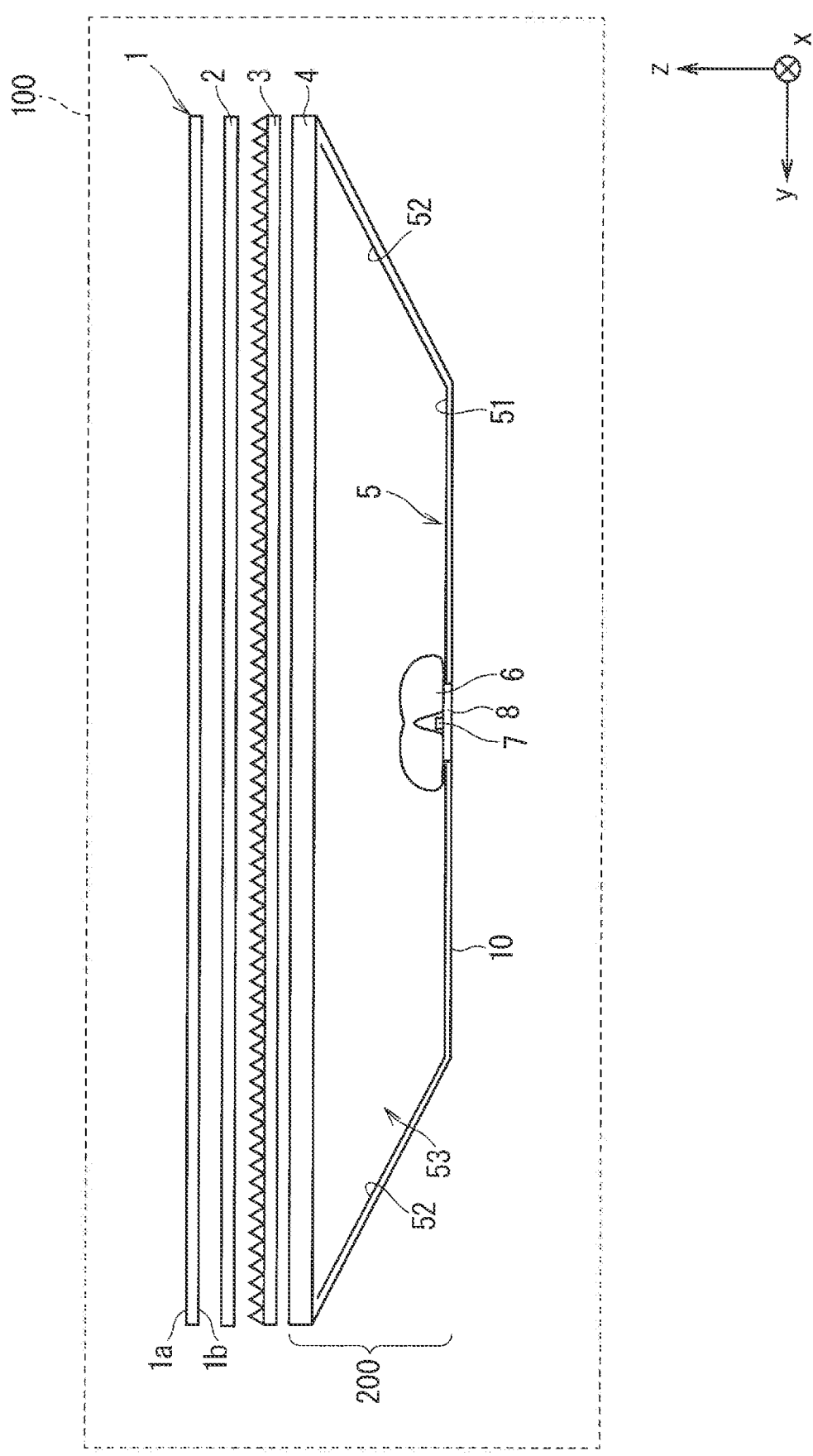
FIG. 1 is a configuration diagram of a configuration of a liquid crystal display device according an embodiment 1 viewed from a y-z plane.
Figure 2:
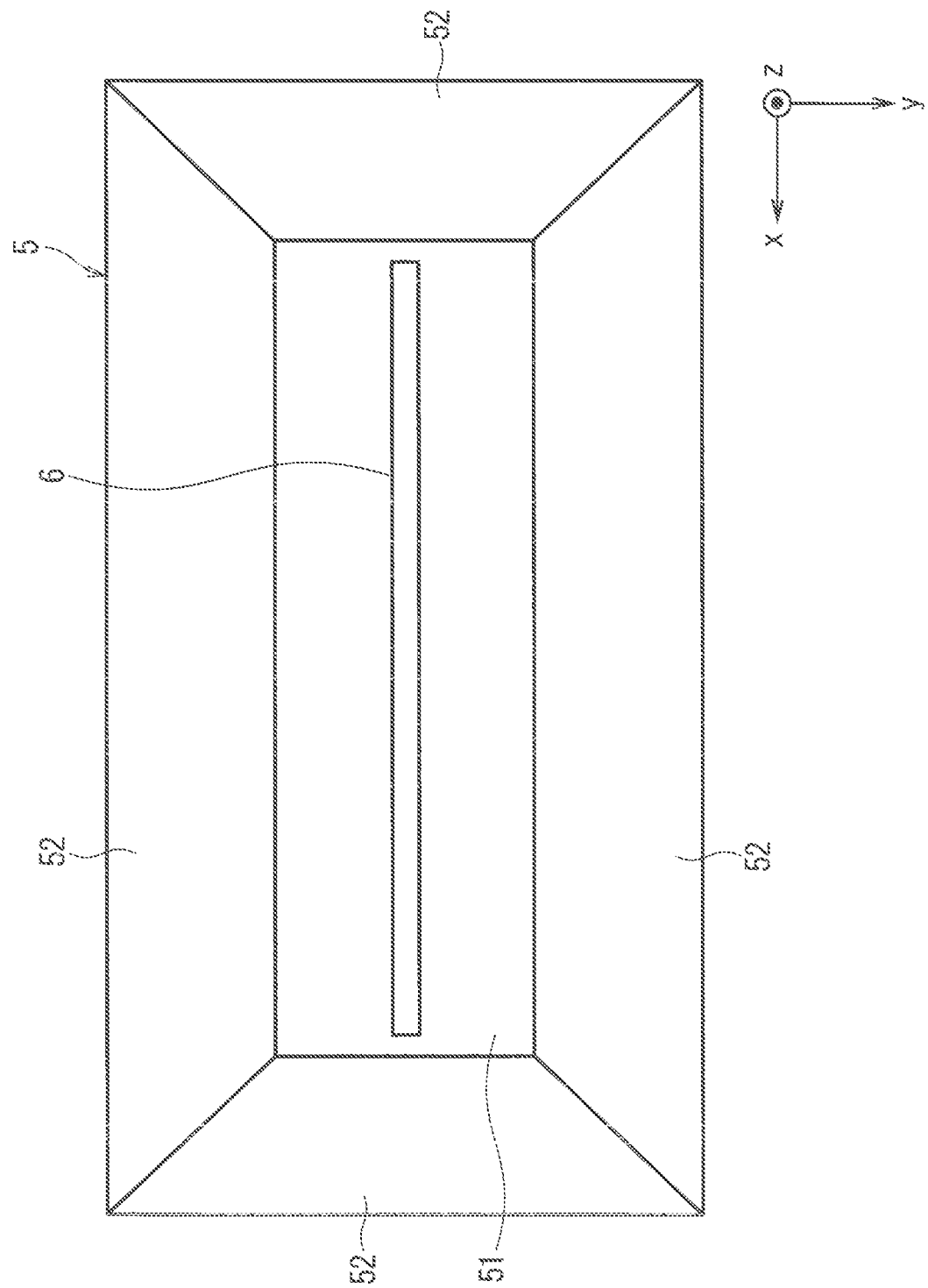
FIG. 2 is a configuration diagram of a configuration of a planar light source device of the liquid crystal display device viewed from an x-y plane.

The embodiment 1 of the present invention is described hereinafter using drawings. FIG. 1 is a configuration diagram of a configuration of a liquid crystal display device 100 according the embodiment 1 viewed from a y-z plane. FIG. 2 is a configuration diagram of a configuration of a planar light source device 200 of the liquid crystal display device 100 viewed from an x-y plane. A coordinate axis of an xyz rectangular coordinate system is illustrated in each drawing to simplify the description.

A short-side direction of a liquid crystal panel 1 is defined as a y-axis direction in the description hereinafter. A long-side direction of the liquid crystal panel 1 is defined as an x-axis direction. A direction perpendicular to an x-y plane, which is a plane surface including an x-axis and a y-axis, is defined as a z-axis direction. Herein, the x-axis direction is a depth direction toward a sheet surface of FIG. 1. The y-axis direction is a horizontal direction toward the sheet surface of FIG. 1. The z-axis direction is a vertical direction toward the sheet surface of FIG. 1.

Moreover, a back side toward the sheet surface of FIG. 1 is defined as a positive direction of the x axis, that is to say, a +x-axis direction, and a near side is defined as a negative direction of the x axis, that is to say, a −x-axis direction.

A left side toward the sheet surface of FIG. 1 is defined as a positive direction of the y axis, that is to say, a +y-axis direction, and a right side is defined as a negative direction of the y axis, that is to say, a −y-axis direction. Moreover, a direction in which the liquid crystal display device 100 displays an image is defined as a positive direction of the z axis, that is to say, a +z-axis direction, and a direction opposite thereto is defined as a negative direction of the z axis, that is to say, a −z-axis direction. Furthermore, a +z-axis direction side is referred to as a display surface 1a side. A −z-axis direction side is referred to as a rear surface 1b side.

(Configuration of the Liquid Crystal Display Device 100 and the Planar Light Source Device 200)

As illustrated in FIG. 1, the liquid crystal display device 100 according to the embodiment 1 includes a transmissive liquid crystal panel 1 and the planar light source device 200. The liquid crystal display device 100 further includes optical sheets 2 and 3.

As illustrated in FIG. 1, the planar light source device 200 includes a light source 7, a holding substrate light distribution control element 6, a reflection part 5 as a first reflection part, a diffusion plate 4, and a case 10.

In FIG. 1, the planar light source device 200 emits light to a rear surface 1b of the liquid crystal panel 1 via the optical sheet 3 and the optical sheet 2. The liquid crystal panel 1, the optical sheet 2, the optical sheet 3, and the planar light source device 200 are arranged in sequence from the +z-axis direction toward the −z-axis direction.

The planar light source device 200 emits a planar light. The liquid crystal panel 1 converts the planar light emitted from the planar light source device 200 into an image light. Herein, "the image light" indicates a light having an image information.

A display surface 1a of the liquid crystal panel 1 is a surface parallel to the x-y plane. The display surface 1a is a surface in a side of the +z-axis direction of the liquid crystal panel 1. A liquid crystal layer of the liquid crystal panel 1 has a planar structure expanding in a direction parallel to the x-y plane.

The display surface 1a of the liquid crystal panel 1 normally has a rectangular shape. A long side in the x-axis direction and a short side in the y-axis direction, which are two sides adjacent to each other in the display surface 1a, are perpendicular to each other. However, the display surface 1a may have the other shape.

The optical sheet 2 suppresses an optical influence such as a small illumination unevenness. The optical sheet 3 turns the light radiated from the diffusion plate 4 in a normal direction of the display surface 1a of the liquid crystal panel 1.

The diffusion plate 4 diffuses the light which goes therethrough. "The diffusion" indicates that the light spreads around. In other words, the light is scattered around. The diffusion plate 4 has a thin plate-like shape, for example. The diffusion plate 4 may also have a sheet-like shape or a film-like shape formed on a substrate, for example. The substrate means a transparent plate on which a diffusion film is formed, for example.

The case 10) is formed of a metal or a resin, for example. The case 10 is a member which is formed to have a box shape opening upward and houses the light source 7, the holding substrate 8, the light distribution control element 6, and the reflection part 5.

The reflection part 5 is a member to reflect the light and has a function of reflecting the light which has been reflected in the inner side of the light distribution control element 6 toward the display surface 1a side, as will hereinafter be described in detail. The reflection part 5 includes one bottom surface 51 parallel to the x-y plane and four side surfaces 52. That is to say, the reflection part 5 has five surfaces and is formed to have a box shape in a manner similar to the case 10. An outside dimension of the reflection part 5 is formed to be slightly smaller than an inside dimension of the case 10. Thus, the case 10 can house the reflection part 5.

The two side surfaces 52, in the four side surfaces 52, connected to sides of the bottom surface 51 parallel to the x-axis direction are inclined so that a distance therebetween increases toward the +z-axis direction. That is to say, the side surface 52 in a side of the −y-axis direction has a shape in which the x-z plane is rotated in a clockwise direction around a connection part between the x-z plane and the bottom surface 51 viewed from the −x-axis direction, thereby being inclined. The side surface 52 in a side of the +y-axis direction has a shape in which the x-z plane is rotated in an anticlockwise direction around a connection part between the x-z plane and the bottom surface 51 viewed from the −x-axis direction, thereby being inclined. The term of "viewed from the −x-axis direction" indicates viewing of a side of +x-axis direction from the side of the −x-axis direction.

In a similar manner, the two side surfaces 52, in the four side surfaces 52, connected to sides parallel to the y-axis direction of the bottom surface 51 are inclined so that a distance therebetween increases toward the +z-axis direction. That is to say, the side surface 52 in the side of the −x-axis direction has a shape in which the y-z plane is rotated in the anticlockwise direction around a connection part between the y-z plane and the bottom surface 51 viewed from the −y-axis direction, thereby being inclined. The side surface 52 in the side of the +x-axis direction has a shape in which the y-z plane is rotated in the clockwise direction around a connection part between the y-z plane and the bottom surface 51 viewed from the −y-axis direction, thereby being inclined.

An inner surface of the reflection part 5 is a reflection surface. The reflection surface of the reflection part 5 may be a diffuse reflection surface, for example. Applicable as the reflection part 5 is a light reflection sheet having a resin such as polyethylene terephthalate as a base member or a light reflection sheet formed by evaporating a metal on a surface of a substrate, for example.

An opening part 53 is formed in the +z-axis direction facing the bottom surface 51 of the reflection part 5. The reflection part 5 forms a hollow box shape in conjunction with the diffusion plate 4. This hollow box includes the reflection surface and the diffusion surface.

An arrangement position of the diffusion plate 4 is described hereinafter. The diffusion plate 4 is disposed in a +z-axis side of the reflection part 5. The diffusion plate 4 is disposed to cover the opening part 53 of the reflection part 5. That is to say, the diffusion plate 4 is disposed on a light outputting surface of the planar light source device 200.

There is a description of "the light reaches the diffusion plate 4", for example, hereinafter. As described above, the diffusion plate 4 is disposed on the opening part 53 of the reflection part 5. Thus, the term of "the light reaches the diffusion plate 4" can be restated as "the light reaches the opening part 53". Moreover, the opening part 53 or the diffusion plate 4 functions as a light outputting surface of the planar light source device 200. Thus, the term of "the light reaches the diffusion plate 4" can be restated as "the light reaches the light outputting surface of the planar light source device 200".

The light distribution control element 6 is an optical element which changes a light distribution of light emitted from the light source 7. "The light distribution" herein indicates a light intensity distribution of the light source 7 to a space. That is to say, it indicates a spatial distribution of the light emitted from the light source 7. "The light intensity" indicates a degree of intensity of the light emitted from a light emitter, and is obtained by dividing a light flux passing in through a minute solid angle in a certain direction by the minute solid angle. That is to say, "the light intensity" is a physical amount expressing the degree of intensity of the light emitted from the light source 7.

As illustrated in FIG. 1 and FIG. 2, the light distribution control element 6 is disposed to surround the light source 7 from the display surface 1a side, that is to say, from the +z-axis side. The light distribution control element 6 is a rod-like optical element extending in the x-axis direction, for example, and is a cylindrical lens, for example. The illustration of the case 10 is omitted in FIG. 2 to see the drawing easily.

The cylindrical lens is a lens having a cylindrical refractive surface (referred to simply as "the cylindrical surface" hereinafter). That is to say, the cylindrical lens has a curvature in a first direction and does not have the curvature in a second direction perpendicular to the first direction. When the light enters the cylindrical lens, a collection or diffusion of light is performed only in one direction. When a parallel light enters the cylindrical lens having a convex shape, the light is linearly collected. This collected line is referred to as a focal line. Herein, the first direction is the y-axis direction, and the second direction is the x-axis direction. The light distribution control element 6 is formed of a transparent material such as an acrylic resin (PMMA), for example.

Figure 3:
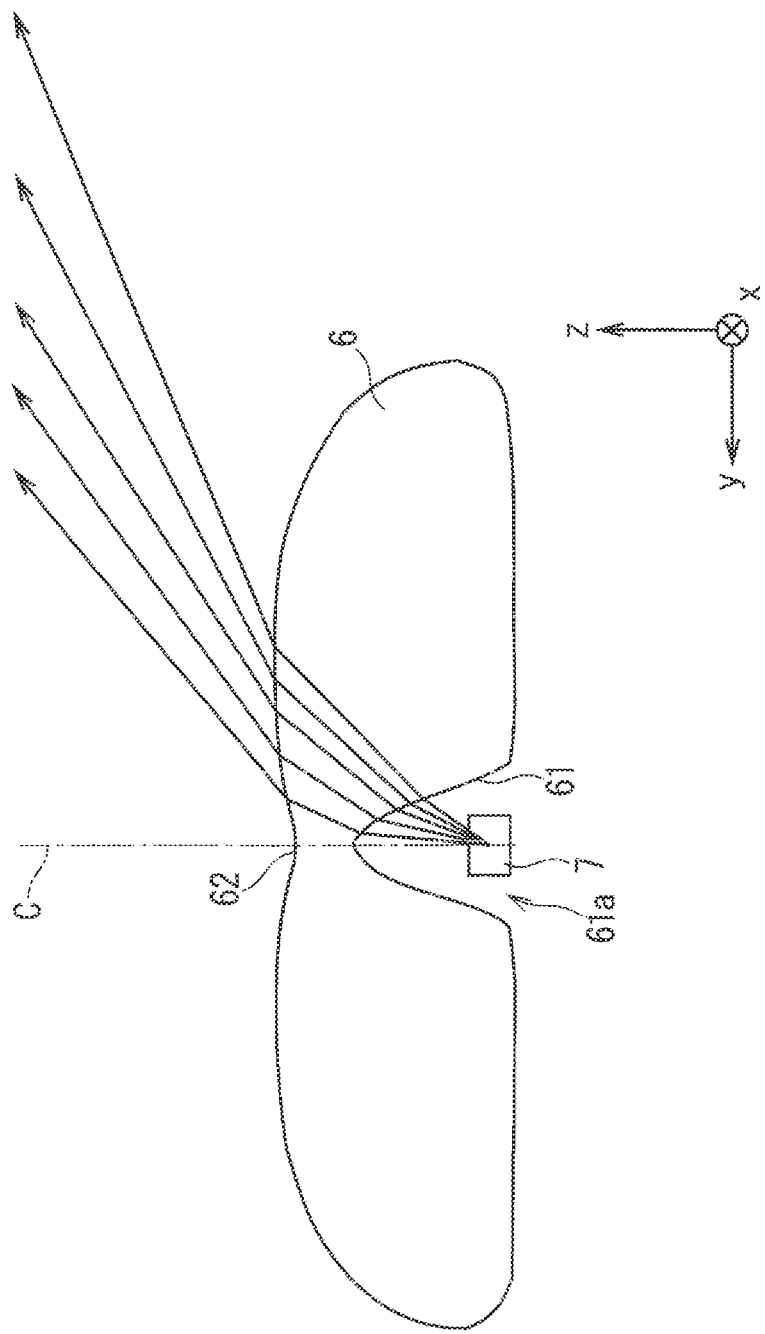
FIG. 3 is a configuration diagram of a behavior of light, which has been emitted from a light source of the planar light source device and then goes through a light distribution control element, viewed from the y-z plane.
Figure 4:
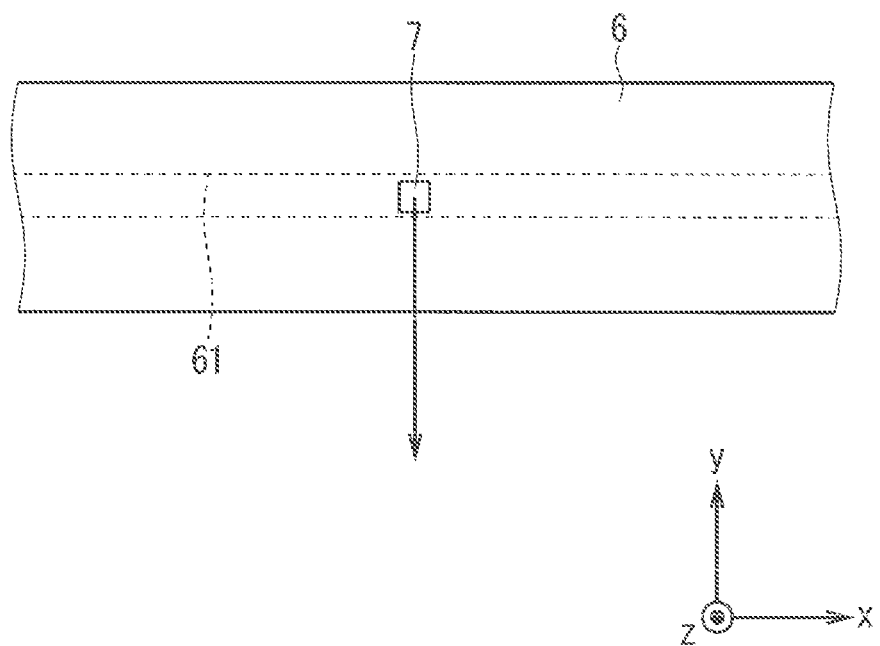
FIG. 4 is a configuration diagram of a behavior of light, which has been emitted from the light source of the planar light source device and then goes through the light distribution control element, viewed from the x-y plane.
Figure 6:
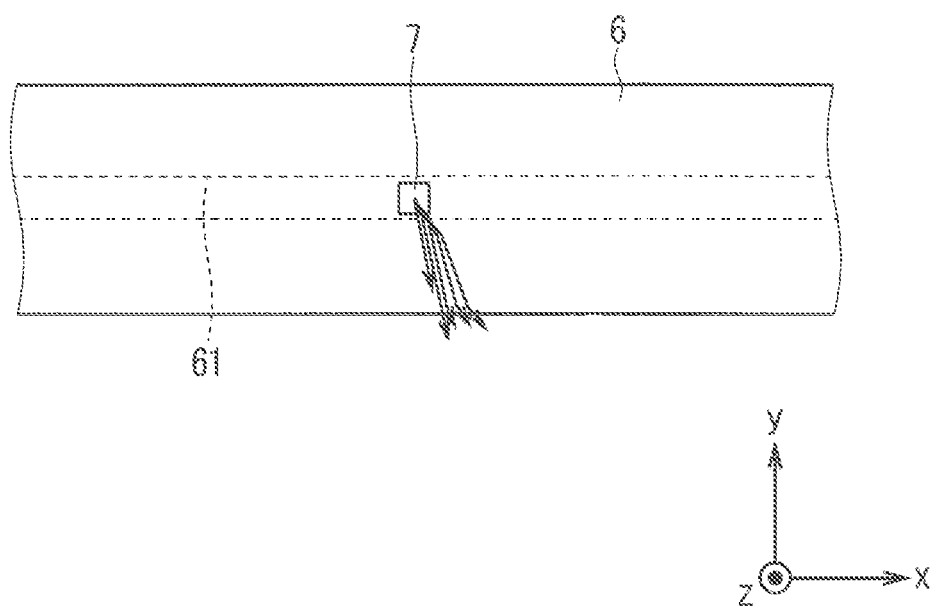
FIG. 6 is a configuration diagram of a behavior of light, which has been emitted from the light source of the planar light source device and then goes through the light distribution control element, viewed from the x-y plane.

FIG. 3 to FIG. 6 are drawings illustrating a behavior in a case where the light which has been emitted from the light source 7 goes through the light distribution control element 6. More specifically, FIG. 3 and FIG. 5 are drawings illustrating a light path around a light axis C in the light emitted from the light source 7 in the y-z plane. FIG. 4 and FIG. 6 are drawings illustrating a light path of a light forming a large angle with the light axis C in the light emitted from the light source 7 in the x-y plane. FIG. 3 and FIG. 5 are illustrated in a form of a cross section in the y-z plane. However, the light is indicated by arrows in the drawings, and a hatching in the cross-sectional part is omitted to see the light indicated by the arrows easily. In the embodiment 1, the light axis C of the light distribution control element 6 is parallel to the z axis.

As illustrated in FIG. 3 and FIG. 5, the light distribution control element 6 includes a light incident surface 61 which enters the light which has been emitted from the light source 7. The light distribution control element 6 includes a light outputting surface 62 which distributes and emits the light which has entered from the light incident surface 61. Described is a case where the light distribution control element 6 is the rod-like optical element extending in the x-axis direction.

The light outputting surface 62 of the light distribution control element 6 is a surface in the +z-axis side in the light outputting surface 62. The light outputting surface 62 forms a cylindrical surface which has a curvature in the y-axis direction as the first direction and does not have the curvature in the x-axis direction as the second direction, that is to say, the cylindrical surface. The light incident surface 61 is formed in a central part of a surface in a −z-axis side in the y-axis direction in the light distribution control element 6. The light incident surface 61 is formed to have a groove shape extending in the x-axis direction as the second direction. As described above, since the light distribution control element 6 has the cylindrical surface, the collection or diffusion of the light is performed on the y-z plane in the light distribution control element 6.

The light source 7 is disposed in a concave part 61a formed by the light incident surface 61 in the light distribution control element 6. The concave part 61a is a space in the −z-axis side in the light incident surface 61. The light outputting surface 62 is formed in the +z-axis side of the light distribution control element 6. The light axis C passes through the light outputting surface 62. That is to say, the light outputting surface 62 has a point of intersecting with the light axis C. "The light axis" indicates a straight line through a center and a focus of a lens or a spherical mirror, for example. In the case of the cylindrical surface, "the light axis" is determined by a lens shape in cross-section having the curvature. In the embodiment 1, the light axis C is determined by the shape of the light outputting surface 62 on the y-z plane. In the embodiment 1, "an axis of the cylindrical surface" is different from the light axis C, but is an axis parallel to the x axis.

The light source 7 is a solid light source, for example, and is a light source using an LED element, for example. The light source 7 includes an organic electroluminescence light source or a light source in which a fluorescent body applied on a plane surface is irradiated with an excitation light to emit the light, for example. In the embodiment 1, the light source 7 is described as the light source using the LED element.

Figure 7:
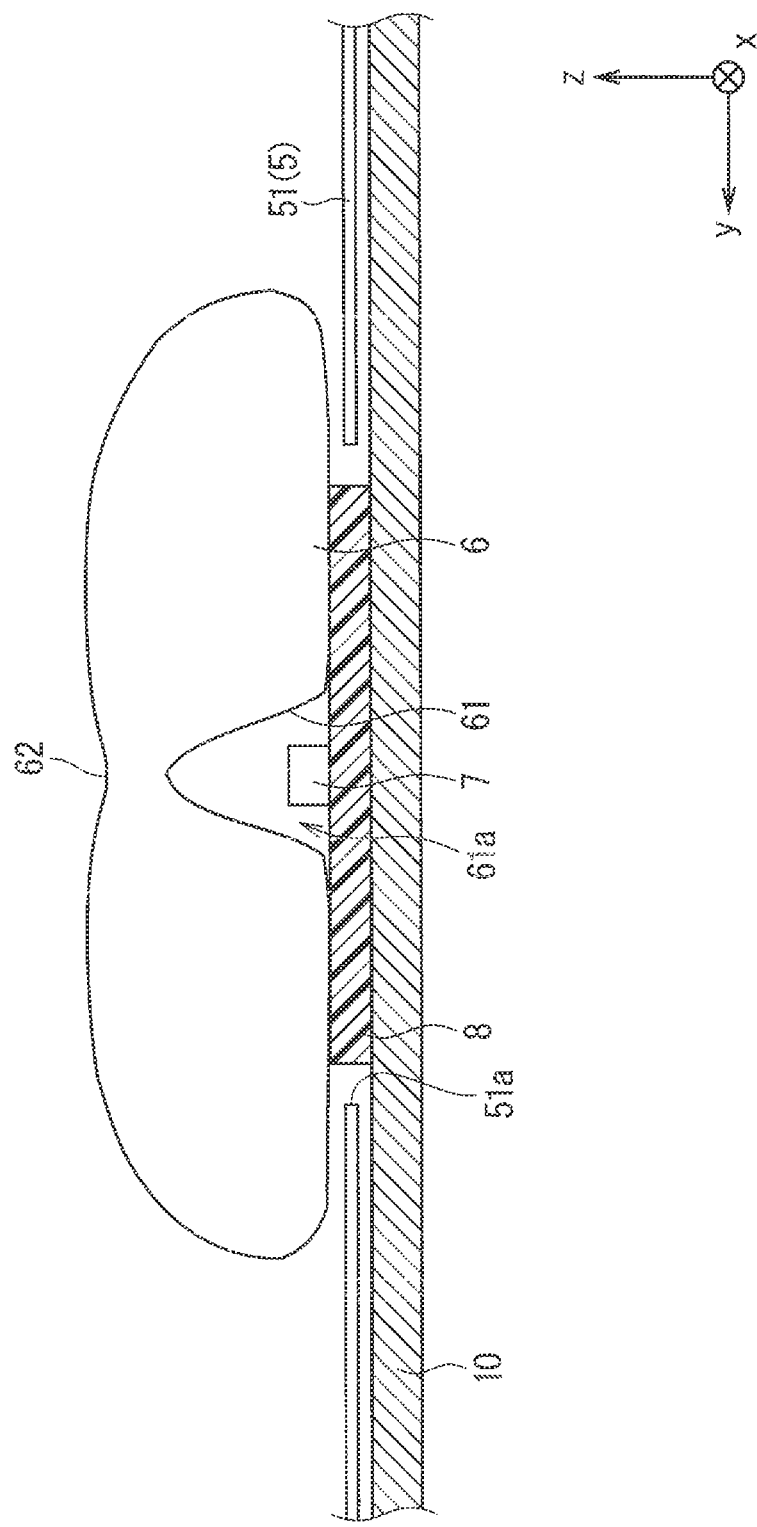
FIG. 7 is a configuration diagram of a configuration around the light source of the planar light source device viewed from the y-z plane.

Next, an arrangement position of the light source 7 is described. FIG. 7 is a configuration diagram of a configuration around the light source 7 of the planar light source device 200 viewed from the y-z plane.

As illustrated in. FIG. 7, the plurality of light sources 7 are disposed on a surface of the holding substrate 8 in a +z side. The light sources 7 are respectively disposed with a predetermined interval therebetween in the x-axis direction, for example. That is to say, the light sources 7 are respectively disposed with a predetermined interval therebetween in the axis direction of the cylindrical surface in the light outputting surface 62.

A surface of the light source 7 in the −z-axis side is a surface to supply power to the light source 7, for example. Thus, the surface of the light source 7 in the −z-axis side is in electrically contact with a surface of the holding substrate 8 in the +z side. For example, when the light source 7 has a rectangular parallelepiped shape, the light source 7 has five light emitting surfaces. In the embodiment 1, the light axis of the light source 7 coincides with the light axis C of the light distribution control element 6 (refer to FIG. 3).

The holding substrate 8 is formed to extend in the x-axis direction, and a length of the holding substrate 8 in the x-axis direction is substantially the same as a length of the light distribution control element 6 in the x-axis direction. The holding substrate 8 is a substrate on which the plurality of light sources 7 are mounted. The light sources 7 are respectively disposed on the surface of the holding substrate 8 in the +z side with a predetermined interval therebetween in the x-axis direction, and the holding substrate 8 on which the plurality of light sources 7 are mounted is disposed in the concave part 61a of the light distribution control element 6.

A white resist layer or a white silk layer on a resist layer, for example, is formed on the surface of the holding substrate 8 in the +z side. The white resist layer and the white silk layer are layers made of $TiO_2$, for example, having a high reflectance. Thus, the surface of the holding substrate 8 in the +z side, that is to say, the surface of the holding substrate 8 holding the light source 7 forms a reflection surface reflecting the light. The holding substrate 8 is disposed on the bottom surface 51 of the reflection part 5. More specifically, a hole part 51a extending in the x-axis direction is formed in a central part of the bottom surface 51 in the reflection part 5 in the y-axis direction, and the holding substrate 8 is disposed in the hole part 51a.

A part of the surface of the holding substrate 8 in the +z-axis side except for the central part in the y-axis direction is disposed to be in contact with the surface of the light distribution control element 6 in the −z-axis side, and can reflect the light which has been reflected in the inner side of the light distribution control element 6 toward the display surface 1a side (refer to FIG. 1), that is to say, in the +z-axis direction.

The reflection part 5 is disposed to be in contact with an inner wall of the case 10, and as described above, the holding substrate 8 is disposed in the hole part 51a of the bottom surface 51 of the reflection part 5. The surface of the holding substrate 8 in the −z-axis side is in contact with the case 10, and heat generated in the light source 7 is transferred to the case 10 via the holding substrate 8 and thereby radiated. A heat radiation sheet may be disposed between the holding substrate 8 and the case 10, for example, to enhance a heat radiation effect.

(Behavior of Light)

Next, a behavior of light is described. As illustrated in FIG. 3, the light emitted from the light source 7 enters the inner side of the light distribution control element 6 from the light incident surface 61. To describe in detail, the light reaching the light incident surface 61 is refracted by the light incident surface 61 and then enters the inner side of the light distribution control element 6.

In accordance with Snell's law, when the light enters a medium having a small refraction index, a refracting angle of the light is larger than an incident angle of the light. When the light enters a medium having a large refraction index, a refracting angle of the light is smaller than an incident angle of the light.

As illustrated in FIG. 3 to FIG. 6, the light emitted from the light source 7 in the −y-axis direction in relation to the light axis C is refracted in the −y-axis direction by the light incident surface 61.

Herein, FIG. 3 and FIG. 4 illustrate part of the light expanding only on the y-z plane in the light emitted from the light source 7. The light beam expanding only on the y-z plane means the light expanding only in the vertical direction toward the sheet surface of FIG. 4. FIG. 3 is a diagram of seeing the y-z plane from the −x-axis direction, and FIG. 4 is a diagram of seeing the x-y plane from the +z axis direction.

FIG. 5 and FIG. 6 illustrate part of the light having an angular component of expanding in the x-axis direction in the light emitted from the light source 7. The light having the angular component expanding in the x-axis direction means the light expanding in a right obliquely downward direction toward the sheet surface of FIG. 6 or expanding parallel to the x axis. FIG. 5 is a diagram of seeing the y-z plane from the −x-axis direction, and FIG. 6 is a diagram of seeing the x-z plane from the +z axis direction.

The light emitted from the light source 7 travels in the inner side of the light distribution control element 6 and subsequently reaches the light outputting surface 62.

The light outputting surface 62 is the surface formed in the +z-axis side of the light distribution control element 6 to have the cylindrical surface shape. This light outputting surface 62 having the cylindrical surface shape refracts the light in such a direction that the angle increases in relation to the light axis C.

For example, in a case where the light distribution control element 6 is made of an acrylic resin having a refraction index of 1.49, a total reflection condition is satisfied when an incident angle of the light entering the light outputting surface 62 is larger than 42.1°. Thus, the light entering from the light incident surface 61 is reflected on the light outputting surface 62 which is a boundary surface and is then reflexed in the −z-axis direction.

The light expanding only on the y-z plane illustrated in FIG. 3 and FIG. 4 can be expanded from the light outputting surface 62 toward the diffusion plate 4 by designing the cross-sectional shape of the light distribution control element 6 to cause the incident angle to be 42.1° or smaller. However, in the light having the angular component of expanding in the x-axis direction illustrated in FIG. 5 and FIG. 6, the angular component in the x-axis direction is combined with the incident angle with the cross-sectional shape of the light distribution control element 6, and the incident angle thereby increases. Thus, the light having the large angular component expanding in the x-axis direction is easily reflected by the light outputting surface 62.

The light reflected by the light outputting surface 62 travels in the −z-axis direction, goes through or is refracted by the bottom surface or part of the side surface of the light distribution control element 6, and then reaches the reflection part 5. The part of the light reflected by the light outputting surface 62 reaches the reflection surface of the holding substrate 8 in the +z axis side.

As illustrated in FIG. 1, FIG. 5, and FIG. 6, the light which has reached the reflection part 5 is diffusely reflected, and the part of the light enters the inner side of the light distribution control element 6 again to be refracted by the light outputting surface 62 of the light distribution control element 6, and then travels in the direction of the diffusion plate 4. The remaining light directly travels in the direction of the diffusion plate 4.

The light which has reached the reflection surface of the holding substrate 8 in the +z axis side is reflected by the reflection surface of the holding substrate 8, enters the inner side of the light distribution control element 6 again to be refracted by the light outputting surface 62 of the light distribution control element 6, and then travels in the direction of the diffusion plate 4.

As described above, the light traveling to the diffusion plate 4 can be divided into a direct light component refracted by the light distribution control element 6 and then directly traveling in the direction of the diffusion plate 4 and a reflection light component reflected in the inner side of the light distribution control element 6, diffusely reflected by the reflection part 5, and then traveling toward the diffusion plate 4.

Herein, since the reflection light component is diffused by the reflection part 5, it is difficult to control the reflection light component using the light distribution control element 6. That is to say, the light distribution of the light including the reflection light component needs to be adjusted to effectively use the light emitted from the light source 7 on the light outputting surface of the planar light source device 200. The distribution of the direct light component needs to be adjusted to be uneven purposely in accordance with the reflection light component, using the light distribution control element 6, to obtain the even distribution.

The part of the light which has reached the diffusion plate 4 is reflected and then travels toward the reflection part 5. The light which has traveled toward the reflection part 5 is reflected by the bottom surface 51 or the side surface 52 of the reflection part 5, and then reaches the diffusion plate 4 again. The light which goes through the diffusion plate 4 is diffused. The light which goes through the diffusion plate 4 becomes an illumination light with increased evenness.

The light which goes through the diffusion plate 4 is radiated toward the rear surface 1b of the liquid crystal panel 1. The rear surface 1b of the liquid crystal panel 1 is irradiated with this illumination light via the optical sheet 3 and the optical sheet 2. The rear surface 1b is a surface of the liquid crystal panel 1 in the −z-axis side.

Although the reflection part 5 is described to have a box shape having the bottom surface 51 and the side surface 52 in the embodiment 1, but is not limited thereto. At least the part opposite to the display surface 1a side, in relation to the light distribution control element 6 in the region between the light distribution control element 6 and the inner wall of the ease 10, needs to be covered by the reflection part 5, for purpose of reflecting the light, which has been reflected in the inner side of the light distribution control element 6, toward the display surface 1a side. Thus, the reflection part 5 may have only the bottom surface 51 without the side surface 52, and furthermore, the bottom surface 51 may have a shape to cover only the part of the −z side of the light distribution control element 6. Accordingly, the reflection part 5 can be downsized, so that a manufacturing cost can be reduced.

In the embodiment 1, the light distribution control element 6 is described as the rod-like optical element, for example. However, the light distribution control element 6 is not limited to the rod-like optical element. The light distribution control element 6 may have a shape which is a little longer than one light source 7 in the x-axis direction so that one light distribution control element 6 can surround one light source 7, and the effect similar to the light distribution control element 6 having the rod-like shape can be obtained by attaching one light distribution control element 6 to one light source 7.

However, the light distribution control element 6 having the rod-like shape can be manufactured by an extrusion molding A direct backlight device normally mounts one lens in one light source 7. However, the light distribution control element 6 having the rod-like shape has an advantage that one lens, that is to say, one light distribution control element 6 is enough for the plurality of light sources 7 arranged in a row.

Thus, a total number of components of the light distribution control element 6 can be reduced. When the light distribution control element 6 is mounted on each light source 7 as the lens, the holding substrate 8 on which the light source 7 is disposed and each light distribution control element 6 need to be attached to each other. However, in the light distribution control element 6 according to the embodiment 1, one light distribution control element 6 is attached to the plurality of light sources 7 arranged in a row, so that an attachment operation can be easily performed.

Considered also is an adoption of an optical element which needs a positioning of the light source 7 in the x-y plane such as a lens array in which a plurality of lenses are made up of one optical element. However, a mold of the optical element needs to be changed in accordance with an increase and decrease in the number of light sources 7. Thus, a versatility to a change of specification of the planar light source device 200 is reduced.

In contrast, in the light distribution control element 6 according to the embodiment 1, the mold of the light distribution control element 6 needs not be changed in accordance with the increase or decrease in the number of light sources 7. Thus, the light distribution control element 6 has a high versatility to the change of specification of the planar light source device 200. That is to say, a brightness of the planar light source device 200 can be adjusted just by changing the number of light sources 7. Thus, the appropriate number of light sources 7 can be disposed.

Moreover, when the light distribution control element 6 is manufactured by the extrusion molding, its length in the x-axis direction can be freely changed. Thus, even when the liquid crystal display device 100 having the different size is manufactured, for example, the same mold can be used.

As described above, in the planar light source device 200 according to the embodiment 1, since the part opposite to the display surface 1a side, in relation to at least the light distribution control element 6 in the region between the light distribution control element 6 and the inner wall of the case 10, is covered by the reflection part 5, the light which has been reflected in the inner side of the light distribution control element 6, more specifically, reflected by the light outputting surface 62 of the light distribution control element 6 and then traveling to the side opposite to the display surface 1a side in relation to the light distribution control element 6 can be reflected toward the display surface 1a side by the reflection part 5. Thus, both the direct light emitted from the light outputting surface of the light distribution control element 6 and the reflection light reflected in the inner side of the light distribution control element 6 can be used as the illumination light. Accordingly, the evenness of the planar light can be enhanced.

Furthermore, since at least the part opposite to the display surface 1a side, in relation to the light distribution control element 6 in the region between the light distribution control element 6 and the inner wall of the case 10, needs to be covered by the reflection part 5, the reflection part 5 may have only the bottom surface 51 without the side surface 52, and furthermore, the bottom surface 51 may have a shape to cover only the part of the −z side of the light distribution control element 6. Accordingly, the reflection part 5 can be downsized, so that the manufacturing cost can be reduced. Since the liquid crystal display device 100 according to the embodiment 1 includes the planar light source device 200 and liquid crystal panel 1 which converts the planar light emitted from the planar light source device 200 into the image light, a brightness of an image displayed on the liquid crystal panel 1 can be even by enhancing the evenness of the planar light as described above.

In the planar light source device 200 and the liquid crystal display device 100, the brightness distribution having a high degree of evenness can be obtained with a small number of light sources 7 by the simple light distribution control element 6 having the high versatility.

Since the planar light source device 200 emits the planar light having the brightness distribution with a high degree of evenness, it can be adopted to a device other than the backlight of the liquid crystal display device such as, for example, an illumination device used for an illumination of a room or an advertisement display device illuminating a picture or the like from a rear surface side.

The surface of the holding substrate 8 holding the light source 7 is the reflection surface. Accordingly, the light reflected in the inner side of the light distribution control element 6 can be reflected toward the display surface 1a side, that is to say, in the +z-axis direction.

The light outputting surface 62 of the light distribution control element 6 forms the cylindrical surface which has the curvature in the y-axis direction and does not have the curvature in the x-axis direction, and the light incident surface 61 of the light distribution control element 6 is formed to have the groove shape extending in the x-axis direction. Accordingly, since the light which has entered the light incident surface 61 of the light distribution control element 6 is refracted in such a direction that the angle increases in relation to the light axis C of the light distribution control element 6 and emitted from the light outputting surface 62, the light can be expanded toward the diffusion plate 4.

It is described above that the light distribution control element 6 is formed of the transparent material, however a material including a diffusion member may also be adopted. When the light enters the diffusion member, the light is diffused and changes its traveling direction. Thus, the traveling direction of the light which travels in the inner side of the light distribution control element 6 is changed to a random direction. Subsequently, the light whose traveling direction has been changed reaches the light outputting surface 62 of the light distribution control element 6. Thus, a wide area can be irradiated with the light emitted from the light distribution control element 6.

A region having a convex-concave shape can be provided in the light incident surface 61 or the light outputting surface 62 of the light distribution control element 6 using a transparent material. That is to say, a region having a minute convex-concave shape may be provided in the light incident surface 61 or the light outputting surface 62. Herein, the convex-concave shape may be provided in the entire region of the light incident surface 61 or the light outputting surface 62, or may also be provided in the part of the light incident surface 61 or the light outputting surface 62.

The region having the convex-concave shape provided in the light incident surface 61 or the light outputting surface 62 randomly changes the traveling direction of the light. Thus, a wide area can be irradiated with the light emitted from the light distribution control element 6.

The diffusion member or the convex-concave shape is applied to diffuse the light, and the direction in which the light travels is thereby randomly changed, thus a bright line can be lessened. "The bright line" indicates a region which is linearly generated, with high brightness, on the light outputting surface of the planar light source device 200.

A brightness unevenness on the light outputting surface of the planar light source device 200 occurring by arranging the plurality of light sources 7 side by side can be lessened by diffusing the light. That is to say, a different between a bright part and a dark part can be lessened.

It is not necessary to uniform roughness of the convex-concave shape in the entire region. For example, the convex-concave shape of the light incident surface 61 can be made smaller than that of the light outputting surface 62.

However, a degree of light diffusion using the diffusion material or the convex-concave shape needs to be made smaller than that of light refraction using the light incident surface 61 and the light outputting surface 62. The reason is that in distributing the light emitted from the light distribution control element 6, the diffusion member or the convex-concave shape has a dominant influence, and the adjustment of the light distribution is made difficult by the design of the light incident surface 61 and the light outputting surface 62.

To further describe this, the light distribution is directed to the light outputting surface of the planar light source device 200, that is to say, the diffusion plate 4 by being refracted by the light incident surface 61 and the light outputting surface 62. Thus, when the cause of the light diffusion increases, there is a possibility that the brightness increases only in the area near the light source 7 and decreases with an increasing distance from the light source 7.

MODIFICATION EXAMPLE 1

Figure 8:
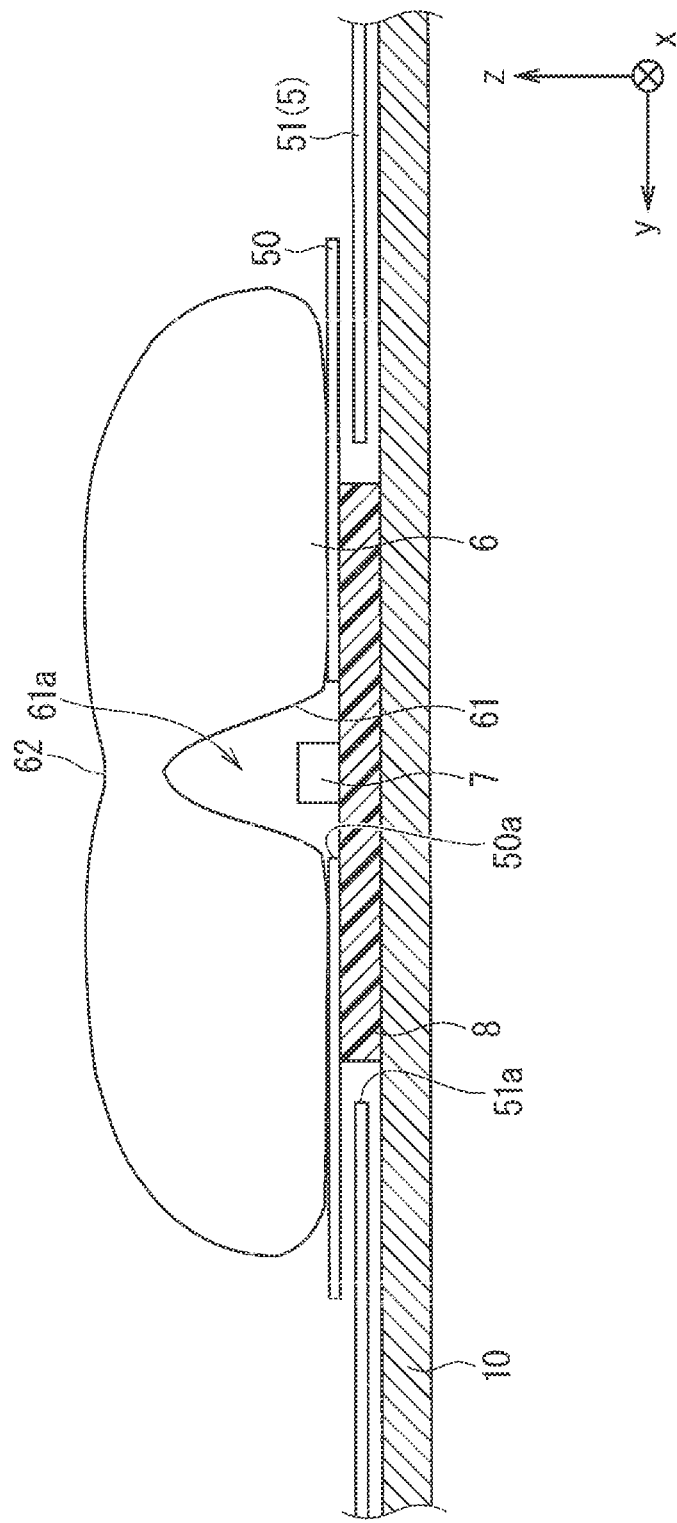
FIG. 8 is a configuration diagram of a configuration around a light source of a planar light source device according to a modification example 1 of the embodiment 1 viewed from the y-z plane.

Next, the modification example 1 of the embodiment 1 is described. FIG. 8 is a configuration diagram of a configuration around the light source 7 of the planar light source device 200 according to the modification example 1 of the embodiment viewed from the y-z plane.

As illustrated in FIG. 8, in the modification example 1 of the embodiment 1, the planar light source device 200 further includes a reflection part 50 as a second reflection part disposed in a region between the light distribution control element 6 and the holding substrate 8. The reflection part 50 is a member different from the reflection part 5, and a surface of the reflection part 50 in the +z side forms a reflection surface. The reflection surface of the reflection part 50 may be a diffuse reflection surface, for example. Applicable as the reflection part 50 is a light reflection sheet having a resin such as polyethylene terephthalate as a base member or a light reflection sheet formed by evaporating a metal on a surface of a substrate, for example.

The reflection part 50 is formed to have a flat-plate shape extending in the x-axis direction and is disposed in the region between the light distribution control element 6 and the holding substrate 8. That is to say, the reflection part 50 is disposed in the −z side in relation to the bottom surface 51 of the reflection part 5. The length of the reflection part 50 in the y-axis direction is a little longer than the length of the light distribution control element 6 in the y-axis direction, and both ends of the reflection part 50 in the y-axis direction protrudes from the light distribution control element 6.

A hole part 50a is formed in a central part of the reflection part 50 in the direction except for the both ends of the reflection part 50 in the x-axis direction. A region in the holding substrate 8 corresponding to the part of the reflection part 50 except for the hole part 50a is covered by the reflection part 50. A region in the holding substrate 8 corresponding to the hole part 50a of the reflection part 50, that is to say, a region in which the light source 7 is disposed is exposed from the reflection part 50. It is described above that the reflection part 50 is a member different from the reflection part 5, however, the reflection part 50 may be aimed to be integral with the reflection part 5 by bending the part in the bottom surface 51 of the reflection part 5 corresponding to the both ends of the holding substrate 8 in the y-axis direction As described above, the planar light source device 200 according to the modification example 1 of the embodiment 1 further includes the reflection part 50 disposed in the region between the light distribution control element 6 and the holding substrate 8. Since a wiring is normally provided on the surface of the holding substrate 8 in the +z side, the region of the reflection surface in the holding substrate 8 is limited, and the entire region in the holding substrate 8 in the +z side cannot become the reflection surface. However, the entire region in the reflection part 50 in the +z side can become the reflection surface, thus a reflectance of the light in the region opposite to the display surface 1a side in relation to the light distribution control element 6 is enhanced compare with the case of not providing the reflection part 50, and usage efficiency of the light can be enhanced.

MODIFICATION EXAMPLE 2

Figure 9:
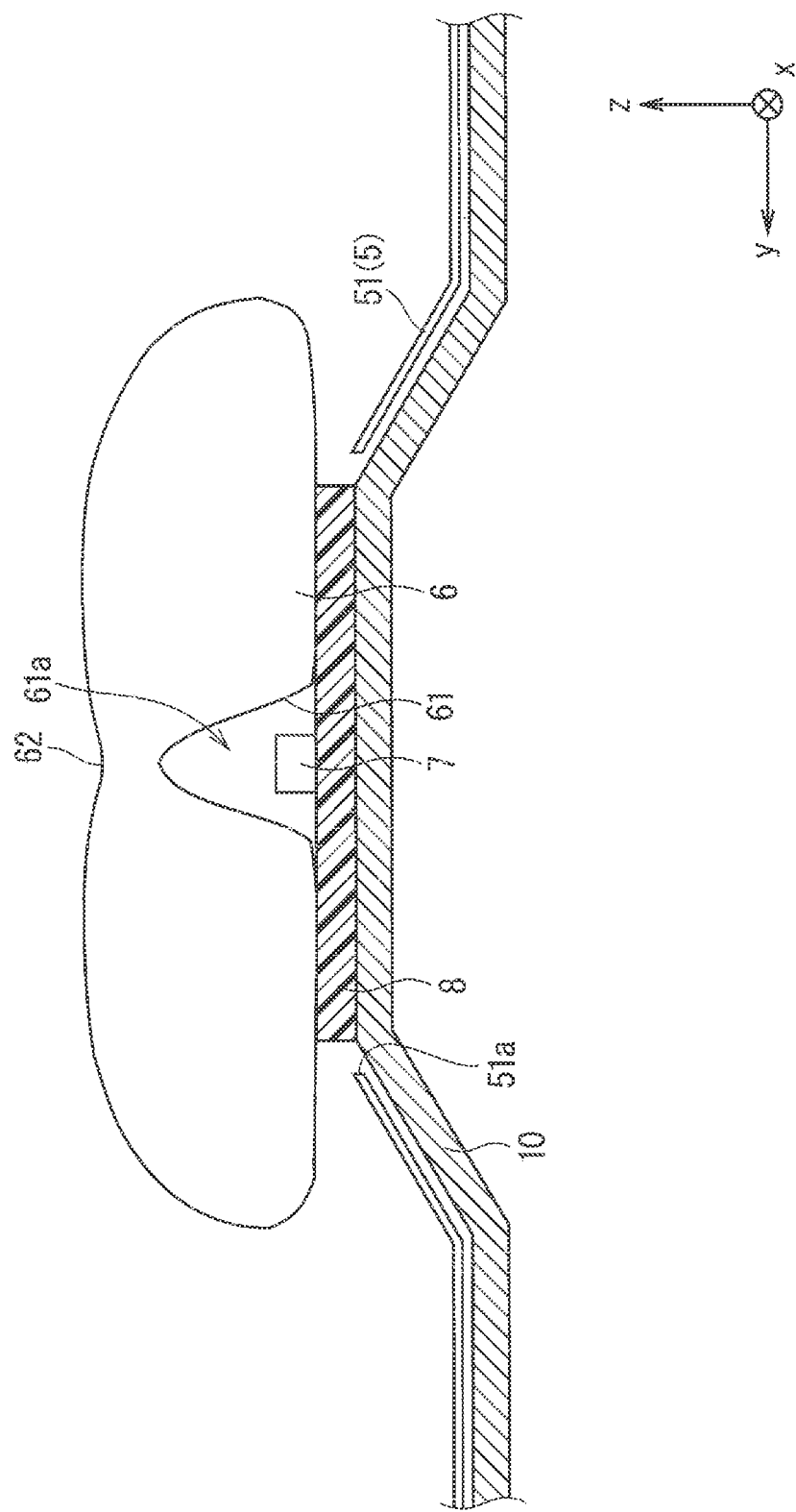
FIG. 9 is a configuration diagram of a configuration around a light source of a planar light source device according to a modification example 2 of the embodiment 1 viewed from the y-z plane.

Next, the modification example 2 of the embodiment 1 is described. FIG. 9 is a configuration diagram of a configuration around the light source 7 of the planar light source device 200 according to the modification example 2 of the embodiment 1 viewed from the y-z plane.

As illustrated in FIG. 9, in the modification example 2 of the embodiment 1, the part in the reflection part 5 corresponding to the light distribution control element 6 is formed to have a shape being inclined to a side opposite to the display surface 1a toward a direction away from the light source 7. More specifically, the part in the case 10 corresponding to the holding substrate 8 protrudes in the +z-axis direction. Furthermore, the part of the bottom surface 51 of the reflection part 5 and the case 10 corresponding to the both ends of the light distribution control element 6 in the y-axis direction is formed to have a shape being inclined in the −z-axis direction toward the direction away from the light source 7. Herein, the hole part 51a of the bottom surface 51 is located in the bottom surface in the case 10 protruding in the +z-axis direction.

It is also applicable that the case 10 does not protrude in the +z-axis direction but the light source 7 is raised by an aluminum plate or the like in the +z-axis direction to increase a distance between the case 10 and the light source 7 in the z-axis direction.

As described above, in the planar light source device 200 according to the modification example 2 of the embodiment 1, the part in the reflection part 5 corresponding to the light distribution control element 6 is formed to have the shape being inclined to the side opposite to the display surface 1a toward the direction away from the light source 7. Accordingly, the light which is reflected in the inner side of the light distribution control element 6 and travels in the −z-axis direction is reflected by the inclined part of the bottom surface 51 of the reflection part 5, thus the light can be expanded in such a direction that the reflection light component is away from the light source 7 compared with a case illustrated in. FIG. 7 where the bottom surface 51 of the reflection part 5 is parallel to the x-y plane. Accordingly, the distribution of the reflection light component can be further closer to even.

Embodiment 2

Next, a liquid crystal display device 101 and a planar light source device 201 according to the embodiment 2 are described. In the embodiment 2, the same reference numerals as those described in the embodiment 1 will be assigned to the same constituent element and the description thereof will be omitted. That is to say, a configuration other than the planar light source device 201 and the case 10 in FIG. 10, for example, is the same as the configuration in FIG. 1, so that the description of them is omitted.

(Configuration of the Planar Light Source Device)

Figure 10:
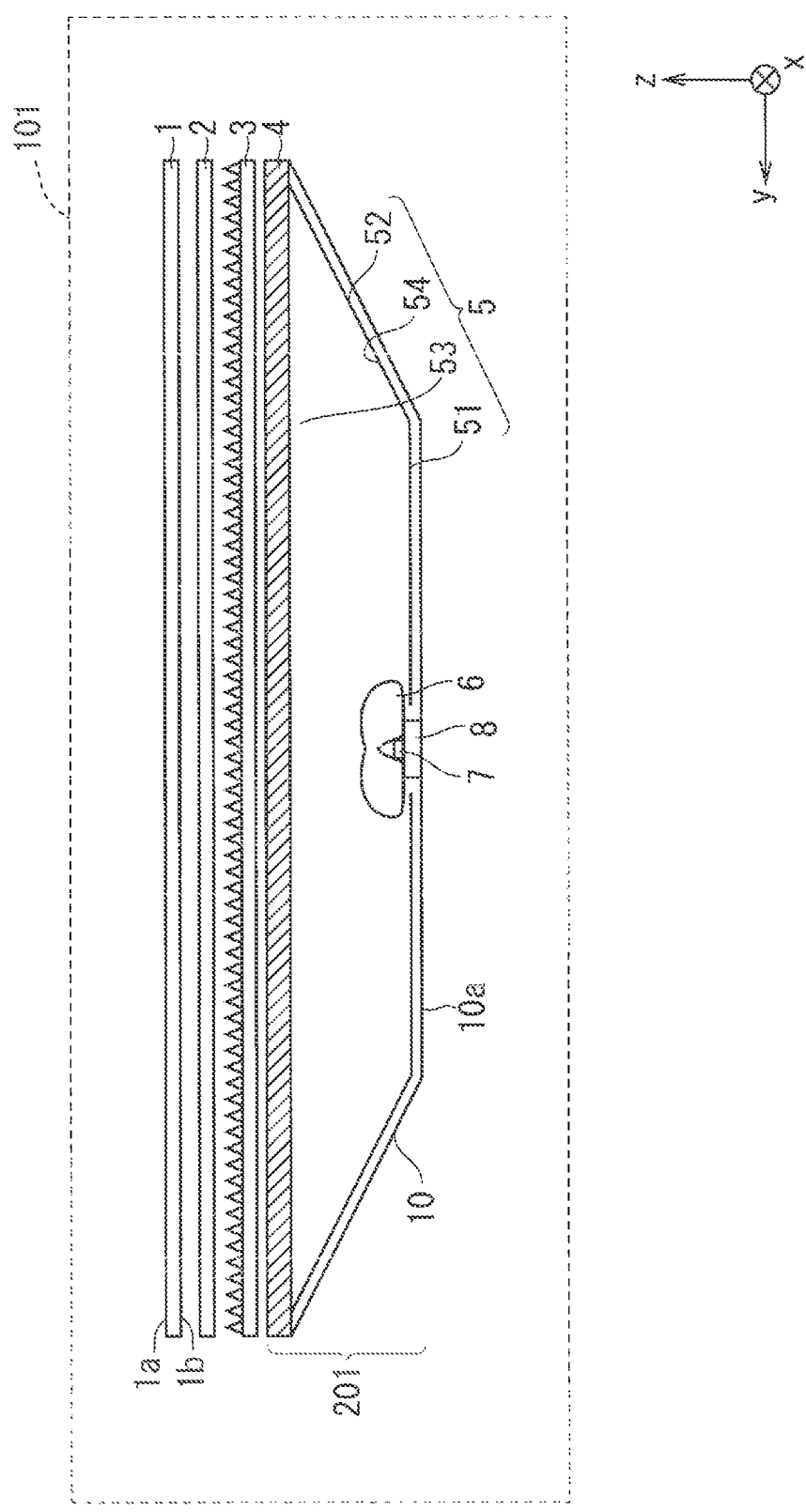
FIG. 10 is a cross-sectional view illustrating a configuration of a liquid crystal display device according to an embodiment 2.

FIG. 10 is a cross-sectional view illustrating a configuration of the liquid crystal display device 101 according to the embodiment 2. As illustrated in FIG. 10, the planar light source device 201 includes the light source 7, the holding substrate 8, a reflection body 9 (not shown in FIG. 10), the light distribution control element 6, and the reflection part 5. The reflection part 5 is formed to have a container shape so as to be able to house the light source 7, the reflection body 9, and the light distribution control element 6, and includes a reflection surface 54 and the opening part 53. The reflection body 9 corresponds to the second reflection part.

Figure 11:
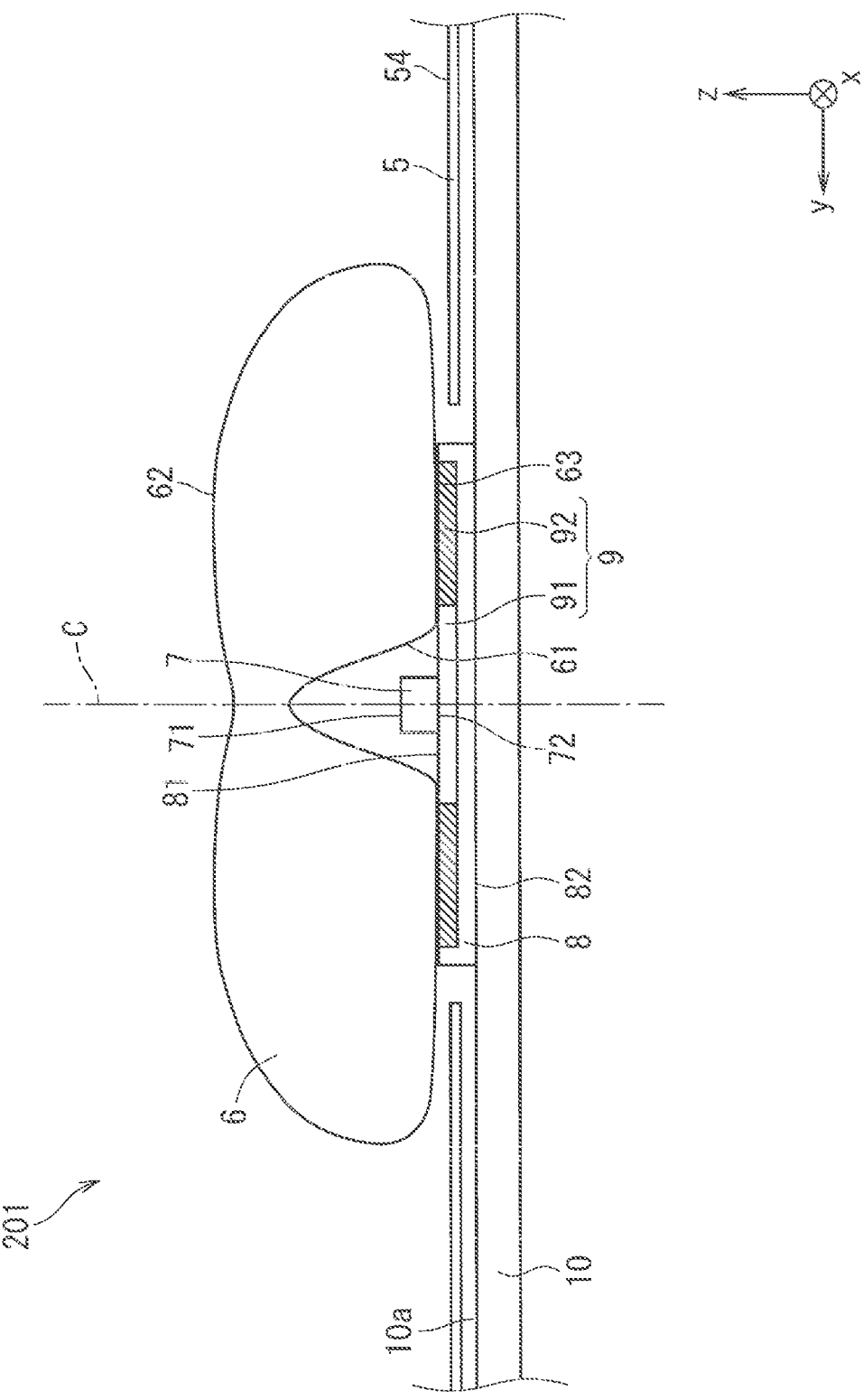
FIG. 11 is a cross-sectional view illustrating a configuration around a light source included in a planar light source device according to the embodiment 2.

FIG. 11 is a cross-sectional view enlarging an area surrounding the light source 7 of the planar light source device 201. The light source 7 is disposed on a main surface 81 of the holding substrate 8. The main surface 81 is an upper surface of the holding substrate 8, and is a mounting surface, for example. The planar light source device 201 further includes the reflection body 9 in a main surface 81 side of the holding substrate 8. The planar light source device 201 further includes the light distribution control element 6. The light distribution control element 6 is disposed in the main surface 81 side of the holding substrate 8 to cover the light source 7. The light distribution control element 6 has a mounting surface 63 which can be in direct contact with the reflection body 9. Although the mounting surface 63 is in contact with the reflection body 9 in FIG. 11, it needs not be necessarily in contact with the reflection body 9, but a gap may be provided between the mounting surface 63 and the reflection body 9 or between the mounting surface 63 and the main surface 81. A detailed configuration of the planar light source device 201 is described hereinafter.

(Holding Substrate)

Figure 12:
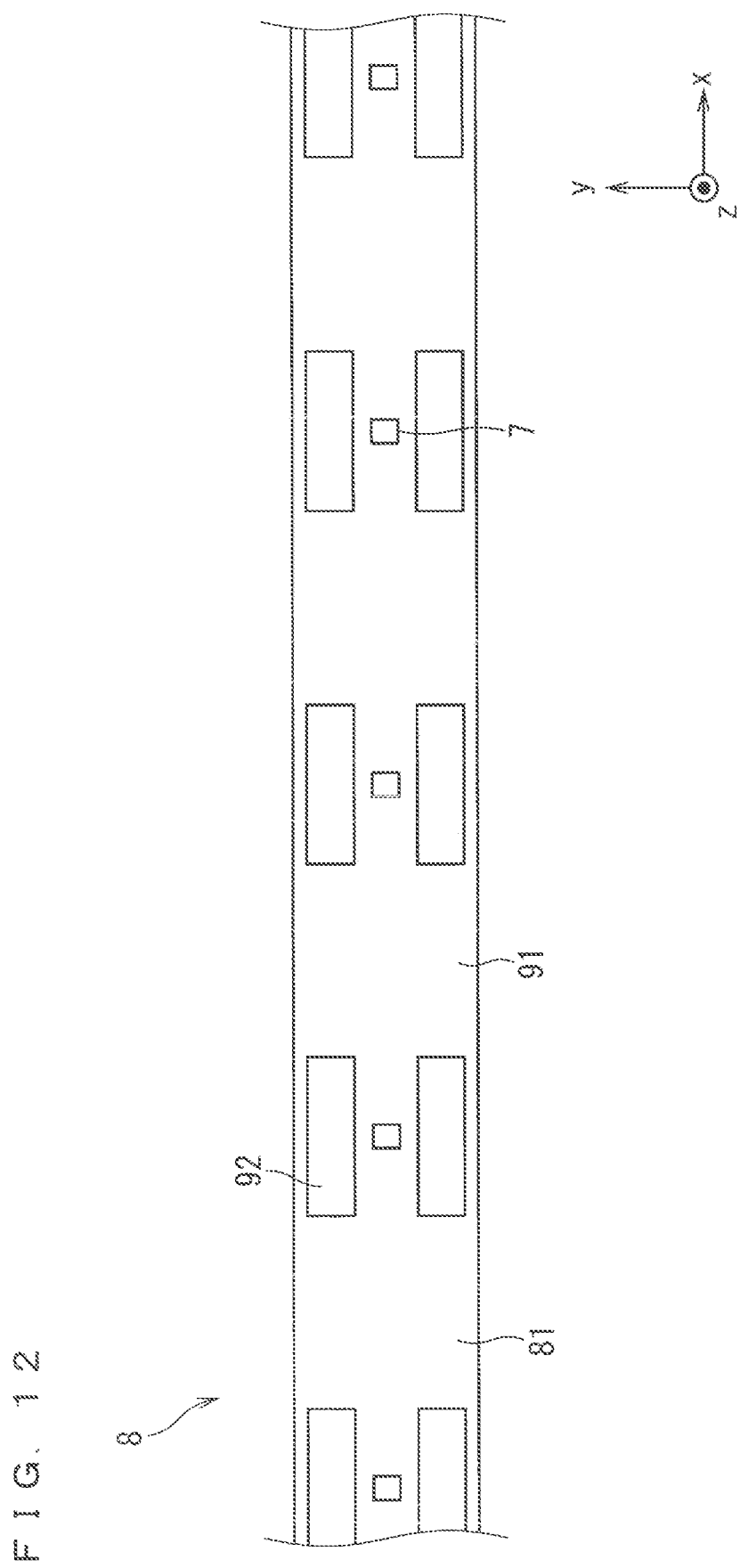
FIG. 12 is a diagram illustrating a holding substrate and a reflection body included in the planar light source device according to the embodiment 2.

FIG. 12 is a plan view of the main surface 81 of the holding substrate 8. The illustration of the light distribution control element 6 is omitted in FIG. 12. In the embodiment 2, the holding substrate 8 has a shape longer in a longitudinal direction of the liquid crystal panel 1, and has a rectangular shape in plan view. The holding substrate 8 has a plate shape. The main surface 81 of the holding substrate 8 includes a white resist layer or a white silk layer on a resist layer, for example. The main surface 81 has a function as the reflection surface. As illustrated in FIG. 11, the holding substrate 8 on which the light source 7, the reflection body 9, and the light distribution control element 6 are disposed is held by a bottom surface 10a of the case 10. A surface of the holding substrate 8 held by the bottom surface 10a of the case 10 is a rear surface 82 which is an opposite side of the main surface 81. The rear surface 82 is the surface of the holding substrate 8 in the −z-axis side. The rear surface 82 transfers heat generated in the light source 7 to the case 10 via the main surface 81, thereby radiating the heat. A heat radiation sheet may be disposed between the holding substrate 8 and the case 10 in the planar light source device 201, for example, to enhance a heat radiation effect, (Light Source)

The light source 7 is disposed on the main surface 81 of the holding substrate 8. As illustrated in FIG. 12, in the embodiment 2, the plurality of light sources 7 are disposed on the main surface 81 in a line at a predetermined interval. Its arrangement direction is parallel to the longitudinal direction of the liquid crystal panel 1, that is to say, the x-axis direction. As illustrated in FIG. 11, a rear surface 72 which is a surface of the light source 7 in the −z-axis side is in contact with the main surface 81 of the holding substrate 8. Thereby, the light source 7 is held by the holding substrate 8. Power is supplied to the light source 7 via the rear surface 72. The light source 7 is electrically connected to the holding substrate 8. In the embodiment 2, the other surface different from the rear surface 72 forms a light emitting surface. For example, a surface 71 opposed to the rear surface 72 of the light source 7 forms a light emitting surface. Moreover, for example, when the light source 7 has a rectangular parallelepiped shape, five surfaces different from the rear surface 72 form the light emitting surfaces.

(Light Distribution Control Element)

The light distribution control element 6 is disposed in the main surface 81 side of the holding substrate 8 to cover the light source 7. That is to say, the light distribution control element 6 is disposed in the +z-axis direction side of the light source 7 to cover the light source 7. The light distribution control element 6 has the mounting surface 63 which can be in direct contact with the reflection body 9.

The light distribution control element 6 according to the embodiment 2 has a rod-like shape. Thus, the planar light source device 200 can include the light distribution control element 6 which is smaller in number than the light source 7 for the plurality of light sources 7 arranged in a line. For example, one light distribution control element 6 is included in the embodiment 2. As described above, when the light distribution control element 6 has the rod-like shape, the number of light distribution control elements 6 used in the planar light source device 201 can be reduced. Moreover, only one light distribution control element 6 needs to be fixed to the plurality of light sources 7 arranged in a row in the attachment process, thus the fixing operation such as the attachment can be easily performed.

The light distribution control element 6 having the rod-like shape can be manufactured by an extrusion molding. According to the method of manufacturing the light distribution control element 6 by the extrusion molding, the length of the light distribution control element 6 can be freely changed. Even when the size of the liquid crystal display device 100 is different, for example, the light distribution control element 6 only whose length is changed can be manufactured using the same mold. Since the mold of the light distribution control element 6 needs not be changed in accordance with the increase or decrease in the number of light sources 7, the light distribution control element 6 has the high versatility to the change of specification of the planar light source device 201. Moreover, the planar light source device 201 enables the adjustment of the brightness of the light source 7 only by changing the number of light sources 7. Thus, the planar light source device 201 having the appropriate number and arrangement of light sources 7 can be manufactured.

(Reflection Body)

Figure 13:
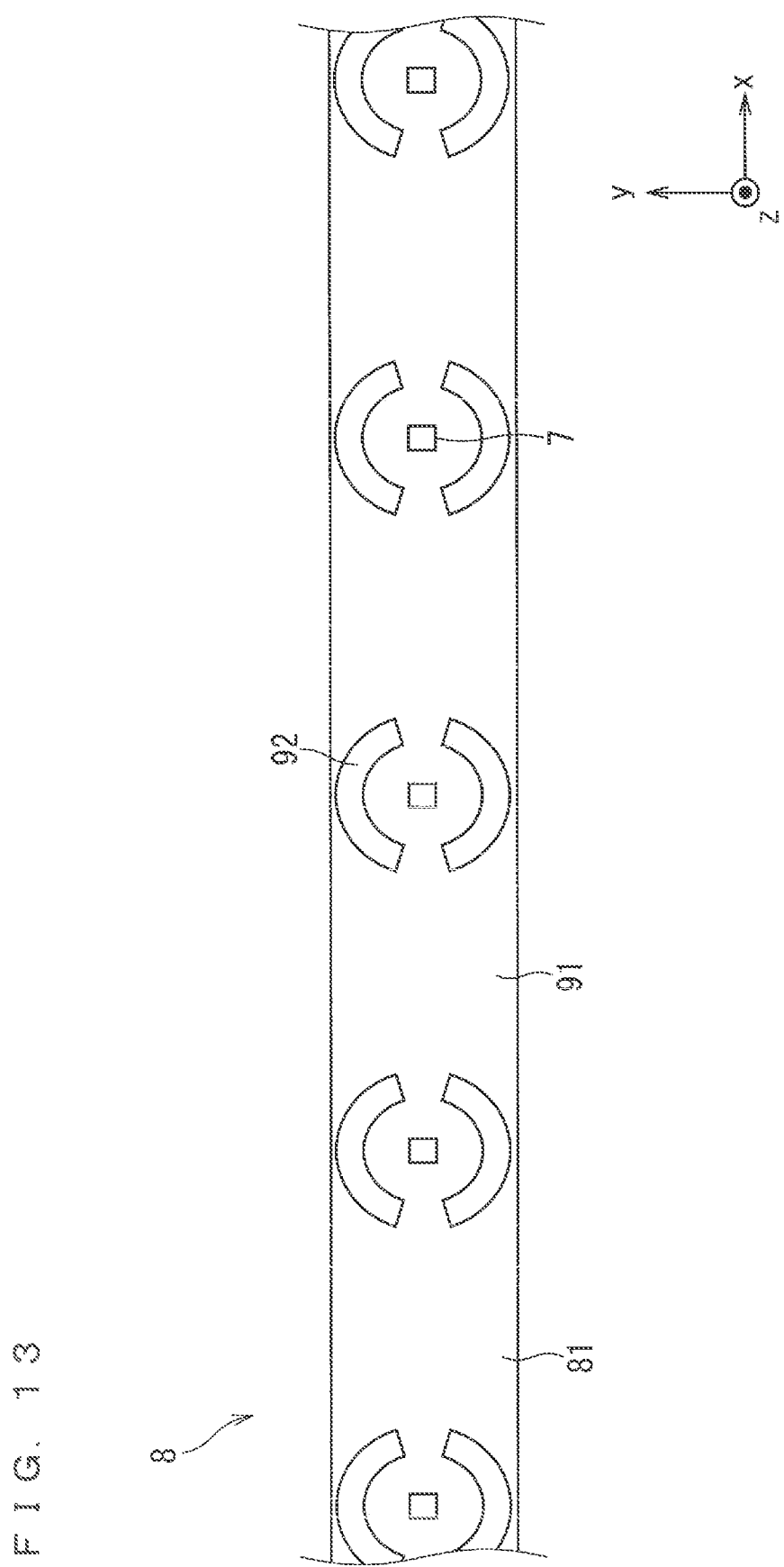
FIG. 13 is a diagram illustrating the holding substrate and the reflection body included in the planar light source device according to the embodiment 2.
Figure 14:
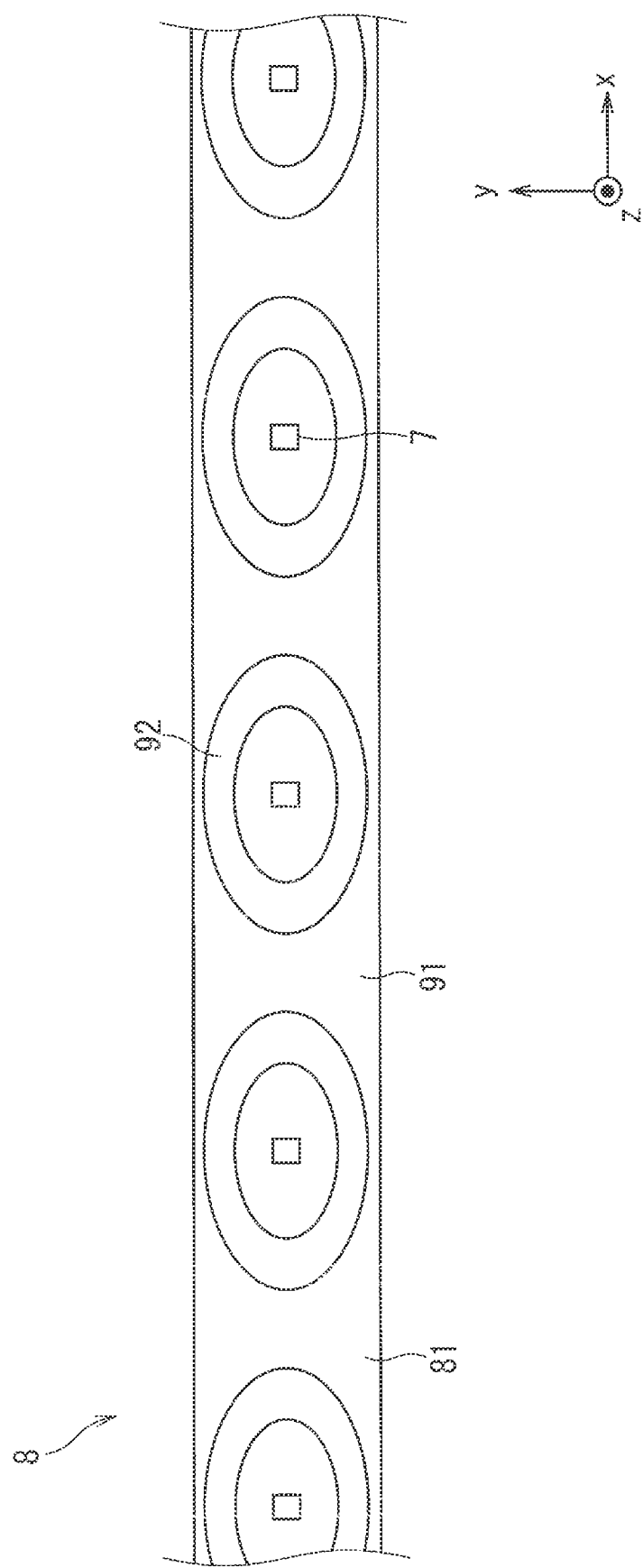
FIG. 14 is a diagram illustrating the holding substrate and the reflection body included in the planar light source device according to the embodiment 2.

As illustrated in FIG. 11, the reflection body 9 is disposed in the main surface 81 side of the holding substrate 8. The reflection body 9 includes a first reflection region 91 and a second reflection region 92. In the embodiment 2, the first reflection region 91 and the second reflection region 92 are formed in the main surface 81 of the holding substrate 8. Although the mounting surface 63 is in contact with the reflection body 9 in FIG. 11, it needs not be necessarily in contact with the reflection body 9, but a gap may be provided between the mounting surface 63 and the reflection body 9. The second reflection region 92 is provided to correspond to the mounting surface 63 included in the light distribution control element 6. The second reflection region 92 faces the mounting surface 63. As illustrated in FIG. 12, the second reflection region 92 has a rectangular shape in plan view and is provided on both sides of each light source 7. Since its shape and arrangement described above is one example, the second reflection region 92 may have a circular shape as illustrated in FIG. 13 or may have an oval shape as illustrated in FIG. 14, for example.

A reflectance of the second reflection region 92 is lower than that of the first reflection region 91. A difference between the reflectance of the first reflection region 91 and the second reflection region 92 is made by adjusting a configuration of the resist layer of the main surface 81 such as a composition or a thickness thereof, for example. Alternatively, the second reflection region 92 may be formed by providing a material having the different reflectance or a convex-concave portion on the surface of the resist layer, for example. The second reflection region may also be formed by providing a sheet-like component having a reflectance lower than that of the main surface 81 on the main surface 81, for example. In the embodiment 2, the first reflection region 91 is the main surface 81 itself of the holding substrate 8, and the second reflection region 92 is a region whose reflectance is set lower than the main surface 81. The second reflection region 92 may be a region whose light absorptivity (light absorption coefficient) is set higher than the first reflection region 91. In the above case, the second reflection region 92 is preferably a complete absorption band in a light emitting wavelength band of the light source 7.

(Reflection Part)

Figure 15:
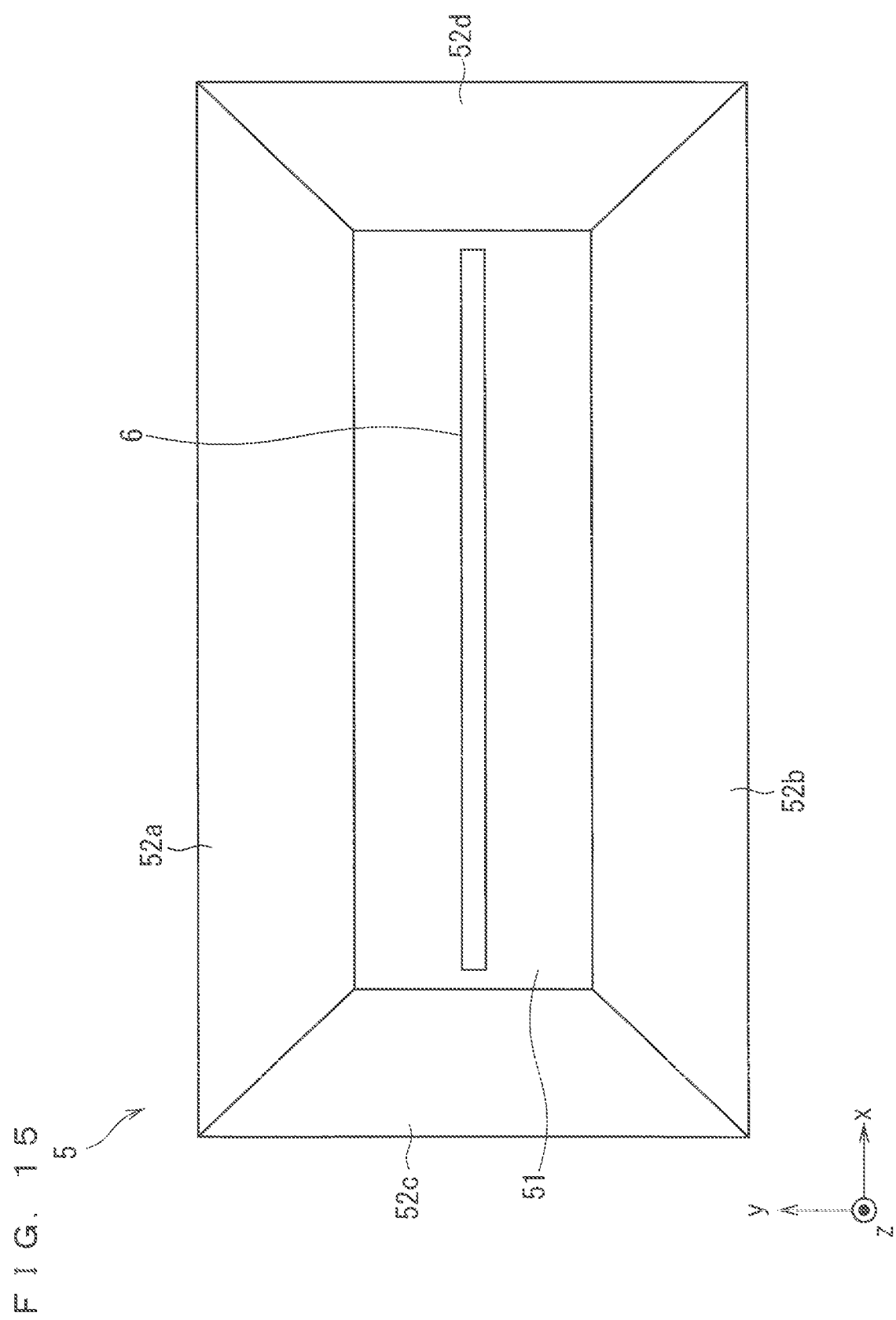
FIG. 15 is a diagram illustrating the reflection body included in the planar light source device according to the embodiment 2.

As illustrated in FIG. 10, the planar light source device 201 includes the reflection part 5. The reflection part 5 has a container shape so as to be able to house the light source 7, the reflection body 9, and the light distribution control element 6. FIG. 15 is a plan view of the planar light source device 201. The illustration of the diffusion plate 4 is omitted in FIG. 15. As illustrated in FIG. 10 and FIG. 15, the reflection part 5 includes the bottom surface 51 and four side surfaces 52 (side surfaces 52a, 52b, 52c, and 52d) connected to the bottom surface 51. That is to say, the reflection part 5 includes five surfaces. The light source 7 and the light distribution control element 6 held by the holding substrate 8 are disposed in the surface of the bottom surface 51. The reflection part 5 further includes the reflection surface 54 and the opening part 53. The opening part 53 of the reflection part 5 is disposed in a side opposite to the bottom surface 51. The bottom surface 51 has a rectangular shape smaller than a rectangular shape of the diffusion plate 4. The bottom surface 51 is disposed to be parallel to the diffusion plate 4, that is to say, parallel to the light outputting surface. The side surface 52 connects an outer periphery of the bottom surface 51 and an outer periphery of the diffusion plate 4. That is to say, the four side surfaces 52 are inclined from the outer periphery of the bottom surface 51 toward the outer periphery of the diffusion plate 4.

The shape of the reflection part 5 is described by an xyz coordinate axis hereinafter. The two side surfaces 52a and 52b, in the four side surfaces 52, connected to sides of the bottom surface 51 parallel to the x-axis direction are inclined so that a distance therebetween increases toward the +z-axis direction. That is to say, the side surface 52a in the +y-axis direction side is inclined in the anticlockwise direction around the connection part between the y-z plane and the bottom surface 51 viewed from the −x-axis direction. The side surface 52b in the −y-axis direction side is inclined in the clockwise direction around the connection part between the y-z plane and the bottom surface 51 viewed from the −x-axis direction. The two side surfaces 52c and 52d, in the four side surfaces 52, connected to sides of the bottom surface 51 parallel to the y direction are also inclined so that a distance therebetween increases toward the +z-axis direction. That is to say, the side surface 52c in the −x-axis direction side is inclined in the anticlockwise direction around the connection part between the z-x plane and the bottom surface 51 viewed from the −y-axis direction. The side surface 52d in the +x-axis direction side is inclined in the clockwise direction around the connection part between the z-x plane and the bottom surface 51 viewed from the −y-axis direction. The opening part 53 is formed in the +z-axis direction facing the bottom surface 51 of the reflection part 5. The reflection part 5 and the diffusion plate 4 form a hollow container shape. Moreover, as illustrated in FIG. 11, a part of the reflection part 5 is sandwiched between the light distribution control element 6 and the case 10 in a position of both sides of the holding substrate 8.

As illustrated in FIG. 10 and FIG. 11, the inner surface of the reflection part 5 has the reflection surface 54. That is to say, the inner surface of the reflection part 5 is made up of a member reflecting the light. The reflection part 5 is a reflection sheet which is a sheet-like member, for example. The reflection surface 54 of the reflection part 5 may be a diffuse reflection surface, for example. The reflection part 5 is a light reflection sheet having a resin such as polyethylene terephthalate as a base member or a light reflection sheet formed by evaporating a metal on a surface of a substrate, for example.

Figure 16:
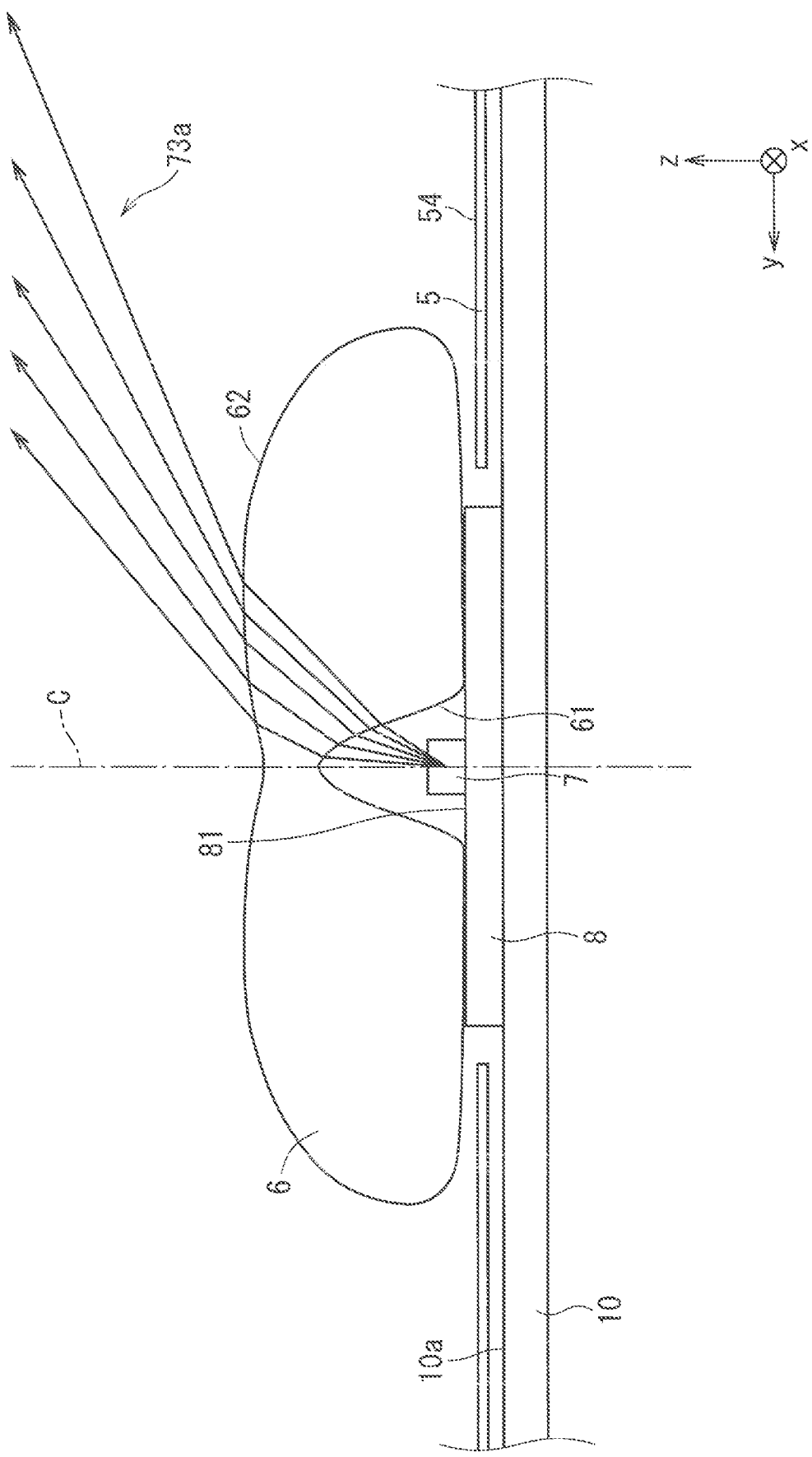
FIG. 16 is a diagram illustrating a light beam emitted from a light source of a planar light source device which does not include a reflection body.

A planar light source device which does not include the reflection body 9 is described as an example before describing the action and effect of the planar light source device 201 according to the embodiment 2. FIG. 16 is a cross-sectional view around the light source 7 of the planar light source device which does not include the reflection body 9. FIG. 16 includes an illustration of a light beam 73a which is part of the light beam emitted from the light source 7 in the +z axis direction side to expand only on the y-z plane. The light beam 73a is a light beam emitted from the light source 7 at a narrow angle with the light axis C. The light beam 73a emitted from the light source 7 is refracted by the light incident surface 61 and then enters the light distribution control element 6. In accordance with Snell's law, when the light beam enters a medium having a large refraction index from a medium having a small refraction index, a refracting angle of the light beam is smaller than an incident angle of the light beam. When the light beam enters a medium having a small refraction index from a medium having a large refraction index, a refracting angle of the light beam is larger than an incident angle of the light beam. When the light distribution control element 6 is made of an acrylic resin as illustrated in FIG. 16, the light beam 73a is refracted by the light incident surface 61 in the −y-axis direction side. The light beam 73a travels in the inner side of the light distribution control element 6 and subsequently reaches the light outputting surface 62.

Figure 17:
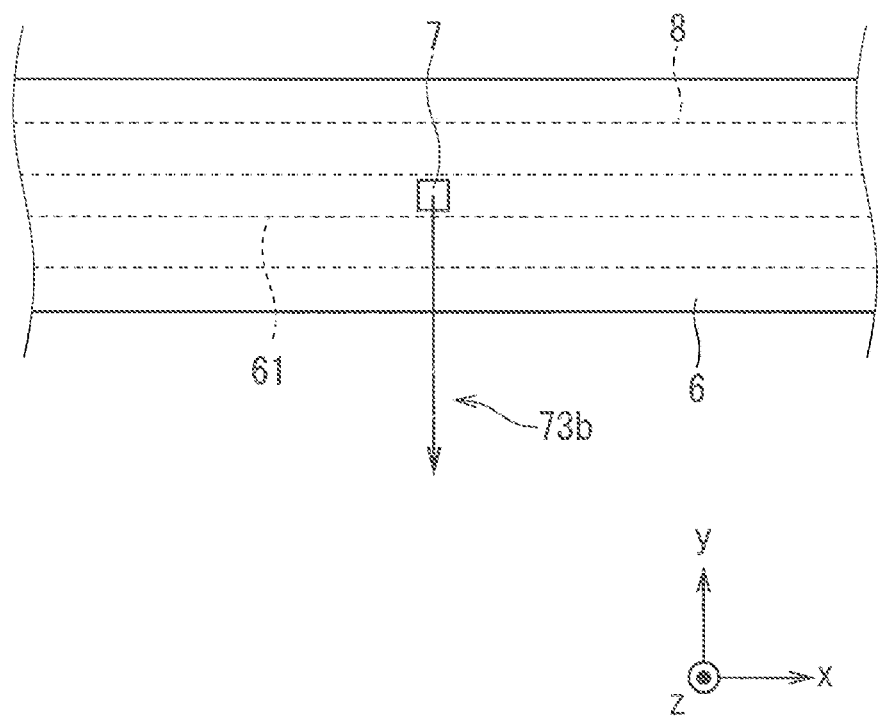
FIG. 17 is a diagram illustrating the light beam emitted from the light source of the planar light source device which does not include the reflection body'.

The light beam 73a is refracted by the light outputting surface 62 having a convex surface in such a direction that an angle with the light axis C further increases, that is to say, in the −y-axis direction side. FIG. 17 is a plan view of the light distribution control element 6 observing the x-y plane from the +z-axis side. FIG. 17 includes an illustration of a light beam 73b which is part of the light beam emitted from the light source 7. The light beam 73b is a light beam having an angle with the light axis C larger than that of the light beam 73a in the light beam emitted from the light source 7 to expand only on the y-z plane. The light beam expanding only on the y-z plane means the light beam expanding only in the vertical direction in FIG. 17. As illustrated in FIG. 16 and FIG. 17, the light distribution control element 6 diffuses the light emitted from the light source 7. The light beam 73a or 73b emitted from the light distribution control element 6 reaches the diffusion plate 4. Although the illustration of each light beam is omitted, part of the light beam reaching the diffusion plate 4 illustrated in FIG. 10 is reflected and then travels in the space having the container shape of the reflection part 5. The light beam is reflected by the bottom surface 51 or the side surface 52 of the reflection part 5, and then reaches the diffusion plate 4 again. The light is diffused while going through the diffusion plate 4. The light which has gone through the diffusion plate 4 becomes a planar illumination light having evenness. The rear surface 1b of the liquid crystal panel 1 is irradiated with this illumination light via the optical sheet 3 and the optical sheet 2.

Figure 18:
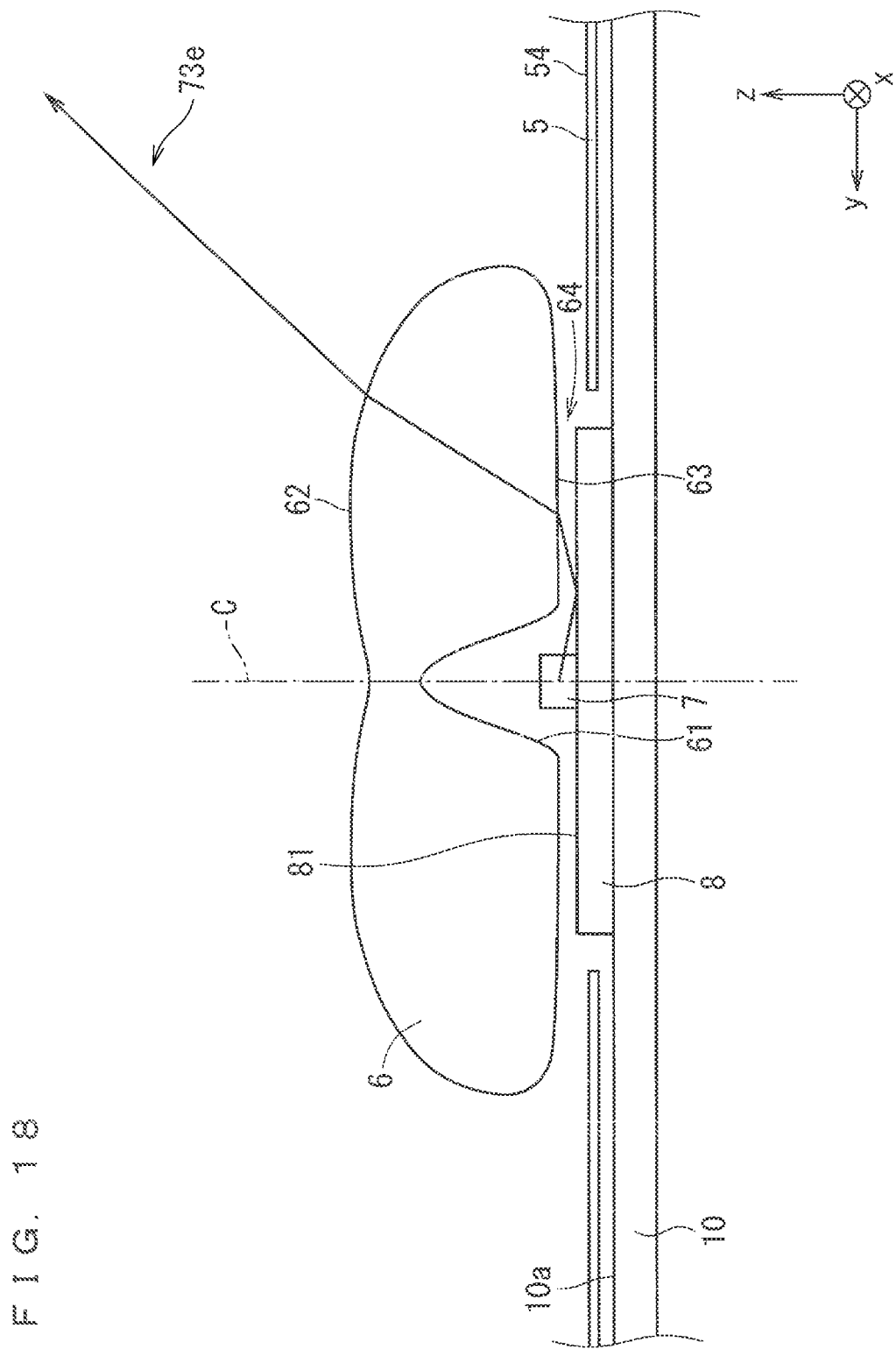
FIG. 18 is a diagram illustrating the light beam emitted from the light source of the planar light source device which does not include the reflection body.

FIG. 18 is a view illustrating a cross section around the light source 7 of the planar light source device which does not include the reflection body 9. The planar light source device illustrated in FIG. 18 indicates a state where an error occurs in an arrangement position of the light distribution control element 6 with respect to the holding substrate 8. That is to say, a gap 64 is located between the light distribution control element 6 and the holding substrate 8. Since the light source 7 is mounted on the holding substrate 8, the misalignment of the light distribution control element 6 with respect to the holding substrate 8 means that a positional relationship between the light distribution control element 6 and the light source 7 is also misaligned. When the gap 64 occurs between the light distribution control element 6 and the holding substrate 8, the light beam 73e which is the part of the light emitted from the light source 7 enters the gap 64. The light beam 73e is reflected by the main surface 81 of the holding substrate 8, and then enters from the mounting surface 63 of the light distribution control element 6. Subsequently, the light beam 73e is emitted from the light outputting surface 62 of the light distribution control element 6. In the above case, a curvature of the mounting surface 63 from which the light beam 73e enters and a curvature of the light outputting surface 62 have a relationship to function as a convex lens. Thus, the light beam 73e emitted from the light outputting surface 62 is collected, and a focal line occurs. The focal line is formed on an irradiated surface (on the diffusion plate 4 or the rear surface 1b, for example) depending on a relationship between the curvature of the mounting surface 63 and the light outputting surface 62. When the error occurs in the arrangement position of the light distribution control element 6 with respect to the holding substrate 8, the evenness of the illumination light decreases. Even when a variation occurs in the arrangement position of each member constituting the planar light source device, the distribution of the light on the irradiated surface is preferably even.

(Action of Reflection Body)

Figure 19:
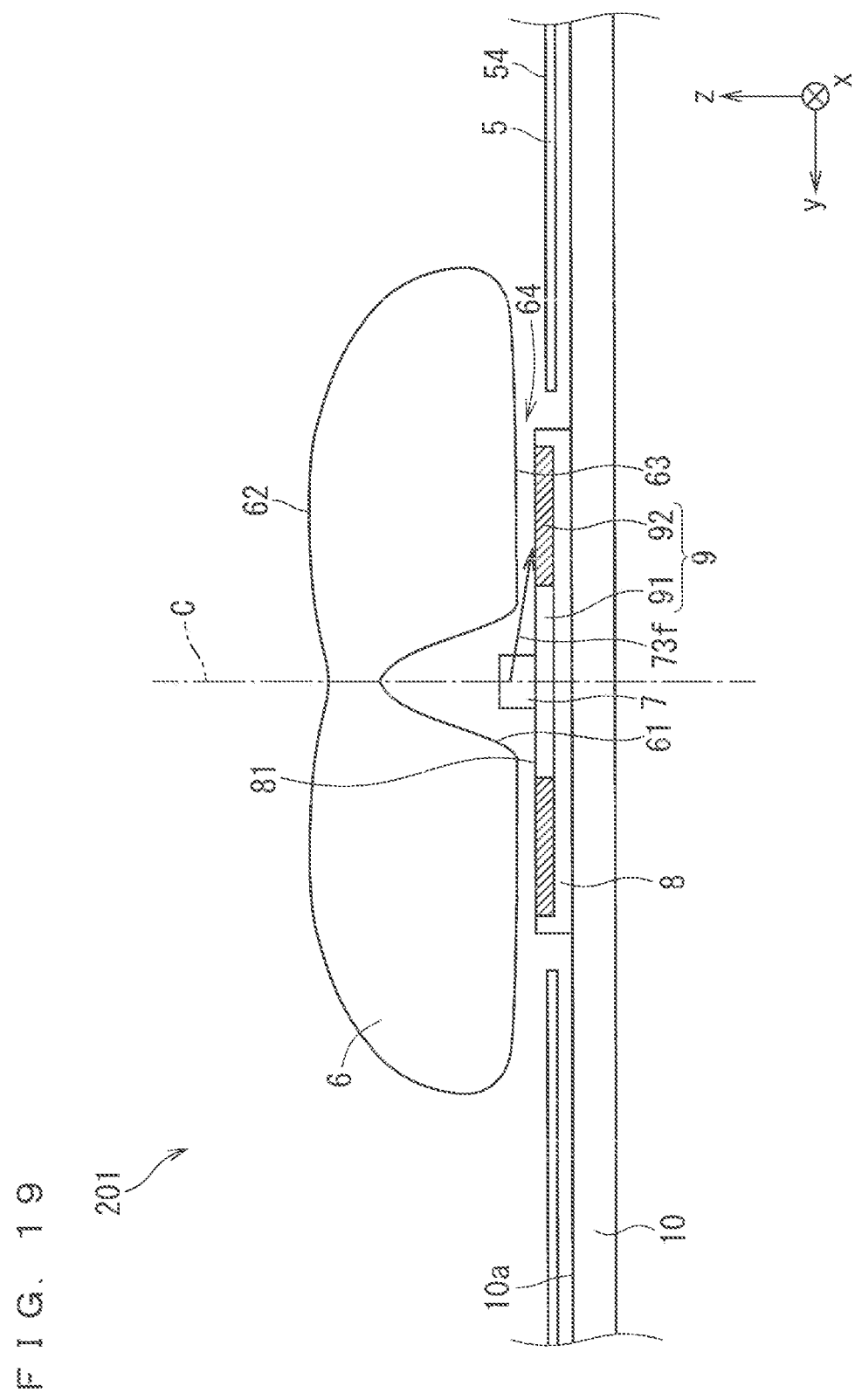
FIG. 19 is a diagram illustrating the light beam emitted from the light source of the planar light source device according to the embodiment 2.

In order to solve the problem included in the planar light source device which does not include the above reflection body 9, that is to say, the decrease in the evenness of the illumination light caused by the misalignment of the light distribution control element 6, the planar light source device 201 according to the embodiment 2 includes the second reflection region 92 as illustrated in FIG. 11. The second reflection region 92 faces the mounting surface 63. In FIG. 11, the mounting surface 63 is in contact with the reflection body 9, particularly with the second reflection region 92. In the meanwhile, as illustrated in FIG. 19, the gap 64 may be provided between the mounting surface 63 and the reflection body 9. For example, the gap 64 is formed when the arrangement position of the light distribution control element 6 is shifted in the +z-axis direction in a process of manufacturing the planar light source device 201. A light beam 73f which has been emitted from the light source 7 and then entered the gap 64 enters the second reflection region 92. Since the reflectance of the second reflection region 92 is lower than that of the first reflection region 91 around the second reflection region 92, the light beam 73f is hardly reflected. As a result, the light beam which goes through the light path causing the focal line described above is reduced compared with the case where the second reflection region 92 is not disposed. When the second reflection region 92 has a higher light absorptivity (light absorption coefficient) than the first reflection region 91, the light beam which goes through the light path causing the focal line is further reduced.

The second reflection region 92 is provided in the region on the main surface 81 which the light beam enters in the planar light source device 201 according to the embodiment 2 when the arrangement position of the light distribution control element 6 is shifted in the +z-axis direction. Thus, the planar light source device 201 can reduce the light beam which causes the occurrence of the unevenness of the brightness distribution on the irradiated surface. That is to say, the planar light source device 201 has a larger tolerance for the misalignment than the configuration which does not include the reflection body 9 with regard to the arrangement position of the light distribution control element 6 with respect to the holding substrate 8. That is to say, the planar light source device 201 can enhance its robustness.

To summarize the above, the planar light source device 201 according to the embodiment 2 includes the light source 7, the holding substrate 8 which holds the light source 7 on the main surface 81, the reflection body 9 disposed in the main surface 81 side of the holding substrate 8, the light distribution control element 6 disposed in the main surface 81 side of the holding substrate 8 to cover the light source 7 and changing the distribution of the light emitted from the light source 7, and the diffusion plate 4 diffusing the light emitted from the light distribution control element 6. The light distribution control element 6 has the mounting surface 63 which can be in direct contact with the reflection body 9. The reflection body 9 includes the first reflection region 91 and the second reflection region 92 having the lower reflectance than the first reflection region 91. The second reflection region 92 is provided to correspond to the mounting surface 63 of the light distribution control element 6. According to the above configuration, the planar light source device 201 can enhance the evenness of the planar light using both the light beam which goes through the light outputting surface 62 of the light distribution control element 6 and the light beam reflect by the light outputting surface 62. Furthermore, the planar light source device 201 can enhance the robustness with regard to the arrangement position of the light distribution control element 6 with respect to the holding substrate 8. The planar light source device 201 emits the planar light having the brightness distribution with a high degree of evenness. Thus, the planar light source device 201 can be used as the illumination device used for the illumination of the room, for example, other than the backlight of the liquid crystal display device 100. The planar light source device 201 can be also used for the advertisement display device illuminating the picture or the like from the rear surface side, for example.

The second reflection region 92 in the planar light source device 201 according to the embodiment 2 has the higher light absorptivity than the first reflection region 91. According to the above configuration, even when the error occurs in the arrangement position of the light distribution control element 6 and the gap 64 is thereby formed between the main surface 81 of the holding substrate 8 and the light distribution control element 6, the light beam which has entered the gap 64 enters the second reflection region 92 having the higher light absorptivity than the first reflection region 91. The light beam entering the second reflection region 92 is absorbed, thereby being hardly reflected. As a result, the planar light source device 201 can reduce the occurrence of the focal line. That is to say, the planar light source device 201 can enhance the robustness with regard to the arrangement position of the light distribution control element 6 with respect to the holding substrate 8. Moreover, the planar light source device 201 can emit the planar light having the brightness distribution with a high degree of evenness.

The second reflection region 92 of the planar light source device 201 according to the embodiment 2 has the rectangular shape, the circular shape, or the oval shape in plan view of the holding substrate 8. According to the above configuration, the planar light source device 201 can have the most appropriate arrangement of the second reflection region 92 in accordance with the specification and arrangement configuration of the light source 7. Thus, the planar light source device 201 can reduce the occurrence of the focal line.

The planar light source device 201 according to the embodiment 2 further includes the plurality of light sources 7 arranged in a line on the main surface 81 of the holding substrate 8. The light distribution control element 6 has the rod-like shape along an arrangement direction of the plurality of light sources 7. The light distribution control element 6 includes light outputting surface 62 including the convex cylindrical surface which has the curvature in the short-length direction of the rod-like shape and the light incident surface 61 having the concave curved surface or the planar surface which extends in the longitudinal direction of the rod-like shape to cover the plurality of light sources 7. According to the configuration, the planar light source device 201 can include the light distribution control element 6 which is smaller in number than the light source 7. That is to say, the number of light distribution control elements 6 used in the planar light source device 201 can be reduced. Moreover, only the light distribution control element 6 which is smaller in number than the light source 7 needs to be fixed to the plurality of light sources 7 arranged in a line in the attachment process, thus the attachment operation can be easily performed. Furthermore, the light distribution control element 6 having the rod-like shape can be manufactured by the extrusion molding, thus the manufacturing cost of the planar light source device 201 can be reduced.

Moreover, the planar light source device 201 according to the embodiment 2 further includes the reflection part 5. The reflection part 5 includes the opening part 53 in which the diffusion plate 4 is disposed and the reflection surface 54. The reflection part 5 has the container shape so as to be able to house the light source 7, the reflection body 9, and the light distribution control element 6. The reflection surface 54 is disposed in the inner side of the container shape and reflects the light emitted from light distribution control element 6. The opening part 53 emits the light emitted from the light distribution control element 6 and the light reflected by the reflection surface 54 via the diffusion plate 4. According to the above configuration, the planar light source device 201 can emit the planar light having the further enhanced evenness.

Moreover, the liquid crystal display device 101 according to the embodiment 2 includes the planar light source device 201 and the liquid crystal panel 1. The liquid crystal panel 1 enters the planar light emitted from the diffusion plate 4 of the planar light source device 201, and then converts the planar light into the image light to emit it. According to the above configuration, the liquid crystal display device 101 can illuminate the liquid crystal panel 1 with the planar light source device 201 having the more enhanced evenness than ever before. As a result, the liquid crystal display device 101 can achieve a higher image quality than ever before.

(Modification Example of Light Distribution Control Element and Effect)

When the light beam enters a medium having a small refraction index from a medium having a large refraction index, a total reflection may occur at a boundary surface between the mediums. For example, when the material of the light distribution control element 6 is an acrylic resin (PMMA) having a refraction index of 1.49 and the medium in the outputting side, that is to say, the space having the container shape in the reflection part 5 is air, the light whose incident angle at the time of entering the light outputting surface 62 is larger than 42.1° satisfies a total reflection condition. As a result, the light beam is reflected toward a side of the holding substrate 8 or reflection part 5 in the light outputting surface 62. That is to say, the light beam is reflected in the −z-axis direction. The total reflection condition of the light beam propagating only on the y-z plane can be avoided by designing the shape of the light incident surface 61 and the shape of the light outputting surface 62 to cause the incident angle of the light beam to be 42.1° or smaller. As a result, the light beam can be expanded from the light outputting surface 62 toward the diffusion plate 4.

Figure 20:
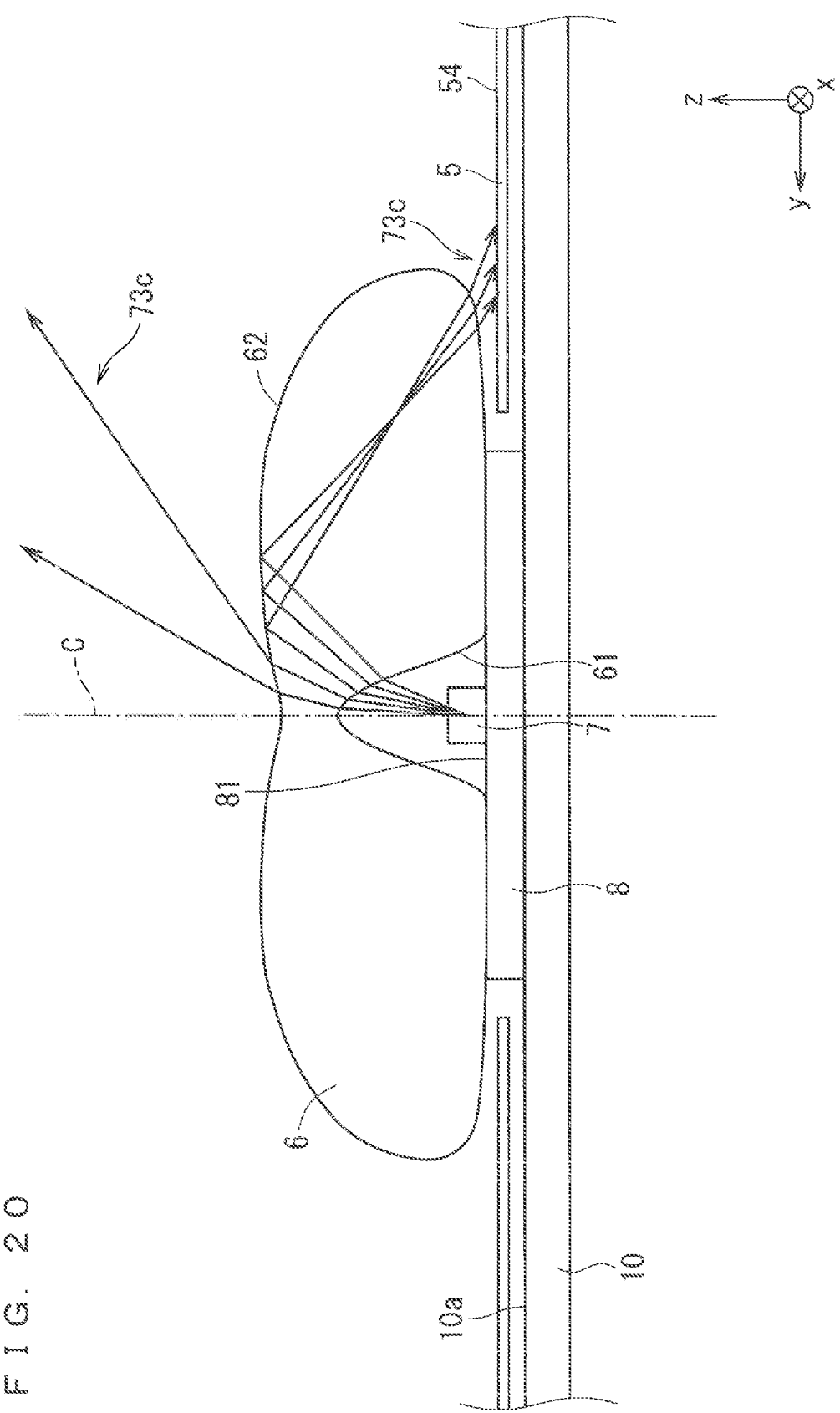
FIG. 20 is a diagram illustrating the light beam emitted from the light source of the planar light source device according to the embodiment 2.
Figure 21:
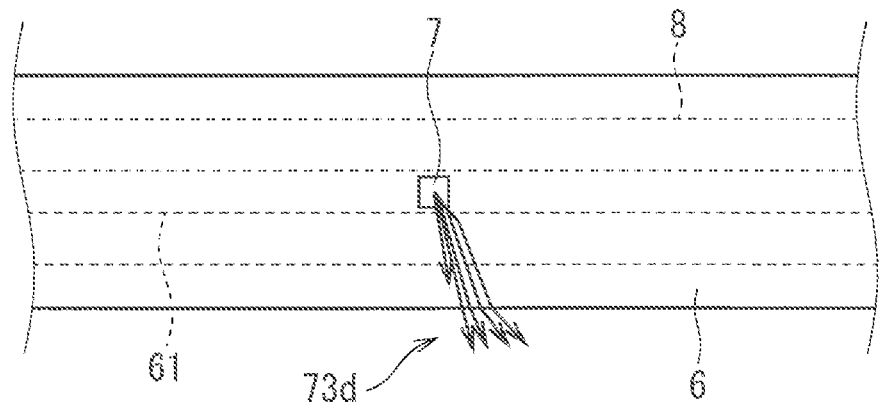
FIG. 21 is a diagram illustrating the light beam emitted from the light source of the planar light source device according to the embodiment 2.

FIG. 20 is a cross-sectional view around the light source 7 of the planar light source device. A light beam 73c illustrated in 20 also has an angular component expanding in the x-axis direction, that is to say, a vector component in the x-axis direction, differing from the light beam 73a illustrated in FIG. 16. FIG. 21 is a plan view of the light distribution control element 6 observing the x-y plane from the +z-axis side. FIG. 21 includes an illustration of a light beam 73d which is part of the light beam emitted from the light source 7. The light beam 73d has a vector component in the x-axis direction. The light beam having the angular component expanding in the x-axis direction means the light beam expanding in an oblique direction or parallel to the x axis in FIG. 21. The light beam 73c illustrated in FIG. 20 and the light beam 73d illustrated in FIG. 21 have a larger incident angle with the light outputting surface 62 than the light beam 73a propagating only on the y-z plane illustrated in FIG. 16. The reason is that the vector component in the x-axis direction is combined with the incident angle with the light outputting surface 62. Thus, the light beam having the large vector component in the x-axis direction easily satisfies the total reflection condition on the light outputting surface 62.

The light beam 73c which is totally reflected by the light outputting surface 62 travels in the −z-axis direction, and part of the light beam 73c is refracted by the bottom surface or part of the side surface of the light distribution control element 6, and then reaches the reflection part 5. Although the illustration is omitted, the light beam which has reached the reflection part 5 is diffusely reflected, and the part of the light beam enters the inner side of the light distribution control element 6 again, and the other light beam reaches the diffusion plate 4. The light beam 73a which has entered the inner side of the light distribution control element 6 is refracted by the light outputting surface 62 and is emitted. The light beam emitted from the light outputting surface 62 reaches the diffusion plate 4. The part of the light beam which is totally reflected by the light outputting surface 62 reaches the main surface 81 of the holding substrate 8. The light beam is reflected by the main surface 81 and then enters the inner side of the light distribution control element 6 again. Subsequently, the light beam is refracted by the light outputting surface 62 of the light distribution control element 6 and then reaches the diffusion plate 4.

As described above, the light beam emitted from the light source 7 and then reaches the diffusion plate 4 can be divided into the two components, that is to say, the direct light component and the reflection light component. The direct light component indicates the light beam, in the light beam emitted from the light source 7, refracted by the light distribution control element 6 and then directly reaching the diffusion plate 4. The reflection light component indicates the light beam which is totally reflected in the inner side of the light distribution control element 6, diffusely reflected by the reflection part 5, and then reaching the diffusion plate 4. Since the reflection light component includes the influence of the diffuse reflection by the reflection part 5, it is difficult to control its spatial brightness distribution using the light distribution control element 6. The planar light source device 201 needs to control the light distribution including the reflection light component so as to effectively use the light emitted from the light source 7, Moreover, the planar light source device 201 preferably controls a balance between the direct light component and the reflection light component using the light distribution control element 6 so as to obtain the illumination light having the even brightness distribution on the light outputting surface thereof. For example, the distribution of the direct light component needs to be adjusted to be uneven purposely in accordance with distribution of the reflection light component, using the light distribution control element 6.

In the above embodiment 2, the light distribution, control element 6 is the optical element having the rod-like shape and disposed to cover the plurality of light sources 7. However, the light distribution control element 6 is not limited to the rod-like optical element. The planar light source device 201 according to the present invention has the effect similar to the embodiment 2 even when one light distribution control element is attached to one light source. However, the planar light source device including the individual light distribution control element for each light source uses the large number of light distribution control elements. Moreover, each light distribution control element (lens) needs to be fixed to each light source, thus a total number of processes increases in the manufacturing process.

In the meanwhile, the planar light source device 201 described in the embodiment 2 can include the light distribution control element 6 which is smaller in number than the light source 7 for the plurality of light sources 7 arranged in a line. For example, only one rod-like light distribution control element 6 is applicable. As described above, the number of light distribution control elements 6 used in the planar light source device 201 can be reduced. Moreover, only one light distribution control element 6 needs to be fixed to the plurality of light sources 7 arranged in a row in the attachment process, thus the fixing operation such as the attachment can be easily performed.

Considered also is an adoption of an optical element which needs a positioning of a light source in the x direction or the y-direction such as a lens array in which a plurality of lenses are arranged on the x-y plane as the light distribution control element. However, a size of the optical element covering the light sources needs to be changed in accordance with an increase and decrease in the number of light sources. That is to say, a mold for manufacturing the optical element needs to be changed in accordance with an increase and decrease in the number of light sources. Thus, such an optical element has a low versatility to the change of specification of the planar light source device.

In the meanwhile, since the light distribution control element 6 according to the embodiment 2 has the rod-like shape, it can be manufactured by the extrusion molding. According to the method of manufacturing the light distribution control element 6 by the extrusion molding, the length of the light distribution control element 6 can be freely changed. Even when the size of the liquid crystal display device 101 is different, for example, the light distribution control element 6 only whose length is adjusted can be manufactured using the same mold. Since the mold of the light distribution control element 6 needs not be changed in accordance with the increase or decrease in the number of light sources 7, the light distribution control element 6 has the high versatility to the change of specification of the planar light source device 201. The brightness of the planar light source device 201 can be adjusted only by changing the number of light sources 7. Thus, the planar light source device 201 having the appropriate number and arrangement of light sources 7 can be manufactured.

Although the light distribution control element 6 is made of the transparent material in the embodiment 2, the material including the diffusion member may also be adopted. The light beam which has entered the light distribution control element 6 is diffused by the diffusion member, thereby changing its traveling direction. The traveling direction of the light beam which travels in the inner side of the light distribution control element 6 is changed to a random direction. The light beam whose traveling direction has been changed reaches the light outputting surface 62 of the light distribution control element 6. The wide area can be irradiated with the light emitted from the light outputting surface 62 of the light distribution control element 6.

The minute convex-concave shape can be formed in the light incident surface 61 or the light outputting surface 62 of the light distribution control element 6. The convex-concave shape needs not be formed in the entire region of the light incident surface 61 and the light outputting surface 62. For example, the convex-concave shape may also be formed only in the part of the region in the light incident surface 61. Moreover, for example, the convex-concave shape may also be formed only in the part of the region in the light outputting surface 62. That is to say, the convex-concave shape may have the configuration of being provided in the part of the region in the light incident surface 61 or the light outputting surface 62. It is not necessary to uniform the roughness of the convex-concave shape in the entire region. For example, the convex-concave shape of the light incident surface 61 may be made smaller than that of the light outputting surface 62.

The traveling direction of the light beam which enters the convex-concave shape is changed to the random direction. Thus, the light distribution control element 6 having the convex-concave shape can lessen the bright line. "The bright line" indicates the region which is linearly formed, with high brightness, on the light outputting surface (the diffusion plate 4) of the planar light source device 201. The convex-concave shape can lessen the brightness unevenness on the light outputting surface (the diffusion plate 4) of the planar light source device 200 occurring by arranging the plurality of light sources 7 side by side. That is to say, the convex-concave shape can lessen the difference between the bright part and the dark part. Moreover, the light distribution control element 6 can distribute the light to the wide area and irradiate there using the convex-concave shape.

However, the degree of light diffusion using the diffusion material or the convex-concave shape described above needs to be made smaller than the degree of refraction of the light beam on the light incident surface 61 and the light outputting surface 62. The reason is that when the diffusion member or the convex-concave shape has the dominant influence on the light diffusion, the refraction and distribution of the light beam as designed is made difficult on the light incident surface 61 and the light outputting surface 62 of the light distribution control element 6. The light distribution is directed to the light outputting surface of the planar light source device 201, that is to say, the diffusion plate 4 by the refraction depending on the shape of the light distribution control element 6. Thus, when the effect of the light diffusion using the diffusion member or the convex-concave shape increases, there is the possibility that the brightness increases near the arrangement position the light source 7 and decreases with the increasing distance from the light source.

Embodiment 3

Next, a planar light source device 202 according to the embodiment 3 and a liquid crystal display device including the planar light source device 202 are described.

In the embodiment 3, the same reference numerals as those described in the embodiments 1 and 2 will be assigned to the same constituent element and the description thereof will be omitted.

Figure 23A:
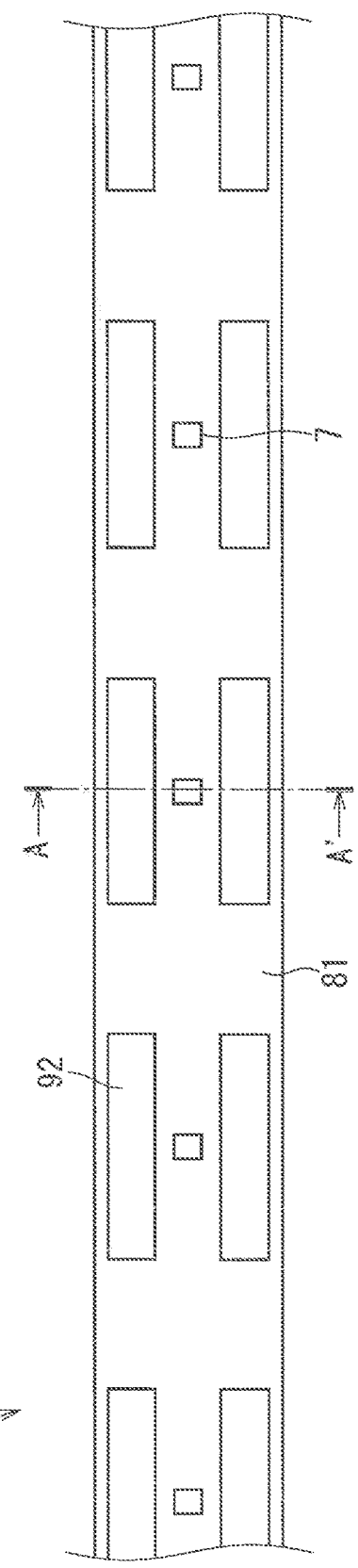
FIGS. 23A and 23B are diagrams illustrating a holding substrate and a reflection body included in the planar light source device according to the embodiment 3.
Figure 23B:
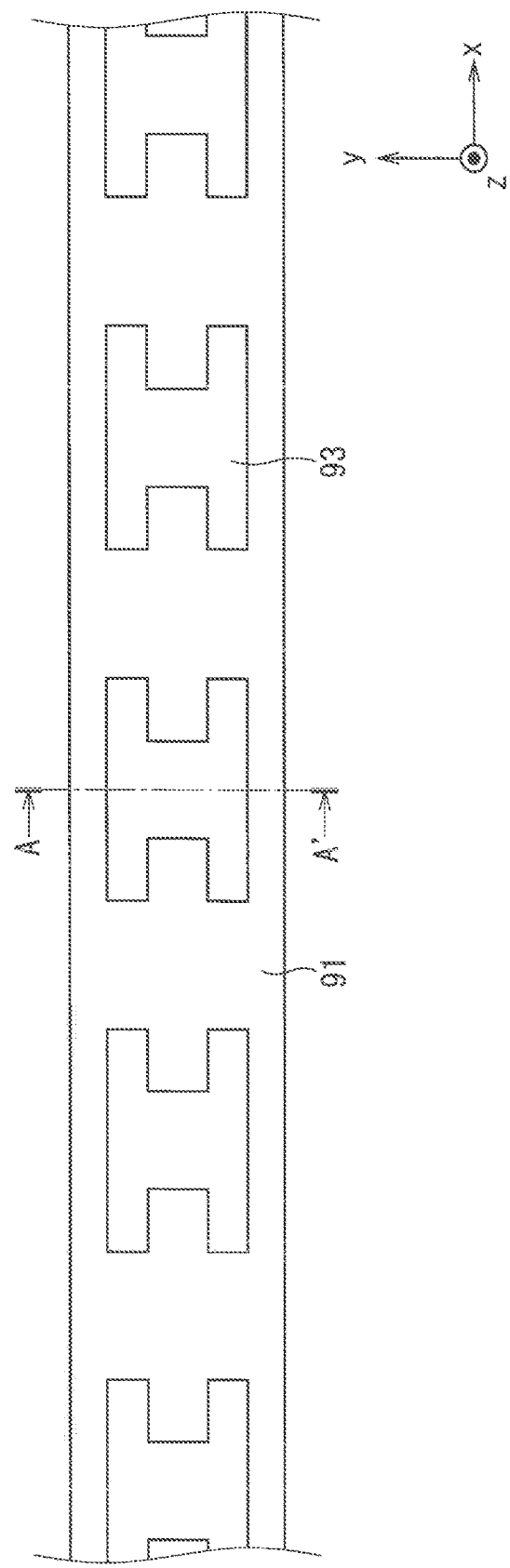

FIG. 22 is a cross-sectional view illustrating a configuration around the light source 7 of the planar light source device 202 according to the embodiment 3. The planar light source device 202 includes the first reflection region 91 between the light distribution control element 6 and the holding substrate 8. FIG. 23A is a plan view of the main surface 81 of the holding substrate 8, and FIG. 23B is a plan view of the first reflection region 91. FIG. 22 described above illustrates a cross section of A-A' in FIG. 23A.

In a manner similar to the embodiment 2, the second reflection region 92 is formed on the main surface 81 of the holding substrate 8 and is disposed to correspond to the mounting surface 63 of the light distribution control element 6. The reflectance of the second reflection region 92 is lower than that of the main surface 81, for example. The second reflection region 92 has the rectangular shape in plan view and is provided on the both sides of each light source 7. Since its shape and arrangement described above is one example, the second reflection region 92 may have the circular shape as illustrated in FIG. 13 or may have the oval shape as illustrated in FIG. 14, for example.

As illustrated in FIG. 22, the first reflection region 91 is disposed between the light distribution control element 6 and the holding substrate 8. The first reflection region 91 is disposed in the side of the mounting surface 63 of the light distribution control element 6 in relation to the second reflection region 92. In the embodiment 3, the part of the first reflection region 91 is laminated on the second reflection region 92. As illustrated in FIG. 23B and FIG. 22, the first reflection region 91 includes a plurality of openings 93. The openings 93 are disposed to correspond to the position of the second reflection region 92. In the embodiment 3, an outer shape of the first reflection region 91 in plan view has a strip shape. The first reflection region 91 is a reflection sheet, for example. The shape of the openings 93 in the first reflection region 91 is formed to correspond to the planar shape of the second reflection region 92. The first reflection region 91 does not need to cover the tire main surface 81 other than the second reflection region 92 and the light source 7. That is to say, in the embodiment 3, the part of the main surface 81 of the holding substrate 8 is covered by the first reflection region 91. In the embodiment 3, the reflectance of the first reflection region 91 is higher than the reflectance of the second reflection region 92 and the reflectance of the main surface 81 of the holding substrate 8.

A light beam 73g which has been emitted from the light source 7 and then travels to the openings 93 enters the second reflection region 92. Since the reflectance of the second reflection region 92 is lower than that of the first reflection region 91 around the second reflection region 92 and the main surface 81, the light beam is hardly reflected. As a result, the light beam which goes through the light path to cause the focal line described above is reduced compared with the case where the second reflection region 92 is not formed.

Moreover, in the embodiment 3, the light distribution control element 6 is disposed to be in contact with the reflection body 9, particularly with the first reflection region 91, however, the planar light source device 202 may have a gap (not shown) between the light distribution control element 6 and the first reflection region 91. The gap is formed when the light distribution control element 6 is disposed to be shifted in the +z-axis direction in a manner similar to the embodiment 2. The light beam which has been emitted from the light source 7 and then entered the gap enters the second reflection region 92 corresponding to the position of the opening 93. Since the reflectance of the second reflection region 92 is lower than that of the first reflection region 91 around the second reflection region 92, the light beam is hardly reflected. As a result, the light beam which goes through the light path to cause the focal line described above is reduced compared with the case where the reflection body 9 is not formed.

In the planar light source device 202 including the first reflection region 91, the light beam which is conventionally reflected by the main surface 81 is reflected by the first reflection region 91. The reflectance of the first reflection region 91 is higher than that of the am surface 81 of the holding substrate 8. Thus, the planar light source device 202 can enhance the usage efficiency of the light compared with the case of not providing the first reflection region 91. Moreover, the distribution of the irradiated surface can be adjusted by changing the size and shape of the openings 93 of the first reflection region 91.

Although the planar light source device 202 described above includes the first reflection region 91 and the reflection part 5 separately, they may be an integrated component. For example, the first reflection region 91 or the reflection part 5 is bent at the end of the holding substrate 8 so that the first reflection region 91 and the reflection part 5 are connected to each other. The planar light source device having the above configuration has the similar effect that the focal line does not occur, for example. Furthermore, the planar light source device having the above configuration enables the reduction in the number of component parts.

To summarize the above, the first reflection region 91 of the planar light source device 202 according to the embodiment 3 is disposed in the side of the mounting surface 63 of the light distribution control element 6 in relation to the second reflection region 92. The first reflection region 91 has the openings 93 corresponding to the second reflection region 92. The second reflection region 92 faces the mounting surface 63 of the light distribution control element 6 via the openings 93 of the first reflection region 91. According to the above configuration, the planar light source device 202 enhances the robustness with regard to the positional relationship between the light distribution control element 6 and the holding substrate 8. The planar light source device 202 can emit the planar light having the brightness distribution with a high degree of evenness. Both the first reflection region 91 and the second reflection region 92 need not be formed on the main surface 81 of the holding substrate 8, but the reflection body 9 can be formed just by covering the second reflection region 92 with the first reflection region 91 such as the sheet. Moreover, in the planar light source device 202, the distribution of the irradiated surface can be adjusted in accordance with the size and shape of the openings 93 of the first reflection region 91.

Moreover, the reflection surface 54 of the reflection part 5 included in the planar light source device 202 according to the embodiment 3 may be integrated with the first reflection region 91 of the reflection body 9. According to the above configuration, the planar light source device 202 enables the reduction in the number of components of the reflection body 9.

MODIFICATION EXAMPLE

The embodiment 3 described above describes the example of forming the second reflection region 92 in the main surface 81 of the holding substrate 8. The second reflection region 92 may be the main surface 81 of the holding substrate 8 itself. In the above case, the reflectance of the first reflection region 91 is set higher than that of the main surface 81 of the holding substrate 8. That is to say, the reflectance of the second reflection region 92 is lower than that of the first reflection region 91. According to the above configuration, the second reflection region 92 needs not be newly provided in the main surface 81 of the holding substrate 8 in the planar light source device 202. Thus, the cost of the planar light source device 202 can be reduced.

Embodiment 4

Next, a liquid crystal display device 103 and a planar light source device 203 according to the embodiment 4 are described. In the embodiment 4, the same reference numerals as those described in the embodiments 1 to 3 will be assigned to the same constituent element and the description thereof will be omitted. That is to say, a configuration other than a planar light source device 203 and the case 10 in FIG. 24, for example, is the same as the configuration in FIG. 1, so that the description of them is omitted.

(Planar Light Source Device)

Figure 24:
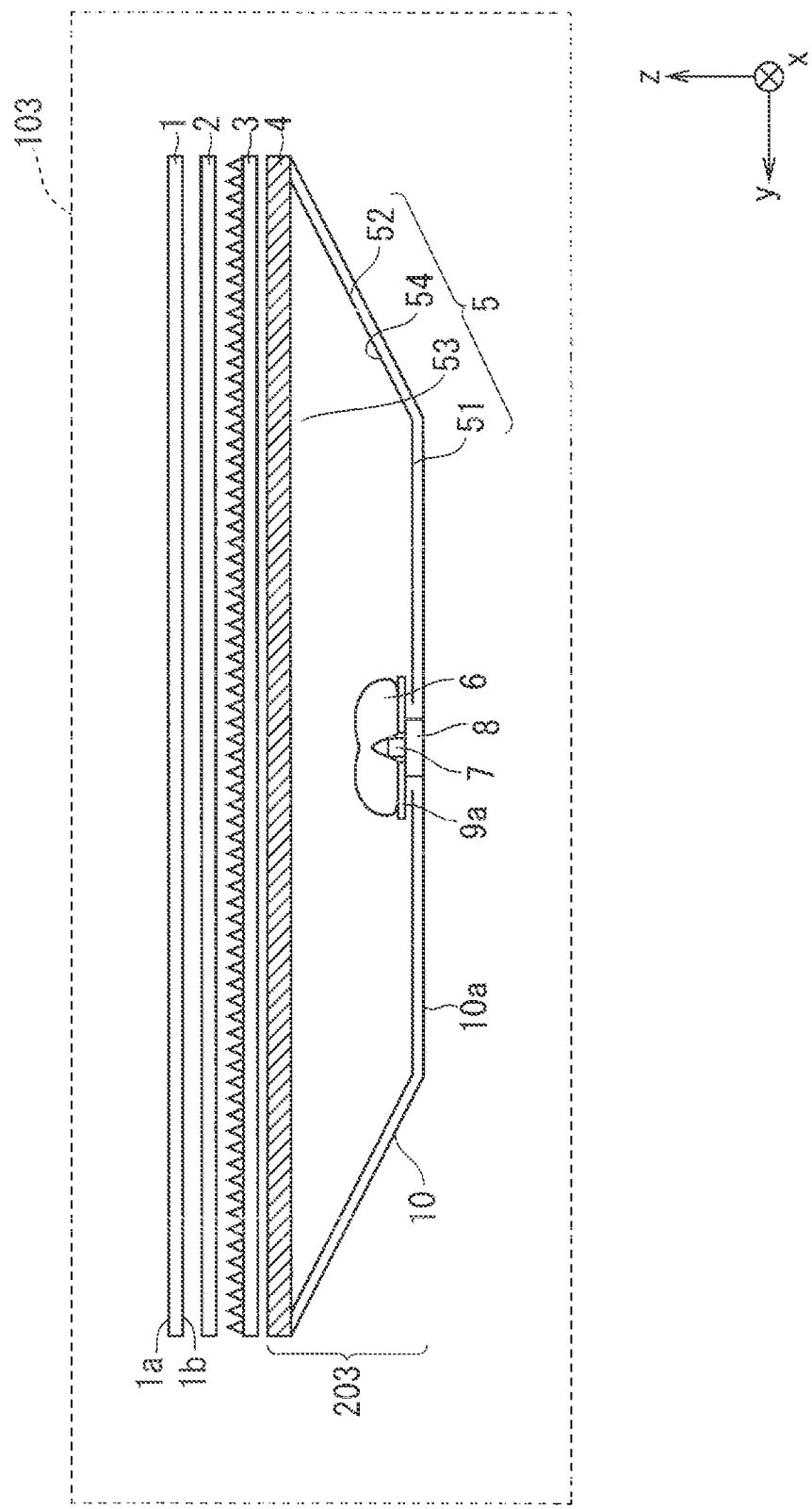
FIG. 24 is a cross-sectional view illustrating a liquid crystal display device according to an embodiment 4.

FIG. 24 is a cross-sectional view schematically illustrating a configuration of the planar light source device 203 according to the embodiment 4 and a configuration of a liquid crystal display device 103 including the planar light source device 203. As illustrated in FIG. 24, the planar light source device 203 includes the light distribution control element 6, the light source 7, the holding substrate 8, a light absorption part 9a, and the reflection part 5. The reflection part 5 has a container shape so as to be able to house the light distribution control element 6 and the light source 7. The reflection part 5 includes the bottom surface 51, the side surface 52, and the opening part 53. Moreover, the planar light source device 203 further includes the case 10. The case 10 is a member to hold and house the reflection part 5 and the holding substrate 8. The reflection part 5 is disposed along the inner wall of the case 10. The case 10 has the container shape including the opening on an upper part, that is to say, in the direction which the liquid crystal panel 1 is disposed to reflect the shape of the reflection part 5. A material making up the case 10 is a resin or a metal, for example.

FIG. 25 is a cross-sectional view enlarging an area surrounding the light source 7 of the planar light source device 203. The light source 7 is disposed on the main surface 81 of the holding substrate 8. The planar light source device 203 includes the light distribution control element 6 having a width larger than that of the holding substrate 8. The light distribution control element 6 is disposed in the main surface 81 side of the holding substrate 8 to cover the light source 7.

(Holding Substrate)

The holding substrate 8 has an outer shape which is long in the x-axis direction. That is to say, the holding substrate 8 has an outer shape which is long in the longitudinal direction of the light distribution control element 6 and the arrangement direction of the light source 7 described hereinafter. The holding substrate 8 has a rectangular plate shape in plan view. The holding substrate 8 has the main surface 81. In the embodiment 4, the main surface 81 is a surface of the holding substrate 8, and the surface is a mounting surface, for example. The holding substrate 8 is a mounted substrate which mounts the light source 7 described hereinafter on the main surface 81. The main surface 81 of the holding substrate 8 includes a white resist layer or a white silk layer on a resist layer, for example, and has a function of the reflection surface. The holding substrate 8 on which the light source 7 and the light distribution control element 6 are disposed is held by the bottom surface 10a of the case 10. A surface of the holding substrate 8 held by the bottom surface 10a of the case 10 is the rear surface 82 which is located in the opposite side of the main surface 81. The rear surface 82 is the surface of the holding substrate 8 in the −z-axis direction. The rear surface 82 of the holding substrate 8 transfers the heat generated in the light source 7 to the case 10 via the main surface 81 of the holding substrate 8, thereby radiating the heat. The heat radiation sheet may be disposed between the holding substrate 8 and the case 10 in the planar light source device 200, for example, to enhance the heat radiation effect.

(Light Source)

The light source 7 is disposed on the main surface 81 of the holding substrate 8. FIG. 26A is a plan view illustrating the plurality of light sources 7 disposed on the main surface 81 of the holding substrate 8. In the embodiment 4, the plurality of light sources 7 are discretely disposed on the main surface 81 of the holding substrate 8 to form a row. Its arrangement direction is the x-axis direction. As illustrated in FIG. 25, the rear surface 72 which is a surface of the light source 7 in the −z-axis direction is in contact with the main surface 81 of the holding substrate 8. Thereby, the light source 7 is held by the holding substrate 8. The light source 7 is conductively connected to the holding substrate 8, and the power is supplied to the light source 7 via the rear surface 72. In the embodiment 4, the other surface different from the rear surface 72 included in the light source 7 is a light emitting surface. For example, the surface 71 opposed to the rear surface 72 of the light source 7 is the light emitting surface. Moreover, for example, when the light source 7 has the rectangular parallelepiped shape, five surfaces different from the rear surface 72 of the light source 7 form the light emitting surfaces.

(Light Absorption Part)

As illustrated in FIG. 25, the planar light source device 203 further includes the light absorption part 9a disposed in a side of a rear surface 63a of the light distribution control element 6. The light absorption part 9a has a plate shape or a sheet-like shape. At least part of the light absorption part 9a is disposed to be sandwiched between the rear surface 63a of the light distribution control element 6 and the main surface 81 of the holding substrate 8. A width of the light absorption part 9a is preferably equal to or larger than a width of the light distribution control element 6 in the short-length direction. FIG. 26B is a plan view illustrating the light abruption part 9a. The light absorption part 9a has an opening 91a corresponding to the arrangement of the light source 7. As illustrated in FIG. 25, the main surface 81 of the holding substrate 8 is covered by the light absorption part 9a except for a region corresponding to the opening 91a of the light absorption part 9a.

(Reflection Part)

As it in FIG. 24, the planar light source device 203 includes the reflection part 5. The reflection part 5 has the container shape so as to be able to house the light source 7 held by the holding substrate 8 and the light distribution control element 6. FIG. 27 is a plan view of the reflection part 5 included in the planar light source device 203. The illustration of the diffusion plate 4 is omitted in FIG. 27. As illustrated in FIG. 27, the reflection part 5 includes one bottom surface 51 parallel to the x-y plane and four side surfaces 52 (side surfaces 52a, 52b, 52c, and 52d) connected to the bottom surface 51. That is to say, the reflection part 5 includes the five surfaces. As illustrated in FIG. 24, the side surface 52 of the reflection part 5 surrounds an outer periphery of the opening part 53 facing the bottom surface 51. In the embodiment 4, the bottom surface 51 of the reflection part 5 has a rectangular shape smaller than a rectangular shape of the diffusion plate 4. The bottom surface 51 of the reflection part 5 is disposed to be parallel to the diffusion plate 4, that is to say, parallel to the light outputting surface of the planar light source device 203. Furthermore, the side surface 52 of the reflection part 5 connects the outer periphery of the bottom surface 51 and the outer periphery of the diffusion plate 4. That is to say, the four side surfaces 52 are inclined from the outer periphery of the bottom surface 51 of the reflection part 5 toward the outer periphery of the diffusion plate 4. As described above, the reflection part 5 and the diffusion plate 4 form the hollow container shape.

The light source 7 and the light distribution control element 6 held by the holding substrate 8 are disposed in the surface defined by the bottom surface 51 of the reflection part 5. That is to say, the light source 7 and the light distribution control element 6 are disposed in the surface of the bottom surface 51 of the reflection part 5 in plan view of the planar light source device 203.

The bottom surface 51 of the reflection part 5 according to the embodiment 4 has an opening corresponding to a position where the holding substrate 8 is disposed. As illustrated in FIG. 25, a contoured part 55 forming the opening is located in both sides of the holding substrate 8 and also disposed between the light distribution control element 6 and the case 10. That is to say, the contoured part 55 is disposed to surround the outer periphery of the holding substrate 8 in plan view, and disposed in a gap between the light distribution control element 6 and the case 10 in a cross-sectional view.

The shape of the reflection part 5 is described by the xyz coordinate axis hereinafter. The two side surfaces 52a and 52b, in the four side surfaces 52 illustrated in FIG. 27, connected to the sides of the bottom surface 51 of the reflection part 5 parallel to the x-axis direction are inclined so that a distance therebetween increases toward the +z-axis direction. That is to say, the side surface 52a in the +y-axis direction is inclined in the anticlockwise direction around the connection part between the y-z plane and the bottom surface 51 viewed from the −x-axis direction. The side surface 52b in the −y-axis direction is inclined in the clockwise direction around the connection part between the y-z plane and the bottom surface 51 of the reflection part 5 viewed from the −x-axis direction. The two side surfaces 52c and 52d, in the four side surfaces 52, connected to sides of the bottom surface 51 of the reflection part 5 parallel to the y-axis direction are also inclined so that a distance therebetween increases toward the +z-axis direction. That is to say, the side surface 52c in the −x-axis direction is inclined in the anticlockwise direction around the connection part between the z-x plane and the bottom surface 51 of the reflection part 5 viewed from the −y-axis direction. The side surface 52d in the +x-axis direction is inclined in the clockwise direction around the connection part between the z-x plane and the bottom surface 51 of the reflection part 5 viewed from the −y-axis direction. The opening part 53 is formed in the +z-axis direction facing the bottom surface 51 of the reflection part 5.

As illustrated in FIG. 24 and FIG. 25, the inner surface of the reflection part 5 has the reflection surface 54. The reflection part 5 is the member reflecting the light, and the reflection surface 54 is the reflection sheet which is the sheet-like member, for example. The reflection surface 54 of the reflection part 5 may be the diffuse reflection surface, for example. The reflection part 5 is the light reflection sheet having the resin such as polyethylene terephthalate as the base member or the light reflection sheet formed by evaporating the metal on the surface of the substrate, for example.

A planar light source device which does not include the light absorption part 9a is described as an example before describing the action and effect of the planar light source device 203 according to the embodiment 4. FIG. 16 includes the illustration of the light beam 73a which is part of the light beam emitted from the light source 7 in the +z axis direction to expand only in the y-z plane. As illustrated in FIG. 16, the light beam 73a is the light beam emitted from the light source 7 at the narrow angle with the light axis C in the −y-axis direction. The light beam 73a emitted from the light source 7 is refracted by the light incident surface 61 and then enters the inner side of the light distribution control element 6. In accordance with Snell's law, when the light beam enters a medium having a large refraction index from a medium having a small refraction index, a refracting angle of the light beam is smaller than an incident angle of the light beam. When the light beam enters a medium having a small refraction index from a medium having a large refraction index, a refracting angle of the light beam is larger than an incident angle of the light beam. When the light distribution control element 6 is made of the acrylic resin, as illustrated in FIG. 16, the light beam 73a is refracted by the light incident surface 61 in the −y-axis direction. The light beam 73a travels in the inner side of the light distribution control element 6 and subsequently reaches the light outputting surface 62. The light beam 73a is refracted by the light outputting surface 62 having the convex surface in the direction that the angle with the light axis C further increases, that is to say, in the −y-axis direction. FIG. 17 includes the illustration of the light beam 73b which is the part of the light beam emitted from the light source 7. The light beam 73b is the light beam having the angle with the light axis C larger than that of the light beam 73a in the light beam emitted from the light source 7 to expand only in the y-z plane. The light beam expanding only on the y-z plane means the light beam expanding only in the vertical direction in FIG. 17. As illustrated in FIG. 16 and FIG. 17, the light distribution control element 6 diffuses the light emitted from the light source 7. Although the illustration of each light beam is omitted, the light bean' 73a or 73b emitted from the light distribution control element 6 reaches the diffusion plate 4 illustrated in FIG. 10. The part of the light beam which has reached the diffusion plate 4 is reflected and then travels in the space having the container shape of the reflection part 5. The light beam is reflected by the bottom surface 51 or the side surface 52 of the reflection part 5, and then reaches the diffusion plate 4 again. The light is diffused while going through the diffusion plate 4. The light which has gone through the diffusion plate 4 becomes the planar illumination light having evenness. The rear surface 1b of the liquid crystal panel 1 is irradiated with this illumination light via the optical sheet 3 and the optical sheet 2.

When the light beam enters a medium having a small refraction index from a medium having a large refraction index, a total reflection may occur at a boundary surface between the mediums. For example, when the material of the light distribution control element 6 is the acrylic resin (PMMA) having the refraction index of 1.49 and the medium in the outputting side, that is to say, the space having the container shape in the reflection part 5 is air, the light beam whose incident angle at the time of entering the light outputting surface 62 is larger than 42.1° satisfies the total reflection condition. The light beam which satisfies the total reflection condition is totally reflected toward the side of the holding substrate 8 or reflection part 5 in the light outputting surface 62. That is to say, the light beam is reflected in the −z-axis direction. The total reflection condition of the light beam propagating only on the y-z plane can be avoided by designing the shape of the light incident surface 61 and the shape of the light outputting surface 62 to cause the incident angle of the light beam to be 42.1' or smaller. As a result, the light beam can be expanded from the light outputting surface 62 toward the diffusion plate 4.

Figure 29:
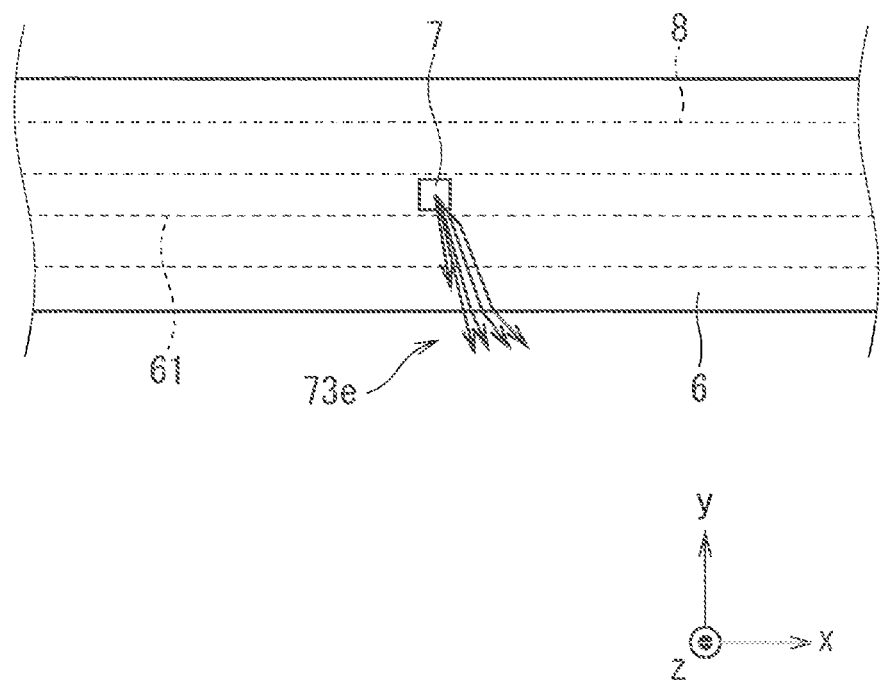
FIG. 29 is a diagram illustrating a light beam emitted from a light source of a planar light source device which does not include a reflection body.

FIG. 28 is a cross-sectional view illustrating a configuration around the light source 7 of the planar light source device 300 and includes the illustration of the light beam 73c which is the part of the light beam emitted from the light source 7. The light beam 73c also has the angular component expanding in the x-axis direction, that is to say, the vector component in the +x-axis direction, differing from the light beam 73a illustrated in FIG. 16. FIG. 29 is a plan view of the light distribution control element 6 observing the x-y plane from the +z-axis direction. FIG. 29 includes the illustration of the light beam 73e which is the part of the light beam emitted from the light source 7. The light beam 73e has the vector component in the +x-axis direction. The light beam having the angular component expanding in the +x-axis direction means the light beam expanding in the oblique direction or parallel to the x axis in FIG. 29.

The light beam 73c illustrated in FIG. 28 has the larger incident angle with the light outputting surface 62 than the light beam 73a propagating only on the y-z plane illustrated in FIG. 16. The reason is that the vector component in the +x-axis direction is combined with the incident angle with the light outputting surface 62. Thus, the light beam having the large vector component in the +x-axis direction easily satisfies the total reflection condition on the light outputting surface 62. The light beam 73d indicates the light beam, in the light beam 73c emitted from the light source 7, which has the large incident angle with the light outputting surface 62 and is totally reflected. The light beam 73d which is totally reflected by the light outputting surface 62 travels in the −z-axis direction. Subsequently, the light beam 73d is emitted from the rear surface 63a of the light distribution control element 6 and then reaches the bottom surface 51 of the reflection part 5. The light beam 73d which has reached the reflection part 5 is diffusely reflected by the reflection surface 54. Although the illustration is omitted, subsequently, the light beam 73d reaches the diffusion plate 4 and the other reflection surface 54 of the reflection part 5.

Figure 30:
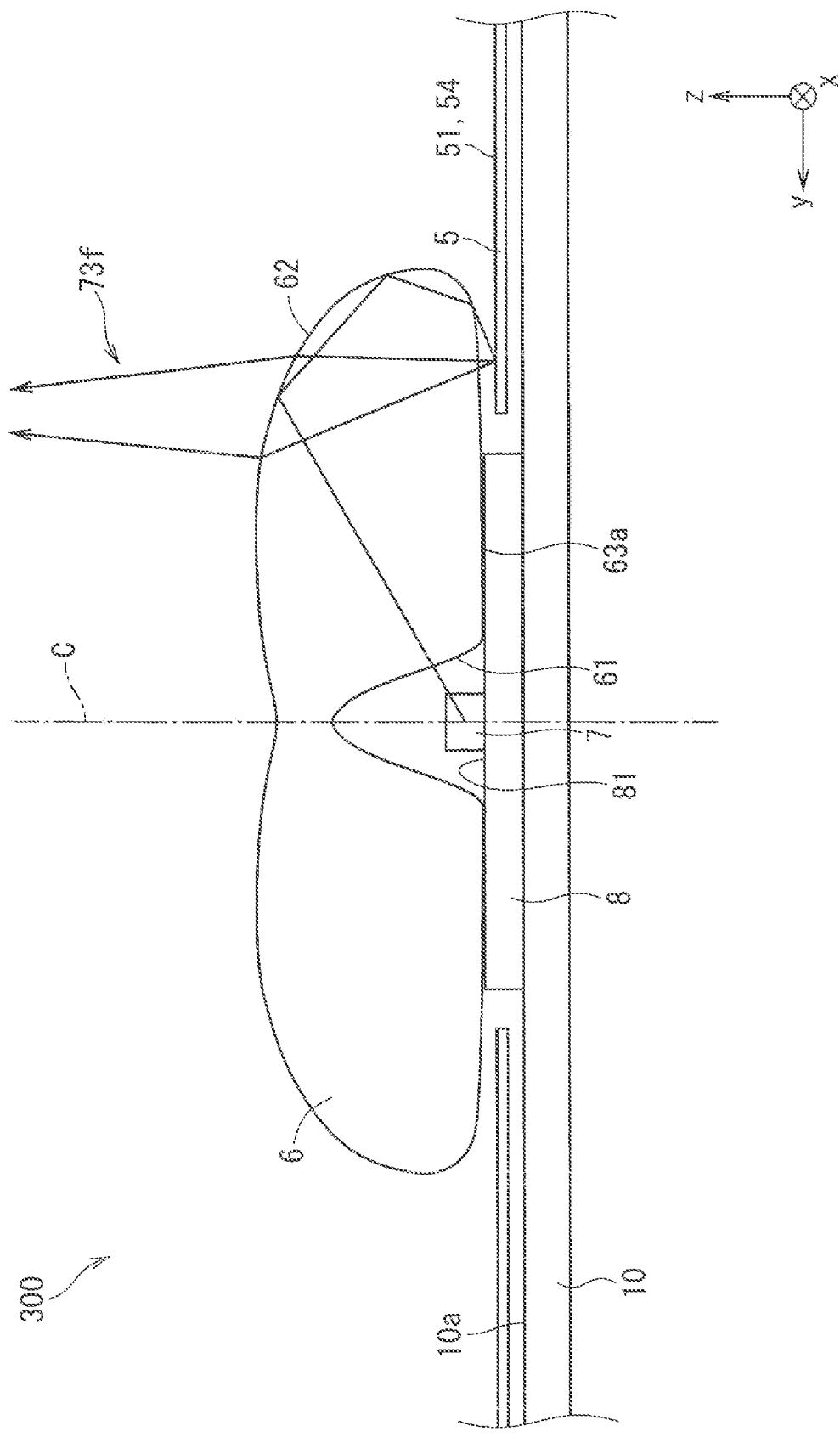
FIG. 30 is a diagram illustrating a light beam emitted from a light source of a planar light source device which does not include a reflection body.

FIG. 30 is a cross-sectional view illustrating a configuration around the light source 7 of a planar light source device 300 and includes an illustration of the light beam 73f which is the part of the light beam emitted from the light source 7. The light beam 73f is the light beam entering the light outputting surface 62 at a larger incident angle than the light beam 73c illustrated in FIG. 28. The light beam 73f is reflected by the light outputting surface 62 twice and then emitted from the rear surface 63a of the light distribution control element 6. The light beam. 73f which has reached the bottom surface 51 of the reflection part 5 is diffusely reflected by the reflection surface 54, and then enters the inner side of the light distribution control element 6 again. Subsequently, the light beam 73f is refracted by the light outputting surface 62 of the light distribution control element 6 and is emitted. Although the illustration is omitted, the emitted light beam 73f reaches the diffusion plate 4.

There is also a light beam emitted from the light source 7, reflected by the light outputting surface 62, and reaching the main surface 81 of the holding substrate 8 other than the light beam 73d and the light beam 73f. The light beam is reflected by the main surface 81 and then enters the inner side of the light distribution control element 6 again. Subsequently, the light beam is refracted by the light outputting surface 62 of the light distribution control element 6 and then reaches the diffusion plate 4.

The light beam emitted from the light source 7 and then reaches the diffusion plate 4 described above can be divided into the two components, that is to say, the direct light component and the reflection light component. The direct light component indicates the light beam, in the light beam emitted from the light source 7, refracted by the light distribution control element 6 and then directly reaching the diffusion plate 4. The reflection light component indicates the light beam which is reflected in the inner side of the light distribution control element 6, diffusely reflected by the reflection part 5, and then reaching the diffusion plate 4. Since the reflection light component includes the influence of the diffuse reflection by the reflection part 5, it is difficult to control its spatial brightness distribution using the light distribution control element 6. The planar light source device needs to control the light distribution including the reflection light component so as to effectively use the light emitted from the light source 7. Moreover, the planar light source device preferably controls a balance between the direct light component and the reflection light component using the light distribution control element 6 so as to obtain the illumination light having the even brightness distribution on the light outputting surface thereof. For example, the distribution of the direct light component needs to be adjusted to be uneven purposely in accordance with distribution of the reflection light component, using the light distribution control element 6.

Figure 31:
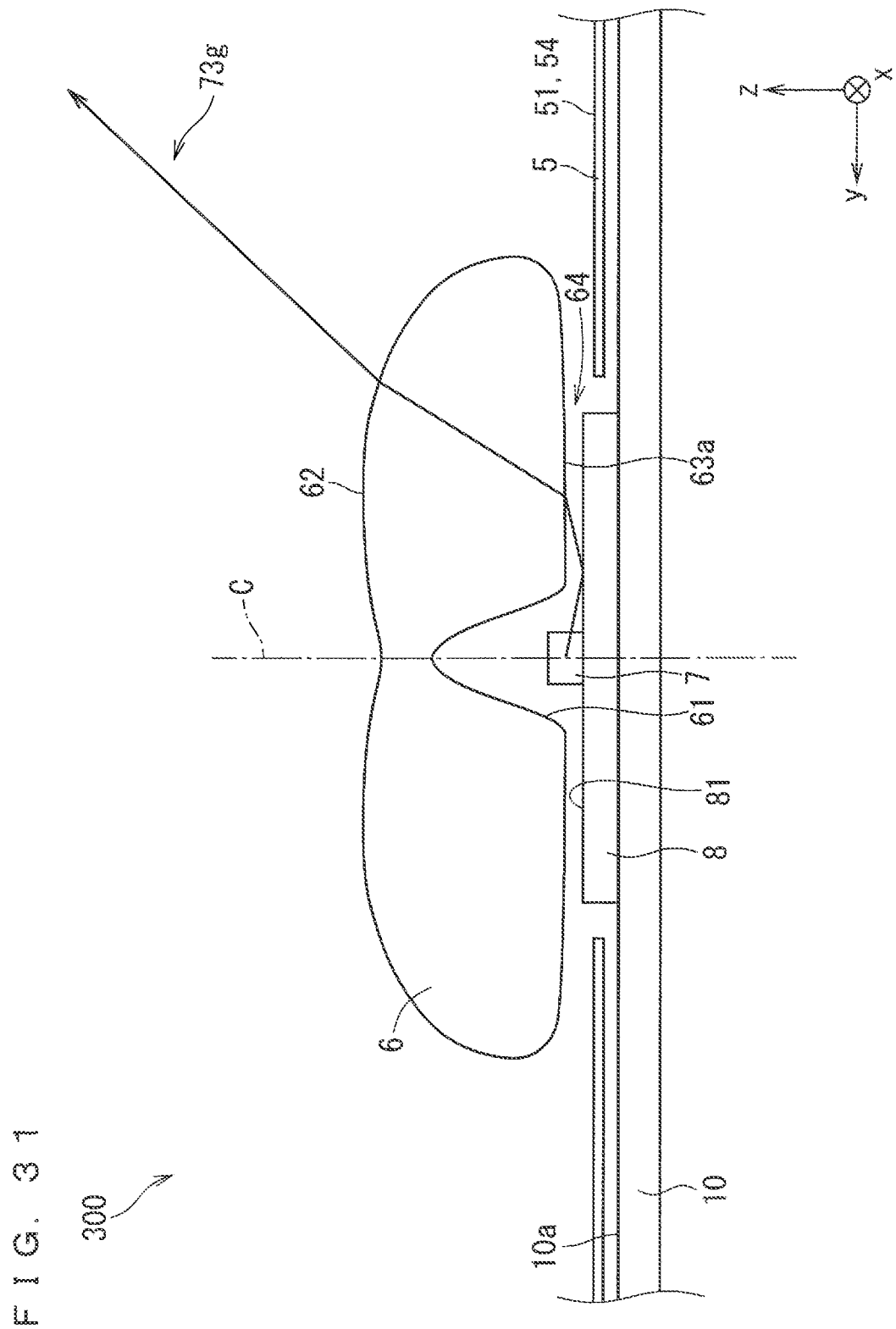
FIG. 31 is a diagram illustrating a light beam emitted from a light source of a planar light source device which does not include a reflection body.

FIG. 31 is a cross-sectional view illustrating a configuration around the light source 7 of the planar light source device 300. FIG. 31 includes the illustration of the light beam 73g which is the part of the light beam emitted from the light source 7. The planar light source device 300 illustrated in FIG. 31 indicates a state where an error occurs in an arrangement of the light distribution control element 6 with respect to the holding substrate 8. That is to say, FIG. 31 illustrates a state where the light distribution control element 6 is shifted in the +z-axis direction, and the gap 64 is located between the light distribution control element 6 and the holding substrate 8. Since the light source 7 is mounted on the holding substrate 8, the misalignment of the light distribution control element 6 with respect to the holding substrate 8 means the misalignment of the light distribution control element 6 with respect to the light source 7. When the gap 64 occurs between the light distribution control element 6 and the holding substrate 8, the light beam 73g enters the gap 64. The light beam 73g is reflected by the main surface 81 of the holding substrate 8, for example, and then enters the light distribution control element 6 from the rear surface 63a of the light distribution control element 6. Subsequently, the light beam 73g is emitted from the light outputting surface 62 of the light distribution control element 6. In the above case, the curvature of the rear surface. 63a of the light distribution control element 6 from which the light beam 73g enters and the curvature of the light outputting surface 62 have the relationship to function as the convex lens with respect to the light beam 73g. Thus, the light beam 73g emitted from the light outputting surface 62 is collected, and the focal line occurs. The focal line is formed on the irradiated surface (on the diffusion plate 4 or the rear surface 1b, for example) depending on the relationship between the curvature of the rear surface 63a and the curvature of the light outputting surface 62 of the light distribution control element 6. When the error occurs in the position of the light distribution control element 6 with respect to the holding substrate 8 as described above, the evenness of the illumination light decreases. Even when the variation occurs in the arrangement of each member constituting the planar light source device, the distribution of the light on the irradiated surface is preferably even.

(Action of Light Absorption Part)

Figure 32:
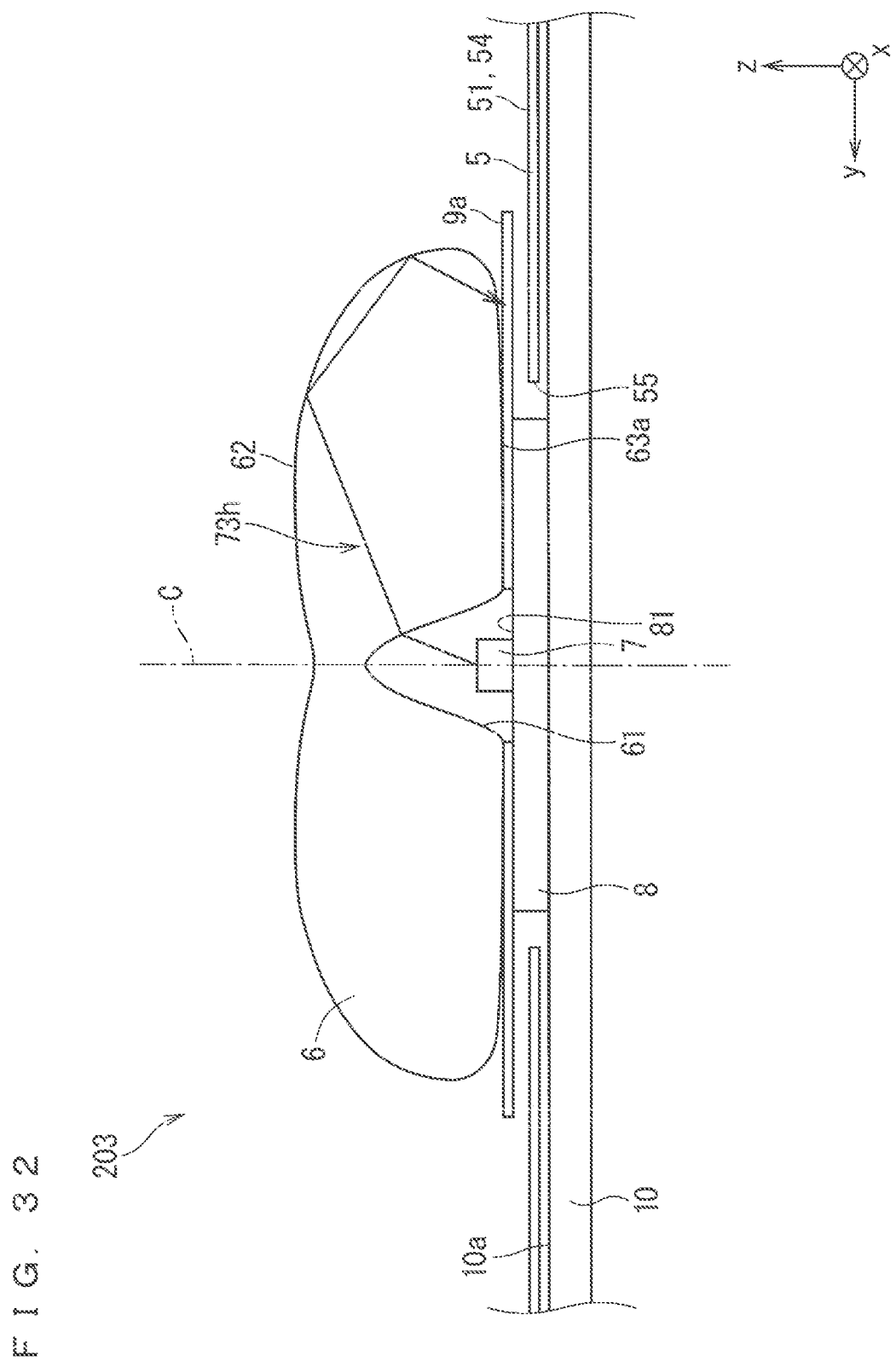
FIG. 32 is a diagram illustrating the light beam emitted from the light source of the planar light source device according to the embodiment 4.

FIG. 32 is a diagram illustrating a configuration around the light source 7 of the planar light source device 203 according to the embodiment 4 and includes an illustration of a light beam 73h which is part of the light beam emitted from the light source 7. As described above, the planar light source device 203 includes the light absorption part 9a in the side of the rear surface 63a of the light distribution control element 6. The light beam 73h is reflected by the light outputting surface 62 twice and then emitted from the rear surface 63a of the light distribution control element 6. Subsequently, the light beam 73h enters the light absorption part 9a, thereby being absorbed. Moreover, although the illustration is omitted, also in the case where the arrangement of the light distribution control element 6 is shifted in the +z-axis direction, the light beam which has entered between the light distribution control element 6 and the main surface 81 of the holding substrate 8 is absorbed by the light absorption part 9a. Furthermore, when the light absorption part 9a having the larger width than the light distribution control element 6 is disposed, the light absorption part 9a also absorbs the light beam which has been reflected by the light outputting surface 62 and enters from the end portion in the side of the rear surface 63a of the light distribution control element 6 totally as the light beam 73d illustrated in FIG. 28.

The light absorption part 9a absorbs the light beam which is the reflection light component reflected by the light outputting surface 62 and emitted from the rear surface 63a of the light distribution control element 6. The absorbed reflection light component does not reach the diffusion plate 4. Thus, the evenness of the planar light of the planar light source device 203 is enhanced. Moreover, also in the case where the light distribution control element 6 is shifted in the +z-axis direction, the light absorption part 9a absorbs the light beam entering between the rear surface 63a of the light distribution control element 6 and the main surface 81 of the holding substrate 8. Thus, the evenness of the brightness distribution on the irradiated surface is enhanced. The robustness with regard to the arrangement of the light distribution control element 6 and the holding substrate 8 or the arrangement of the light distribution control element 6 and the light source 7 is enhanced.

To summarize the above, the planar light source device 203 according to the embodiment 4 includes the light source 7, the holding substrate 8 which holds the light source 7 on the main surface 81, the light distribution control element 6 which covers the light source 7, includes the rear surface 63a, at least part of which is held by the main surface 81 of the holding substrate 8, and changes the distribution of the light emitted from the light source 7, and the light absorption part 9a disposed in the side of the rear surface 63a of the light distribution control element 6. According to the planar light source device 203 having the above configuration, the light absorption part 9a absorbs the light beam reflected by the light outputting surface 62 of the light distribution control element 6. As a result, the evenness of the planar illumination light of the planar light source device 203 is enhanced. Moreover, in the planar light source device 203, also in the case where the light distribution control element 6 is disposed in the misaligned position, the light absorption part 9a absorbs the light beam entering between the rear surface 63a of the light distribution control element 6 and the main surface 81 of the holding substrate 8. As a result, the robustness with regard to the arrangement of the light distribution control element 6 and the holding substrate 8 or the arrangement of the light distribution control element 6 and the light source 7 is enhanced.

Moreover, since the planar light source device 203 emits the planar light having the brightness distribution with a high degree of evenness, it can also be used as the illumination device used for the illumination of the room other than the backlight of the liquid crystal display device 103. The planar light source device 203 can be also used for the advertisement display device illuminating the picture or the like from the rear surface side, for example. The present embodiment describes one example of the liquid crystal display device 103 including the planar light source device 203. The similar effect can be obtained by a display device including a display panel and the planar light source device 203, wherein the display panel is a different type from the liquid crystal panel 1 and is illuminated by the planar light source device 203.

At least part of the light absorption part 9*a* included in the planar light source device 203 in the embodiment 4 is disposed between the rear surface 63*a* of the light distribution control element 6 and the main surface 81 of the holding substrate 8. According to the above configuration, even when the light absorption part 9*a* is the component separated from the light distribution control element 6 or the holding substrate 8, the planar light source device 203 easily hold and fixes the light absorption part 9*a* using the light distribution control element 6 and the holding substrate 8. Thus, the manufacturing cost is reduced. Moreover, when the width of the light absorption part 9*a* is equal to or larger than that of the light distribution control element 6 in the short-length direction, the light absorption part 9*a* mostly or totally absorbs the light beam emitted from the rear surface 63*a* of the light distribution control element 6. Furthermore, the light absorption part 9*a* may be integrated with the reflection part 5. In the above case, the light absorption part 9*a* or the reflection part 5 is bent at the end of the holding substrate 8 to be disposed. Moreover, the light absorption part 9*a* is formed by a printing on the part of the reflection part 5.

The planar light source device 203 according to the embodiment 4 further includes the plurality of light sources 7 discretely disposed on the main surface 81 of the holding substrate 8 to form a row. The light distribution control element 6 includes the light outputting surface 62 having the longitudinal in the arrangement direction of the plurality of light sources 7 and including the convex cylindrical surface in the surface perpendicular to the longitudinal direction and the light incident surface 61 including the concave curved surface or the planar surface which extends in the longitudinal direction to cover the plurality of light sources 7. The light absorption part 9*a* has an outer shape which is long in the longitudinal direction of the light distribution control element 6. According to the above configuration, the planar light source device 203 can provide the even planar light using the light distribution control element 6 and the light absorption part 9*a* which are smaller in number than the light source 7 disposed on the main surface 81 of the holding substrate 8.

The liquid crystal display device 103 according to the embodiment 4 includes the planar light source device 203 and the liquid crystal panel 1 which converts the planar light emitted from the planar light source device 203 into the image light. The liquid crystal display device 103 which illuminates the liquid crystal panel 1 with the planar light source device 203 having the more enhanced evenness than ever before achieves the higher image quality than ever before.

(Modification Example of Light Distribution Control Element)

In the above embodiment 4, the light distribution control element 6 is the optical element having the rod-like shape and disposed to cover the plurality of light sources 7. However, the light distribution control element 6 is not limited to the rod-like optical element. The planar light source device 203 has the effect similar to the embodiment 4 even when one light distribution control element is attached to one light source. However, the planar light source device including the individual light distribution control element for each light source uses the large number of light distribution control elements. Moreover, each light distribution control element (lens) needs to be fixed to each light source, thus the total number of processes increases in the manufacturing process.

In the meanwhile, the planar light source device 203 described in the embodiment 4 can include the light distribution control element 6 which is smaller in number than the light source 7 for the plurality of light sources 7 arranged in a line. For example, only one rod-like light distribution control element 6 is applicable. As described above, the number of light distribution control elements 6 used in the planar light source device 203 can be reduced. Moreover, only one light distribution control element 6 needs to be fixed to the plurality of light sources 7 arranged in a row in the attachment process, thus the fixing operation such as the attachment can be easily performed.

Considered also is the adoption of the optical element which needs the positioning of the light source in the x direction or the y-direction such as the lens array in which the plurality of lenses are arranged on the x-y plane as the light distribution control element. However, the size of the optical element covering the light sources needs to be changed in accordance with the increase and decrease in the number of light sources. That is to say, the mold for manufacturing the optical element needs to be changed in accordance with an increase and decrease in the number of light sources. Thus, such an optical element has the low versatility to the change of specification of the planar light source device.

In the meanwhile, since the light distribution control element 6 according to the embodiment 4 has the rod-like shape, it can be manufactured by the extrusion molding. According to the method of manufacturing the light distribution control element 6 by the extrusion molding, the length of the light distribution control element 6 can be freely changed. Even when the size of the liquid crystal display device 103 is different, for example, the light distribution control element 6 only whose length is adjusted can be manufactured using the same mold. Since the mold of the light distribution control element 6 needs not be changed in accordance with the increase or decrease in the number of light sources 7, the light distribution control element 6 has the high versatility to the change of specification of the planar light source device 203. The brightness of the planar light source device 203 can be adjusted only by changing the number of light sources 7. Thus, the planar light source device 203 having the appropriate number and arrangement of light sources 7 can be manufactured.

Although the light distribution control element 6 is made of the transparent material in the embodiment 4, the material including the diffusion member may also be adopted. The light beam which has entered the light distribution control element 6 is diffused by the diffusion member, thereby changing its traveling direction. The traveling direction of the light beam which travels in the inner side of the light distribution control element 6 is changed to the random direction. The light beam whose traveling direction has been changed reaches the light outputting surface 62 of the light distribution control element 6. The wide area can be irradiated with the light emitted from the light outputting surface 62 of the light distribution control element 6.

The minute convex-concave shape can be formed in the light incident surface 61 or the light outputting surface 62 of the light distribution control element 6. The convex-concave shape needs not be formed in the entire region of the light incident surface 61 and the light outputting surface 62. For example, the convex-concave shape may also be formed only in the part of the region in the light incident surface 61. Moreover, for example, the convex-concave shape may also be formed only in the part of the region in the light outputting surface 62. That is to say, the convex-concave shape may have the configuration of being provided in the part of the region in the light incident surface 61 or the light outputting surface 62. It is not necessary to uniform the roughness of the convex-concave shape in the entire region. For example, the convex-concave shape of the light incident surface 61 may be made smaller than that of the light outputting surface 62.

The traveling direction of the light beam which enters the convex-concave shape is changed to the random direction. Thus, the light distribution control element 6 having the convex-concave shape can lessen the bright line. "The bright line" indicates the region which is linearly generated, with high brightness, on the light outputting surface (the diffusion plate 4) of the planar light source device 203. The convex-concave shape can lessen the brightness unevenness on the light outputting surface (the diffusion plate 4) of the planar light source device 203 occurring by arranging the plurality of light sources 7 side by side. That is to say, the convex-concave shape can lessen the difference between the bright part and the dark part. Moreover, the light distribution control element 6 can distribute the light to the wide area and irradiate there using the convex-concave shape.

However, the degree of light diffusion using the diffusion material or the convex-concave shape described above needs to be made smaller than the degree of refraction of light beam on the light incident surface 61 and the light outputting surface 62. The reason is that when the diffusion member or the convex-concave shape has the dominant influence on the light diffusion, the refraction and distribution of the light beam as designed is made difficult on the light incident surface 61 and the light outputting surface 62 of the light distribution control element 6. The light distribution is directed to the light outputting surface of the planar light source device 203, that is to say, the diffusion plate 4 by the refraction depending on the shape of the light distribution control element 6. Thus, when the effect of the light diffusion using the diffusion member or the convex-concave shape increases, there is the possibility that the brightness increases near the arrangement position the light source 7 and decreases with the increasing distance from the light source.

Embodiment 5

Next, a planar light source device 204 according to the embodiment 5 is described in the embodiment 5, the same reference numerals as those described in the embodiments 1 to 4 will be assigned to the same constituent element and the description thereof will be omitted.

FIG. 33 is a drawing illustrating a configuration around the light source 7 included in the planar light source device 204 according to the embodiment 5. As illustrated in FIG. 33, the light distribution control element 6 includes a transparent lens part 6a in the embodiment 5. The absorption part 9b is provided on the rear surface 63a of the light distribution control element 6. The light distribution control element 6 and the light absorption part 9b including the lens part 6a are integrated with each other, and is manufactured by double-molding method, for example. Alternatively, for example, the light absorption part 9b and the lens part 6a are separately molded, and then they are attached to or fitted into each other to form the light distribution control element 6.

The light absorption part 9b absorbs the light beam which is the reflection light component reflected by the light outputting surface 62 and reaching the rear surface 63a of the light distribution control element 6. Thus, the evenness of the planar light of the planar light source device 204 is enhanced. Moreover, also in the case where the light distribution control element 6 is shifted in the +z-axis direction, the light absorption part 9b absorbs the light beam entering between the rear surface 63a of the light distribution control element 6 and the main surface 81 of the holding substrate 8. Thus, the evenness of the brightness distribution on the irradiated surface is enhanced. The robustness with regard to the arrangement of the light distribution control element 6 and the holding substrate 8 or the arrangement of the light distribution control element 6 and the light source 7 is enhanced.

Embodiment 6

Next, a planar light source device 205 according to the embodiment 6 is described. In the embodiment 6, the same reference numerals as those described in the embodiments 1 to 5 will be assigned to the same constituent element and the description thereof will be omitted. FIG. 34 is a drawing illustrating a configuration around the light source 7 included in the planar light source device 205 according to the embodiment 6.

In the planar light source device 203 illustrated in the embodiment 4, the main surface 81 of the holding substrate 8 has the function of the reflection surface. That is to say, the white resist layer or the white silk layer which is located on the resist layer is provided on the main surface 81 of the holding substrate 8. The main surface 81 of the holding substrate 8 in the planar light source device 203 has the function of enhancing the usage efficiency of the light reflected by the main surface 81 and further reflecting the light entering from the light source without changing a color of the light.

In contrast, a light absorption part 9c is formed on the main surface 81 of the holding substrate 8 in the planar light source device 205 illustrated in the embodiment 6. That is to say, the light absorption part 9c is disposed in the side of the rear surface 63a of the light distribution control element 6. The light absorption part 9c is a black resist layer or a black silk layer formed on a resist layer. A width of the light absorption part 9c is preferably equal to or larger than the width of the light distribution control element 6 in the short-length direction.

The light absorption part 9c absorbs the light beam which is the reflection light component reflected by the light outputting surface 62 and emitted from the rear surface 63a of the light distribution control element 6. Thus, the evenness of the planar light of the planar light source device 203 is enhanced. Moreover, also in the case where the light distribution control element 6 is shifted in the +z-axis direction, the light absorption part 9c absorbs the light beam entering between the rear surface 63a of the light distribution control element 6 and the main surface 81 of the holding substrate 8. Thus, the evenness of the brightness distribution on the irradiated surface is enhanced. The robustness with regard to the arrangement of the light distribution control element 6 and the holding substrate 8 or the arrangement of the light distribution control element 6 and the light source 7 is enhanced.

Moreover, when the width of the light absorption part 9*c* in the short-length direction is equal to or larger than that of the light distribution control element 6 in the short-length direction, the light absorption part 9*c* mostly or totally absorbs the light beam emitted from the rear surface 63*a* of the light distribution control element 6. Furthermore, the rear surface 82 which is the surface of the holding substrate 8 in the z-axis side is in contact with and held by the bottom surface 10*a* of the case 10. As a result, only the heat generated in the light source 7 but also a heat energy converted from a light energy by being absorbed by the light absorption part 9*c* is transferred to the case 10 and thereby radiated.

In the embodiments 1 to 6 described above, the terms indicating the positional relationship between the components such as "parallel" or the shape of the component are used in some cases. These terms are indicative of including a range considering a manufacturing tolerance or a variation in assembly, for example. Thus, when there is a description indicating the positional relationship between the components or the shape of the component in claims, the terms are indicative of including the range considering the manufacturing tolerance or the variation in assembly, for example.

Moreover, the embodiments 1 to 6 are described above, the present invention is not limited to these embodiments 1 to 6.

According to the present invention, respective preferred embodiments can be freely combined, or can be appropriately varied or omitted within the scope of the invention.

What is claimed is:

1. A planar light source device for emitting a planar light, comprising:
    a plurality of light sources which are substantially arranged along an axis, wherein each of the plurality of light sources emits light;
    a holding substrate which is disposed in a position of said planar light source device being opposite to a display surface with respect to said plurality of light sources and holds said plurality of light sources;
    a light distribution control element extending along said axis and disposed to surround each of said plurality of light sources from a side of said display surface and having a light incident surface entering said light emitted from said plurality of light sources and a light outputting surface distributing said light entering from said light incident surface and then emitting said light;
    a first reflection part reflecting said light which has been reflected in an inner side of said light distribution control element toward said side of said display surface; and
    a case which houses said plurality of light sources, said holding substrate, said light distribution control element, and said first reflection part, wherein
    a part opposite to said side of said display surface, in relation to at least said light distribution control element, in a region between said light distribution control element and an inner wall of said case, is covered by said first reflection part,
    wherein a part of said first reflection part, said part being covered by said light distribution control element, is inclined toward said holding substrate in a direction perpendicular to said axis and an end of said part of said first reflection part covered by said light distribution control element, on a side closer to said plurality of light sources, faces said holding substrate.

2. The planar light source device according to claim 1, wherein a surface of said holding substrate holding said plurality of light sources is a reflection surface.

3. The planar light source device according to claim 1, wherein said light distribution control element has a region having a convex-concave shape in said light incident surface or said light outputting surface.

4. The planar light source device according to claim 1, wherein
    said light outputting surface of said light distribution control element forms a cylindrical surface which has a curvature in a first direction and does not have a curvature in a second direction perpendicular to said first direction, and
    said light incident surface of said light distribution control element is formed to have a groove shape extending in said second direction.

5. A liquid crystal display device comprising:
    the planar light source device according to claim 1; and
    a liquid crystal panel which converts a planar light emitted from said planar light source device into an image light.

6. The planar light source device according to claim 1, further comprising
    a second reflection part disposed in a region between said light distribution control element and said holding substrate.

7. The planar light source device according to claim 6, wherein
    said second reflection part includes a first reflection region and a second reflection region having a lower reflectance than said first reflection region, and
    said second reflection region is disposed to correspond to a mounting surface of said light distribution control element being able to come in contact with said second reflection part.

8. The planar light source device according to claim 7, wherein
    said first reflection region is disposed in a side of said mounting surface of said light distribution control element in relation to said second reflection region, and has an opening corresponding to said second reflection region, and
    said second reflection region faces said mounting surface of said light distribution control element via said opening of said first reflection region.

9. The planar light source device according to claim 7, wherein a light absorptivity of said second reflection region is higher than a light absorptivity of said first reflection region.

10. The planar light source device according to claim 7, wherein said second reflection region has a rectangular shape, a circular shape, or an oval shape in plan view of said holding substrate.

11. The planar light source device according to claim 1, further comprising
    a light absorption part disposed in a region between said light distribution control element and said holding substrate.

12. The planar light source device according to claim 11, wherein at least part of said light absorption part is disposed between a rear surface of said light distribution control element and a main surface of said holding substrate.

13. The planar light source device according to claim 11, wherein said light absorption part is disposed on a side of a rear surface of said light distribution control element by being provided on said rear surface of said light distribution control element.

14. The planar light source device according to claim 11, wherein said light absorption part and said light distribution control element are integrated with each other.

\* \* \* \* \*